US009166714B2

(12) United States Patent
Barve et al.

(10) Patent No.: US 9,166,714 B2
(45) Date of Patent: Oct. 20, 2015

(54) METHOD OF AND SYSTEM FOR PRESENTING ENRICHED VIDEO VIEWING ANALYTICS

(75) Inventors: Rakesh Barve, Bangalore (IN); Ravi Krishna, Bangalore (IN); Murali Aravamudan, Windham, NH (US)

(73) Assignee: Veveo, Inc., Andover, MA (US)

( * ) Notice: Subject to any disclaimer, the term of this patent is extended or adjusted under 35 U.S.C. 154(b) by 257 days.

(21) Appl. No.: 12/879,141

(22) Filed: Sep. 10, 2010

(65) Prior Publication Data

US 2011/0145847 A1 Jun. 16, 2011

Related U.S. Application Data

(60) Provisional application No. 61/241,444, filed on Sep. 11, 2009.

(51) Int. Cl.

*H04H 60/33* (2008.01)
*H04H 60/45* (2008.01)
*H04H 60/56* (2008.01)
*H04H 60/32* (2008.01)
*G06F 3/00* (2006.01)
*G06F 13/00* (2006.01)
(Continued)

(52) U.S. Cl.

CPC ............... *H04H 60/64* (2013.01); *H04H 60/32* (2013.01); *H04H 60/43* (2013.01); *H04H 60/45* (2013.01); *H04H 60/72* (2013.01); *H04H 60/74* (2013.01)

(58) Field of Classification Search

USPC ............................................................ 725/46
See application file for complete search history.

(56) References Cited

U.S. PATENT DOCUMENTS 1,261,167 A 4/1918 Russell
3,440,427 A 4/1969 Kammer
(Continued)

FOREIGN PATENT DOCUMENTS

AU 5619898 A 7/1998
AU 731010 B2 3/2001
(Continued)

OTHER PUBLICATIONS

Ardissono, L. et al., User Modeling and Recommendation Techniques for Personalized Electronic Program Guides, Personalized Digital Television,Editors: Ardissono, et al., Kluwer Academic Press, 2004, 27 pages.
(Continued)

*Primary Examiner* — Nasser Goodarzi
*Assistant Examiner* — Fred Peng
(74) *Attorney, Agent, or Firm* — Ropes & Gray LLP

(57) ABSTRACT

A method of and system for presenting enriched video viewing analytics is presented. A method of presenting enriched statistical and analytical information includes receiving a catalog of a plurality of content items. Each content item has associated metacontent characterizing the content item. The method also includes receiving and storing operations of a user for interacting with one or more of the content items. The method further includes determining use and/or viewing statistics for, for example, the content items, metacontent associated with the content items, the numbers and types of devices viewing the content items, subscriber information, household information, and/or viewer demographic information for past and present time periods. The method also, optionally, includes estimating the likelihood of future user interaction operations.

25 Claims, 9 Drawing Sheets

(51) Int. Cl.

| | |
|---|---|
| ***H04N 5/445*** | (2011.01) |
| ***H04H 60/64*** | (2008.01) |
| *H04H 60/43* | (2008.01) |
| *H04H 60/72* | (2008.01) |
| *H04H 60/74* | (2008.01) |

(56) References Cited

U.S. PATENT DOCUMENTS 3,492,577 A 1/1970 Reiter et al.
3,493,674 A 2/1970 Houghton
3,729,581 A 4/1973 Anderson
3,833,757 A 9/1974 Kirk, Jr. et al.
3,891,792 A 6/1975 Kimura
3,936,868 A 2/1976 Thorpe
3,996,583 A 12/1976 Hutt et al.
4,004,085 A 1/1977 Makino et al.
4,016,361 A 4/1977 Pandey
4,024,401 A 5/1977 Bernstein et al.
4,026,555 A 5/1977 Kirschner et al.
4,031,548 A 6/1977 Kato et al.
4,045,777 A 8/1977 Mierzwinski et al.
4,052,719 A 10/1977 Hutt et al.
4,058,830 A 11/1977 Guinet et al.
4,070,693 A 1/1978 Shutterly
4,079,419 A 3/1978 Siegle et al.
4,081,753 A 3/1978 Miller
4,081,754 A 3/1978 Jackson
4,096,524 A 6/1978 Scott
4,103,524 A 8/1978 Mitchell et al.
4,134,127 A 1/1979 Campioni
4,139,860 A 2/1979 Micic et al.
4,150,254 A 4/1979 Schussler et al.
4,156,850 A 5/1979 Beyers, Jr.
4,161,728 A 7/1979 Insam
4,162,513 A 7/1979 Beyers, Jr. et al.
4,170,782 A 10/1979 Miller
4,186,413 A 1/1980 Mortimer
4,189,781 A 2/1980 Douglas
4,203,130 A 5/1980 Doumit et al.
4,205,343 A 5/1980 Barrett
4,218,698 A 8/1980 Bart et al.
4,228,543 A 10/1980 Jackson
4,231,031 A 10/1980 Crowther et al.
4,233,628 A 11/1980 Ciciora
4,249,211 A 2/1981 Baba et al.
4,249,213 A 2/1981 Imaide et al.
4,261,006 A 4/1981 Weintraub et al.
4,264,924 A 4/1981 Freeman
4,264,925 A 4/1981 Freeman et al.
4,270,145 A 5/1981 Farina
4,271,532 A 6/1981 Wine
4,276,597 A 6/1981 Dissly et al.
4,280,148 A 7/1981 Saxena
4,283,787 A 8/1981 Chambers
4,288,809 A 9/1981 Yabe
4,290,142 A 9/1981 Schnee et al.
4,300,040 A 11/1981 Gould et al.
4,305,101 A 12/1981 Yarbrough et al.
4,329,684 A 5/1982 Monteath et al.
4,331,974 A 5/1982 Cogswell et al.
4,337,480 A 6/1982 Bourassin et al.
4,337,482 A 6/1982 Coutta
4,337,483 A 6/1982 Guillou
4,344,090 A 8/1982 Belisomi et al.
4,355,415 A 10/1982 George et al.
4,367,557 A 1/1983 Stern et al.
4,367,559 A 1/1983 Tults
4,375,651 A 3/1983 Templin et al.
4,381,522 A 4/1983 Lambert
4,385,210 A 5/1983 Marquiss
4,388,645 A 6/1983 Cox et al.
4,390,901 A 6/1983 Keiser
4,393,376 A 7/1983 Thomas
4,403,285 A 9/1983 Kikuchi
4,405,946 A 9/1983 Knight
4,412,244 A 10/1983 Shanley, II
4,413,281 A 11/1983 Thonnart
4,420,769 A 12/1983 Novak
4,425,579 A 1/1984 Merrell
4,425,581 A 1/1984 Schweppe et al.
4,429,385 A 1/1984 Cichelli et al.
4,439,784 A 3/1984 Furukawa et al.
4,449,249 A 5/1984 Price
4,453,217 A 6/1984 Boivie
4,456,925 A 6/1984 Skerlos et al.
4,466,017 A 8/1984 Banker
4,477,830 A 10/1984 Lindman et al.
4,488,179 A 12/1984 Kruger et al.
4,495,654 A 1/1985 Deiss
4,496,171 A 1/1985 Cherry
4,496,804 A 1/1985 Hung
4,496,976 A 1/1985 Swanson et al.
4,510,623 A 4/1985 Bonneau et al.
4,520,404 A 5/1985 Von Kohorn
4,523,228 A 6/1985 Banker
4,527,194 A 7/1985 Sirazi
4,531,020 A 7/1985 Wechselberger et al.
4,533,910 A 8/1985 Sukonick et al.
4,536,791 A 8/1985 Campbell et al.
4,547,804 A 10/1985 Greenberg
4,554,584 A 11/1985 Elam et al.
4,555,755 A 11/1985 Kurosawa et al.
4,555,775 A 11/1985 Pike
4,566,034 A 1/1986 Harger et al.
4,573,072 A 2/1986 Freeman
4,587,520 A 5/1986 Astle
4,595,951 A 6/1986 Filliman
4,595,952 A 6/1986 Filliman
4,598,288 A 7/1986 Yarbrough et al.
4,602,279 A 7/1986 Freeman
4,605,964 A 8/1986 Chard
4,605,973 A 8/1986 Von Kohorn
4,608,859 A 9/1986 Rockley
4,611,269 A 9/1986 Suzuki et al.
4,620,229 A 10/1986 Amano et al.
4,622,545 A 11/1986 Atkinson
4,625,080 A 11/1986 Scott
4,635,109 A 1/1987 Comeau
4,635,121 A 1/1987 Hoffman et al.
4,641,205 A 2/1987 Beyers, Jr.
4,645,873 A 2/1987 Chomet
4,677,466 A 6/1987 Lert, Jr. et al.
4,677,501 A 6/1987 Saltzman et al.
4,685,131 A 8/1987 Horne
4,689,022 A 8/1987 Peers et al.
4,691,351 A 9/1987 Hayashi et al.
4,694,490 A 9/1987 Harvey et al.
4,701,794 A 10/1987 Froling et al.
4,704,725 A 11/1987 Harvey et al.
4,706,121 A 11/1987 Young
4,712,105 A 12/1987 Kohler
4,714,919 A 12/1987 Foster
4,718,107 A 1/1988 Hayes
RE32,632 E 3/1988 Atkinson
4,729,027 A 3/1988 Hakamada et al.
4,729,028 A 3/1988 Micic et al.
4,734,769 A 3/1988 Davis
4,745,549 A 5/1988 Hashimoto
4,746,983 A 5/1988 Hakamada
4,748,618 A 5/1988 Brown et al.
4,750,036 A 6/1988 Martinez
4,750,213 A 6/1988 Novak
4,751,578 A 6/1988 Reiter et al.
4,754,326 A 6/1988 Kram et al.
4,760,528 A 7/1988 Levin
4,761,684 A 8/1988 Clark et al.
4,768,228 A 8/1988 Clupper et al.
4,772,882 A 9/1988 Mical
4,775,935 A 10/1988 Yourick
4,785,408 A 11/1988 Britton et al.
4,787,063 A 11/1988 Muguet
4,812,834 A 3/1989 Wells
4,814,883 A 3/1989 Perine et al.
4,821,102 A 4/1989 Ichikawa et al.

(56) References Cited

U.S. PATENT DOCUMENTS 4,821,211 A 4/1989 Torres
4,829,558 A 5/1989 Welsh
4,833,710 A 5/1989 Hirashima
4,847,604 A 7/1989 Doyle
4,847,698 A 7/1989 Freeman
4,847,699 A 7/1989 Freeman
4,847,700 A 7/1989 Freeman
4,847,744 A 7/1989 Araki
4,855,813 A 8/1989 Russell et al.
4,857,999 A 8/1989 Welsh
4,862,268 A 8/1989 Campbell et al.
4,864,429 A 9/1989 Eigeldinger et al.
4,866,542 A 9/1989 Shimada et al.
4,873,584 A 10/1989 Hashimoto
4,873,623 A 10/1989 Lane et al.
4,876,600 A 10/1989 Pietzsch et al.
4,882,732 A 11/1989 Kaminaga
4,884,223 A 11/1989 Ingle et al.
4,887,152 A 12/1989 Matsuzaki et al.
4,888,796 A 12/1989 Olivo, Jr.
4,890,168 A 12/1989 Inoue et al.
4,890,320 A 12/1989 Monslow et al.
4,890,321 A 12/1989 Seth-Smith et al.
4,893,238 A 1/1990 Venema
4,894,789 A 1/1990 Yee
4,899,136 A 2/1990 Beard et al.
4,899,139 A 2/1990 Ishimochi et al.
4,905,094 A 2/1990 Pocock et al.
4,908,707 A 3/1990 Kinghorn
4,908,713 A 3/1990 Levine
4,908,859 A 3/1990 Bennett et al.
4,914,517 A 4/1990 Duffield
4,914,732 A 4/1990 Henderson et al.
4,918,531 A 4/1990 Johnson
4,930,158 A 5/1990 Vogel
4,930,160 A 5/1990 Vogel
4,931,783 A 6/1990 Atkinson
4,935,865 A 6/1990 Rowe et al.
4,937,821 A 6/1990 Boulton
4,937,863 A 6/1990 Robert et al.
4,939,507 A 7/1990 Beard et al.
4,942,391 A 7/1990 Kikuta
4,945,563 A 7/1990 Horton et al.
4,954,882 A 9/1990 Kamemoto
4,959,719 A 9/1990 Strubbe et al.
4,959,720 A 9/1990 Duffield et al.
4,963,994 A 10/1990 Levine
4,965,825 A 10/1990 Harvey et al.
4,977,455 A 12/1990 Young
4,987,486 A 1/1991 Johnson et al.
4,991,011 A 2/1991 Johnson et al.
4,991,012 A 2/1991 Yoshino
4,992,782 A 2/1991 Sakamoto et al.
4,992,940 A 2/1991 Dworkin
4,995,078 A 2/1991 Monslow et al.
4,996,642 A 2/1991 Hey
4,998,171 A 3/1991 Kim et al.
5,003,384 A 3/1991 Durden et al.
5,005,084 A 4/1991 Skinner
5,008,853 A 4/1991 Bly et al.
5,012,409 A 4/1991 Fletcher et al.
5,014,125 A 5/1991 Pocock et al.
5,016,273 A 5/1991 Hoff
5,023,721 A 6/1991 Moon-Hwan
5,023,727 A 6/1991 Boyd et al.
5,027,400 A 6/1991 Baji et al.
5,031,045 A 7/1991 Kawasaki
5,036,314 A 7/1991 Barillari et al.
5,038,211 A 8/1991 Hallenbeck
5,040,067 A 8/1991 Yamazaki
5,045,947 A 9/1991 Beery
5,046,092 A 9/1991 Walker et al.
5,047,867 A 9/1991 Strubbe et al.
5,058,160 A 10/1991 Banker et al.
5,062,060 A 10/1991 Kolnick
5,068,733 A 11/1991 Bennett
5,068,734 A 11/1991 Beery
5,072,412 A 12/1991 Henderson, Jr. et al.
5,075,771 A 12/1991 Hashimoto
5,083,205 A 1/1992 Arai
5,083,800 A 1/1992 Lockton
5,089,885 A 2/1992 Clark
5,090,049 A 2/1992 Chen
5,091,785 A 2/1992 Canfield et al.
5,093,718 A 3/1992 Hoarty et al.
5,093,921 A 3/1992 Bevins, Jr.
5,099,319 A 3/1992 Esch et al.
5,103,314 A 4/1992 Keenan
5,105,184 A 4/1992 Pirani et al.
5,109,279 A 4/1992 Ando
5,109,414 A 4/1992 Harvey et al.
5,113,259 A 5/1992 Romesburg et al.
5,119,188 A 6/1992 McCalley et al.
5,119,577 A 6/1992 Lilly
5,121,476 A 6/1992 Yee
5,123,046 A 6/1992 Levine
5,126,851 A 6/1992 Yoshimura et al.
5,128,766 A 7/1992 Choi
5,132,992 A 7/1992 Yurt et al.
5,134,719 A 7/1992 Mankovitz
5,146,335 A 9/1992 Kim et al.
5,148,154 A 9/1992 MacKay et al.
5,148,275 A 9/1992 Blatter et al.
5,151,782 A 9/1992 Ferraro
5,151,789 A 9/1992 Young
5,152,012 A 9/1992 Schwob
5,155,591 A 10/1992 Wachob
5,155,806 A 10/1992 Hoeber et al.
5,157,768 A 10/1992 Hoeber et al.
5,161,019 A 11/1992 Emanuel
5,161,023 A 11/1992 Keenan
5,162,905 A 11/1992 Itoh et al.
5,170,388 A 12/1992 Endoh
5,172,111 A 12/1992 Olivo, Jr.
5,172,413 A 12/1992 Bradley et al.
5,177,604 A 1/1993 Martinez
5,179,439 A 1/1993 Hashimoto et al.
5,179,654 A 1/1993 Richards et al.
5,182,646 A 1/1993 Keenan
5,187,589 A 2/1993 Kono et al.
5,189,630 A 2/1993 Barstow et al.
5,191,423 A 3/1993 Yoshida et al.
5,194,941 A 3/1993 Grimaldi et al.
5,195,092 A 3/1993 Wilson et al.
5,195,134 A 3/1993 Inoue et al.
5,200,822 A 4/1993 Bronfin et al.
5,200,823 A 4/1993 Yoneda et al.
5,204,897 A 4/1993 Wyman
5,206,722 A 4/1993 Kwan
5,210,611 A 5/1993 Yee et al.
5,212,553 A 5/1993 Maruoka
5,214,622 A 5/1993 Nemoto et al.
5,216,515 A 6/1993 Steele et al.
5,220,420 A 6/1993 Hoarty et al.
5,223,924 A 6/1993 Strubbe
5,224,060 A 6/1993 Ma et al.
5,227,874 A 7/1993 Von Kohorn
5,231,493 A 7/1993 Apitz
5,231,494 A 7/1993 Wachob
RE34,340 E 8/1993 Freeman
5,233,423 A 8/1993 Jernigan et al.
5,233,654 A 8/1993 Harvey et al.
5,235,415 A 8/1993 Bonicel et al.
5,236,199 A 8/1993 Thompson, Jr.
5,237,411 A 8/1993 Fink et al.
5,237,417 A 8/1993 Hayashi et al.
5,237,418 A 8/1993 Kaneko
5,239,540 A 8/1993 Rovira et al.
5,241,428 A 8/1993 Goldwasser et al.
5,245,420 A 9/1993 Harney et al.
5,247,347 A 9/1993 Litteral et al.
5,247,364 A 9/1993 Banker et al.
5,247,580 A 9/1993 Kimura et al.
5,249,043 A 9/1993 Grandmougin et al.

(56) References Cited

U.S. PATENT DOCUMENTS 5,251,921 A 10/1993 Daniels
5,252,860 A 10/1993 McCarty et al.
5,253,066 A 10/1993 Vogel
5,253,067 A 10/1993 Chaney et al.
5,260,778 A 11/1993 Kauffman et al.
5,260,788 A 11/1993 Takano et al.
5,260,999 A 11/1993 Wyman
5,262,860 A 11/1993 Fitzpatrick et al.
5,283,561 A 2/1994 Lumelsky et al.
5,283,639 A 2/1994 Esch et al.
5,283,819 A 2/1994 Glick et al.
5,285,265 A 2/1994 Choi et al.
5,285,278 A 2/1994 Holman
5,285,284 A 2/1994 Takashima et al.
5,293,357 A 3/1994 Hallenbeck
5,296,931 A 3/1994 Na et al.
5,297,204 A 3/1994 Levine
5,299,006 A 3/1994 Kim et al.
5,301,028 A 4/1994 Banker et al.
5,307,173 A 4/1994 Yuen et al.
5,311,423 A 5/1994 Clark
5,313,282 A 5/1994 Hayashi
5,315,392 A 5/1994 Ishikawa et al.
5,317,391 A 5/1994 Banker et al.
5,317,403 A 5/1994 Keenan
5,319,445 A 6/1994 Fitts
5,323,234 A 6/1994 Kawasaki
5,323,240 A 6/1994 Amano et al.
5,325,183 A 6/1994 Rhee
5,325,423 A 6/1994 Lewis
5,335,277 A 8/1994 Harvey et al.
5,337,347 A 8/1994 Halstead-Nussloch et al.
5,339,434 A 8/1994 Rusis
5,341,350 A 8/1994 Frank et al.
5,343,239 A 8/1994 Lappington et al.
5,345,430 A 9/1994 Moe
5,347,167 A 9/1994 Singh
5,347,632 A 9/1994 Filepp et al.
5,351,075 A 9/1994 Herz et al.
5,353,121 A 10/1994 Young et al.
5,355,162 A 10/1994 Yazolino et al.
5,357,276 A 10/1994 Banker et al.
5,359,367 A 10/1994 Stockill
5,359,601 A 10/1994 Wasilewski et al.
5,361,091 A 11/1994 Hoarty et al.
5,365,282 A 11/1994 Levine
5,367,316 A 11/1994 Ikezaki
5,367,330 A 11/1994 Haave et al.
5,369,605 A 11/1994 Parks
5,371,551 A 12/1994 Logan et al.
5,373,288 A 12/1994 Blahut
5,374,942 A 12/1994 Gilligan et al.
5,374,951 A 12/1994 Welsh
5,377,317 A 12/1994 Bates et al.
5,377,319 A 12/1994 Kitahara et al.
5,382,983 A 1/1995 Kwoh et al.
5,384,910 A 1/1995 Torres
5,387,945 A 2/1995 Takeuchi
5,389,964 A 2/1995 Oberle et al.
5,390,027 A 2/1995 Henmi et al.
5,396,546 A 3/1995 Remillard
5,398,074 A 3/1995 Duffield et al.
5,398,138 A 3/1995 Tomita
5,404,393 A 4/1995 Remillard
5,404,567 A 4/1995 DePietro et al.
5,410,326 A 4/1995 Goldstein
5,410,343 A 4/1995 Coddington et al.
5,410,344 A 4/1995 Graves et al.
5,410,367 A 4/1995 Zahavi et al.
5,412,720 A 5/1995 Hoarty
5,414,756 A 5/1995 Levine
5,416,508 A 5/1995 Sakuma et al.
5,422,389 A 6/1995 Trepka et al.
5,424,770 A 6/1995 Schmelzer et al.
5,425,101 A 6/1995 Woo et al.
5,426,699 A 6/1995 Wunderlich et al.
5,428,406 A 6/1995 Terasawa
5,432,561 A 7/1995 Strubbe
5,434,625 A 7/1995 Willis
5,434,626 A 7/1995 Hayashi et al.
5,434,678 A 7/1995 Abecassis
5,436,676 A 7/1995 Pint et al.
5,438,355 A 8/1995 Palmer
5,438,372 A 8/1995 Tsumori et al.
5,438,423 A 8/1995 Lynch et al.
5,440,678 A 8/1995 Eisen et al.
5,442,389 A 8/1995 Blahut et al.
5,444,499 A 8/1995 Saitoh
5,446,919 A 8/1995 Wilkins
5,452,012 A 9/1995 Saitoh
5,453,146 A 9/1995 Kemper
5,453,796 A 9/1995 Duffield et al.
5,455,570 A 10/1995 Cook et al.
5,457,478 A 10/1995 Frank
5,459,522 A 10/1995 Pint
5,461,415 A 10/1995 Wolf et al.
5,465,113 A 11/1995 Gilboy
5,465,385 A 11/1995 Ohga et al.
5,469,206 A 11/1995 Strubbe et al.
5,473,442 A 12/1995 Kim et al.
5,477,262 A 12/1995 Banker et al.
5,479,266 A 12/1995 Young et al.
5,479,268 A 12/1995 Young et al.
5,479,302 A 12/1995 Haines
5,479,497 A 12/1995 Kovarik
5,481,296 A 1/1996 Cragun et al.
5,483,278 A 1/1996 Strubbe et al.
5,485,197 A 1/1996 Hoarty
5,485,219 A 1/1996 Woo
5,485,221 A 1/1996 Banker et al.
5,485,518 A 1/1996 Hunter et al.
5,487,616 A 1/1996 Ichbiah
5,488,409 A 1/1996 Yuen et al.
5,495,295 A 2/1996 Long
5,502,504 A 3/1996 Marshall et al.
5,515,098 A 5/1996 Carles
5,515,106 A 5/1996 Chaney et al.
5,515,511 A 5/1996 Nguyen et al.
5,517,254 A 5/1996 Monta et al.
5,517,256 A 5/1996 Hashimoto
5,517,257 A 5/1996 Dunn et al.
5,521,589 A 5/1996 Mondrosch et al.
5,523,791 A 6/1996 Berman
5,523,794 A 6/1996 Mankovitz et al.
5,523,795 A 6/1996 Ueda
5,523,796 A 6/1996 Marshall et al.
5,524,195 A 6/1996 Clanton, III et al.
5,524,271 A 6/1996 Hollmann et al.
5,525,795 A 6/1996 MacGregor et al.
5,526,034 A 6/1996 Hoarty et al.
5,526,035 A 6/1996 Lappington et al.
5,527,257 A 6/1996 Piramoon
5,528,304 A 6/1996 Cherrick et al.
5,532,735 A 7/1996 Blahut et al.
5,532,754 A 7/1996 Young et al.
5,534,911 A 7/1996 Levitan
5,537,141 A 7/1996 Harper et al.
5,539,449 A 7/1996 Blahut et al.
5,539,479 A 7/1996 Bertram
5,539,822 A 7/1996 Lett
5,539,880 A 7/1996 Lakhani
5,541,662 A 7/1996 Adams et al.
5,541,738 A 7/1996 Mankovitz
5,543,933 A 8/1996 Kang et al.
5,544,321 A 8/1996 Theimer et al.
5,546,521 A 8/1996 Martinez
5,548,338 A 8/1996 Ellis et al.
5,550,576 A 8/1996 Klosterman
5,550,578 A 8/1996 Hoarty et al.
5,550,825 A 8/1996 McMullan, Jr. et al.
5,550,863 A 8/1996 Yurt et al.
5,553,221 A 9/1996 Reimer et al.
5,557,338 A 9/1996 Maze et al.
5,557,686 A 9/1996 Brown et al.

(56) References Cited

U.S. PATENT DOCUMENTS 5,557,721 A 9/1996 Fite et al.
5,557,724 A 9/1996 Sampat et al.
5,559,548 A 9/1996 Davis et al.
5,559,549 A 9/1996 Hendricks et al.
5,559,550 A 9/1996 Mankovitz
5,559,942 A 9/1996 Gough et al.
5,559,949 A 9/1996 Reimer et al.
5,561,471 A 10/1996 Kim
5,561,709 A 10/1996 Remillard
5,563,665 A 10/1996 Chang
5,568,272 A 10/1996 Levine
5,570,295 A 10/1996 Isenberg et al.
5,572,442 A 11/1996 Schulhof et al.
5,574,778 A 11/1996 Ely et al.
5,574,962 A 11/1996 Fardeau et al.
5,576,755 A 11/1996 Davis et al.
5,576,951 A 11/1996 Lockwood
5,579,055 A 11/1996 Hamilton et al.
5,579,239 A 11/1996 Freeman et al.
5,581,479 A 12/1996 McLaughlin et al.
5,582,364 A 12/1996 Trulin et al.
5,583,560 A 12/1996 Florin et al.
5,583,561 A 12/1996 Baker et al.
5,583,563 A 12/1996 Wanderscheid et al.
5,583,576 A 12/1996 Perlman et al.
5,583,653 A 12/1996 Timmermans et al.
5,584,025 A 12/1996 Keithley et al.
5,585,838 A 12/1996 Lawler et al.
5,585,858 A 12/1996 Harper et al.
5,585,865 A 12/1996 Amano et al.
5,585,866 A 12/1996 Miller et al.
5,589,592 A 12/1996 Horikawa et al.
5,589,892 A 12/1996 Knee et al.
5,592,551 A 1/1997 Lett et al.
5,594,490 A 1/1997 Dawson et al.
5,594,491 A 1/1997 Hodge et al.
5,594,492 A 1/1997 O'Callaghan et al.
5,594,507 A 1/1997 Hoarty
5,594,509 A 1/1997 Florin et al.
5,594,661 A 1/1997 Bruner et al.
5,594,779 A 1/1997 Goodman
5,596,373 A 1/1997 White et al.
5,596,705 A 1/1997 Reimer et al.
5,598,523 A 1/1997 Fujita
5,600,364 A 2/1997 Hendricks et al.
5,600,365 A 2/1997 Kondo et al.
5,600,366 A 2/1997 Schulman
5,600,573 A 2/1997 Hendricks et al.
5,602,582 A 2/1997 Wanderscheid et al.
5,602,596 A 2/1997 Claussen et al.
5,602,597 A 2/1997 Bertram
5,602,598 A 2/1997 Shintani
5,602,600 A 2/1997 Queinnec
5,604,542 A 2/1997 Dedrick
5,606,374 A 2/1997 Bertram
5,606,642 A 2/1997 Stautner et al.
5,608,448 A 3/1997 Smoral et al.
5,610,653 A 3/1997 Abecassis
5,610,664 A 3/1997 Bobert
5,616,876 A 4/1997 Cluts
5,617,526 A 4/1997 Oran et al.
5,617,565 A 4/1997 Augenbraun et al.
5,619,247 A 4/1997 Russo
5,619,249 A 4/1997 Billock et al.
5,619,274 A 4/1997 Roop et al.
5,621,456 A 4/1997 Florin et al.
5,621,579 A 4/1997 Yuen
5,623,406 A 4/1997 Ichbiah
5,623,613 A 4/1997 Rowe et al.
5,625,406 A 4/1997 Newberry et al.
5,625,464 A 4/1997 Compoint et al.
5,625,678 A 4/1997 Blomfield-Brown
5,625,693 A 4/1997 Rohatgi et al.
5,627,940 A 5/1997 Rohra et al.
5,629,733 A 5/1997 Youman et al.
5,629,867 A 5/1997 Goldman
5,630,119 A 5/1997 Aristides et al.
5,631,995 A 5/1997 Weissensteiner et al.
5,632,007 A 5/1997 Freeman
5,633,683 A 5/1997 Rosengren et al.
5,634,051 A 5/1997 Thomson
5,635,978 A 6/1997 Alten et al.
5,635,979 A 6/1997 Kostreski et al.
5,635,987 A 6/1997 Park et al.
5,635,989 A 6/1997 Rothmuller
5,636,346 A 6/1997 Saxe
5,638,522 A 6/1997 Dunsmuir et al.
5,640,484 A 6/1997 Mankovitz
5,640,501 A 6/1997 Turpin
5,640,577 A 6/1997 Scharmer
5,642,153 A 6/1997 Chaney et al.
5,648,813 A 7/1997 Tanigawa et al.
5,648,824 A 7/1997 Dunn et al.
5,650,826 A 7/1997 Eitz
5,650,831 A 7/1997 Farwell
5,652,613 A 7/1997 Lazarus et al.
5,652,615 A 7/1997 Bryant et al.
5,654,748 A 8/1997 Matthews, III
5,654,886 A 8/1997 Zereski, Jr. et al.
5,657,072 A 8/1997 Aristides et al.
5,657,091 A 8/1997 Bertram
5,657,414 A 8/1997 Lett et al.
5,659,350 A 8/1997 Hendricks et al.
5,659,366 A 8/1997 Kerman
5,659,367 A 8/1997 Yuen
5,659,742 A 8/1997 Beattie et al.
5,661,516 A 8/1997 Carles
5,661,517 A 8/1997 Budow et al.
5,663,757 A 9/1997 Morales
5,664,111 A 9/1997 Nahan et al.
5,666,293 A 9/1997 Metz et al.
5,666,498 A 9/1997 Amro
5,666,645 A 9/1997 Thomas et al.
5,671,276 A 9/1997 Eyer et al.
5,671,411 A 9/1997 Watts et al.
5,671,607 A 9/1997 Clemens et al.
5,675,390 A 10/1997 Schindler et al.
5,675,743 A 10/1997 Mavity
5,675,752 A 10/1997 Scott et al.
5,677,708 A 10/1997 Matthews, III et al.
5,677,981 A 10/1997 Kato et al.
5,682,195 A 10/1997 Hendricks et al.
5,682,196 A 10/1997 Freeman
5,682,206 A 10/1997 Wehmeyer et al.
5,682,525 A 10/1997 Bouve et al.
5,684,525 A 11/1997 Klosterman
5,686,954 A 11/1997 Yoshinobu et al.
5,687,331 A 11/1997 Volk et al.
5,689,648 A 11/1997 Diaz et al.
5,689,663 A 11/1997 Williams
5,689,666 A 11/1997 Berquist et al.
5,691,476 A 11/1997 Madaras
5,692,214 A 11/1997 Levine
5,692,335 A 12/1997 Magnuson
5,694,163 A 12/1997 Harrison
5,694,176 A 12/1997 Bruette et al.
5,694,381 A 12/1997 Sako
5,696,765 A 12/1997 Safadi
5,696,905 A 12/1997 Reimer et al.
5,699,052 A 12/1997 Miyahara
5,699,107 A 12/1997 Lawler et al.
5,699,125 A 12/1997 Rzeszewski et al.
5,699,528 A 12/1997 Hogan
5,701,383 A 12/1997 Russo et al.
5,703,604 A 12/1997 McCutchen
5,708,478 A 1/1998 Tognazzini
5,708,767 A 1/1998 Yeo et al.
5,708,780 A 1/1998 Levergood et al.
5,708,961 A 1/1998 Hylton et al.
5,710,601 A 1/1998 Marshall et al.
5,710,815 A 1/1998 Ming et al.
5,710,884 A 1/1998 Dedrick
5,715,314 A 2/1998 Payne et al.
5,715,399 A 2/1998 Bezos

(56) References Cited

U.S. PATENT DOCUMENTS 5,717,452 A 2/1998 Janin et al.
5,717,923 A 2/1998 Dedrick
5,721,829 A 2/1998 Dunn et al.
5,722,041 A 2/1998 Freadman
5,724,091 A 3/1998 Freeman et al.
5,724,103 A 3/1998 Batchelor
5,724,521 A 3/1998 Dedrick
5,724,525 A 3/1998 Beyers, II et al.
5,724,567 A 3/1998 Rose et al.
5,726,702 A 3/1998 Hamaguchi et al.
5,727,060 A 3/1998 Young
5,727,163 A 3/1998 Bezos
5,731,844 A 3/1998 Rauch et al.
5,732,216 A 3/1998 Logan et al.
5,734,119 A 3/1998 France et al.
5,734,444 A 3/1998 Yoshinobu
5,734,720 A 3/1998 Salganicoff
5,734,853 A 3/1998 Hendricks et al.
5,734,893 A 3/1998 Li et al.
5,737,028 A 4/1998 Bertram et al.
5,737,029 A 4/1998 Ohkura et al.
5,737,030 A 4/1998 Hong et al.
5,737,552 A 4/1998 Lavallee et al.
5,740,231 A 4/1998 Cohn et al.
5,740,549 A 4/1998 Reilly et al.
5,742,443 A 4/1998 Tsao et al.
5,742,816 A 4/1998 Barr et al.
5,745,710 A 4/1998 Clanton, III et al.
5,748,191 A 5/1998 Rozak et al.
5,748,716 A 5/1998 Levine
5,749,043 A 5/1998 Worthy
5,749,081 A 5/1998 Whiteis
5,751,282 A 5/1998 Girard et al.
5,752,159 A 5/1998 Faust et al.
5,752,160 A 5/1998 Dunn
5,754,258 A 5/1998 Hanaya et al.
5,754,771 A 5/1998 Epperson et al.
5,754,939 A 5/1998 Herz et al.
5,757,417 A 5/1998 Aras et al.
5,758,257 A 5/1998 Herz et al.
5,758,258 A 5/1998 Shoff et al.
5,758,259 A 5/1998 Lawler
5,760,821 A 6/1998 Ellis et al.
5,761,371 A 6/1998 Ohno et al.
5,761,372 A 6/1998 Yoshinobu et al.
5,761,601 A 6/1998 Nemirofsky et al.
5,761,606 A 6/1998 Wolzien
5,761,607 A 6/1998 Gudesen
5,768,528 A 6/1998 Stumm
5,771,354 A 6/1998 Crawford
5,774,170 A 6/1998 Hite et al.
5,774,357 A 6/1998 Hoffberg et al.
5,774,534 A 6/1998 Mayer
5,774,588 A 6/1998 Li
5,774,664 A 6/1998 Hidary et al.
5,774,666 A 6/1998 Portuesi
5,774,859 A 6/1998 Houser et al.
5,774,887 A 6/1998 Wolff et al.
5,778,181 A 7/1998 Hidary et al.
5,778,182 A 7/1998 Cathey et al.
5,778,187 A 7/1998 Monteiro et al.
5,781,226 A 7/1998 Sheehan
5,781,227 A 7/1998 Goode et al.
5,781,228 A 7/1998 Sposato
5,781,245 A 7/1998 Van Der Weij et al.
5,781,246 A 7/1998 Alten et al.
5,781,734 A 7/1998 Ohno et al.
5,784,258 A 7/1998 Quinn
5,787,259 A 7/1998 Haroun et al.
5,788,507 A 8/1998 Redford et al.
5,790,198 A 8/1998 Roop et al.
5,790,201 A 8/1998 Antos
5,790,202 A 8/1998 Kummer et al.
5,790,423 A 8/1998 Lau et al.
5,790,426 A 8/1998 Robinson
5,790,753 A 8/1998 Krishnamoorthy et al.
5,790,835 A 8/1998 Case et al.
5,790,935 A 8/1998 Payton
5,793,364 A 8/1998 Bolanos et al.
5,793,409 A 8/1998 Tetsumura
5,793,438 A 8/1998 Bedard
5,793,964 A 8/1998 Rogers et al.
5,793,971 A 8/1998 Fujita et al.
5,793,972 A 8/1998 Shane et al.
5,794,217 A 8/1998 Allen
5,796,952 A 8/1998 Davis et al.
5,797,011 A 8/1998 Kroll et al.
5,798,785 A 8/1998 Hendricks et al.
5,801,747 A 9/1998 Bedard
5,801,785 A 9/1998 Crump et al.
5,801,787 A 9/1998 Schein et al.
5,802,284 A 9/1998 Karlton et al.
5,802,361 A 9/1998 Wang et al.
5,805,154 A 9/1998 Brown
5,805,155 A 9/1998 Allibhoy et al.
5,805,167 A 9/1998 van Cruyningen
5,805,235 A 9/1998 Bedard
5,805,763 A 9/1998 Lawler et al.
5,805,804 A 9/1998 Laursen et al.
5,805,806 A 9/1998 McArthur
5,808,608 A 9/1998 Young et al.
5,808,694 A 9/1998 Usui et al.
5,809,204 A 9/1998 Young et al.
5,809,214 A 9/1998 Nureki et al.
5,809,242 A 9/1998 Shaw et al.
5,809,246 A 9/1998 Goldman
5,809,471 A 9/1998 Brodsky
5,812,123 A 9/1998 Rowe et al.
5,812,124 A 9/1998 Eick et al.
5,812,205 A 9/1998 Milnes et al.
5,812,505 A 9/1998 Shimoda et al.
5,812,931 A 9/1998 Yuen
5,812,937 A 9/1998 Takahisa et al.
5,815,145 A 9/1998 Matthews, III
5,815,146 A 9/1998 Youden et al.
5,815,671 A 9/1998 Morrison
5,818,437 A 10/1998 Grover et al.
5,818,438 A 10/1998 Howe et al.
5,818,439 A 10/1998 Nagasaka et al.
5,818,441 A 10/1998 Throckmorton et al.
5,818,511 A 10/1998 Farry et al.
5,818,541 A 10/1998 Matsuura et al.
5,818,935 A 10/1998 Maa
5,819,019 A 10/1998 Nelson
5,819,156 A 10/1998 Belmont
5,819,160 A 10/1998 Foladare et al.
5,819,284 A 10/1998 Farber et al.
5,819,285 A 10/1998 Damico et al.
5,822,123 A 10/1998 Davis et al.
5,822,530 A 10/1998 Brown
5,825,407 A 10/1998 Cowe et al.
5,828,402 A 10/1998 Collings
5,828,419 A 10/1998 Bruette et al.
5,828,420 A 10/1998 Marshall et al.
5,828,839 A 10/1998 Moncreiff
5,828,945 A 10/1998 Klosterman
5,828,991 A 10/1998 Skiena et al.
5,830,068 A 11/1998 Brenner et al.
5,832,223 A 11/1998 Hara et al.
5,833,468 A 11/1998 Guy et al.
5,835,087 A 11/1998 Herz et al.
5,835,717 A 11/1998 Karlton et al.
5,838,314 A 11/1998 Neel et al.
5,838,383 A 11/1998 Chimoto et al.
5,838,419 A 11/1998 Holland
5,841,979 A 11/1998 Schulhof et al.
5,842,010 A 11/1998 Jain et al.
5,842,199 A 11/1998 Miller et al.
5,844,552 A 12/1998 Gaughan et al.
5,844,620 A 12/1998 Coleman et al.
5,847,750 A 12/1998 Srivastava et al.
5,848,352 A 12/1998 Dougherty et al.
5,848,396 A 12/1998 Gerace
5,848,397 A 12/1998 Marsh et al.

(56) References Cited

U.S. PATENT DOCUMENTS 5,850,218 A 12/1998 LaJoie et al.
5,851,149 A 12/1998 Xidos et al.
5,852,437 A 12/1998 Wugofski et al.
5,859,662 A 1/1999 Cragun et al.
5,861,881 A 1/1999 Freeman et al.
5,861,906 A 1/1999 Dunn et al.
5,862,292 A 1/1999 Kubota et al.
5,864,823 A 1/1999 Levitan
5,867,226 A 2/1999 Wehmeyer et al.
5,867,227 A 2/1999 Yamaguchi
5,867,228 A 2/1999 Miki et al.
5,867,233 A 2/1999 Tanaka et al.
5,870,543 A 2/1999 Ronning
5,870,754 A 2/1999 Dimitrova et al.
5,872,588 A 2/1999 Aras et al.
5,872,834 A 2/1999 Teitelbaum
5,873,660 A 2/1999 Walsh et al.
5,874,985 A 2/1999 Matthews, III
5,875,108 A 2/1999 Hoffberg et al.
5,877,906 A 3/1999 Nagasawa et al.
5,880,720 A 3/1999 Iwafune et al.
5,880,768 A 3/1999 Lemmons et al.
5,881,245 A 3/1999 Thompson
5,883,621 A 3/1999 Iwamura
5,883,677 A 3/1999 Hofmann
5,884,028 A 3/1999 Kindell et al.
5,886,691 A 3/1999 Furuya et al.
5,886,707 A 3/1999 Berg
5,886,731 A 3/1999 Ebisawa
5,886,732 A 3/1999 Humpleman
5,887,243 A 3/1999 Harvey et al.
5,889,950 A 3/1999 Kuzma
5,890,138 A 3/1999 Godin et al.
5,892,498 A 4/1999 Marshall et al.
5,892,535 A 4/1999 Allen et al.
5,892,536 A 4/1999 Logan et al.
5,892,767 A 4/1999 Bell et al.
5,892,915 A 4/1999 Duso et al.
5,894,589 A 4/1999 Reber et al.
5,895,474 A 4/1999 Maarek et al.
5,896,414 A 4/1999 Meyer et al.
5,898,441 A 4/1999 Flurry
5,898,456 A 4/1999 Wahl
5,899,582 A 5/1999 DuLac
5,899,920 A 5/1999 DeSatnick et al.
5,900,867 A 5/1999 Schindler et al.
5,900,904 A 5/1999 Okada et al.
5,900,905 A 5/1999 Shoff et al.
5,903,234 A 5/1999 Kimura
5,903,263 A 5/1999 Emura
5,903,264 A 5/1999 Moeller et al.
5,903,314 A 5/1999 Niijima et al.
5,903,545 A 5/1999 Sabourin et al.
5,903,816 A 5/1999 Broadwin et al.
5,905,497 A 5/1999 Vaughan et al.
5,905,522 A 5/1999 Lawler
5,905,847 A 5/1999 Kobayashi et al.
5,905,865 A 5/1999 Palmer et al.
5,907,322 A 5/1999 Kelly et al.
5,907,323 A 5/1999 Lawler et al.
5,907,366 A 5/1999 Farmer et al.
5,909,638 A 6/1999 Allen
5,911,046 A 6/1999 Amano
5,912,664 A 6/1999 Eick et al.
5,913,039 A 6/1999 Nakamura et al.
5,914,712 A 6/1999 Sartain et al.
5,914,746 A 6/1999 Matthews, III et al.
5,914,941 A 6/1999 Janky
5,915,026 A 6/1999 Mankovitz
5,915,090 A 6/1999 Joseph et al.
5,915,094 A 6/1999 Kouloheris et al.
5,915,243 A 6/1999 Smolen
5,915,250 A 6/1999 Jain et al.
5,916,303 A 6/1999 Scott
5,917,481 A 6/1999 Rzeszewski et al.
5,917,538 A 6/1999 Asamizuya
5,917,830 A 6/1999 Chen et al.
5,917,835 A 6/1999 Barrett et al.
5,918,014 A 6/1999 Robinson
5,920,700 A 7/1999 Gordon et al.
5,920,702 A 7/1999 Bleidt et al.
5,920,800 A 7/1999 Schafer
5,922,045 A 7/1999 Hanson
5,922,048 A 7/1999 Emura
5,923,361 A 7/1999 Sutton, Jr.
5,923,848 A 7/1999 Goodhand et al.
5,926,204 A 7/1999 Mayer
5,926,205 A 7/1999 Krause et al.
5,926,624 A 7/1999 Katz et al.
5,928,327 A 7/1999 Wang et al.
5,929,849 A 7/1999 Kikinis
5,929,850 A 7/1999 Broadwin et al.
5,929,932 A 7/1999 Otsuki et al.
5,930,473 A 7/1999 Teng et al.
5,930,493 A 7/1999 Ottesen et al.
5,931,901 A 8/1999 Wolfe et al.
5,931,905 A 8/1999 Hashimoto et al.
5,933,603 A 8/1999 Vahalia et al.
5,933,835 A 8/1999 Adams et al.
5,935,206 A 8/1999 Dixon et al.
5,936,569 A 8/1999 Ståhle et al.
5,936,614 A 8/1999 An et al.
5,936,679 A 8/1999 Kasahara et al.
5,937,160 A 8/1999 Davis et al.
5,937,422 A 8/1999 Nelson et al.
5,940,071 A 8/1999 Treffers et al.
5,940,073 A 8/1999 Klosterman et al.
5,940,572 A 8/1999 Balaban et al.
5,940,614 A 8/1999 Allen et al.
5,943,046 A 8/1999 Cave et al.
5,943,047 A 8/1999 Suzuki
5,945,928 A 8/1999 Kushler et al.
5,945,987 A 8/1999 Dunn
5,945,988 A 8/1999 Williams et al.
5,946,386 A 8/1999 Rogers et al.
5,946,678 A 8/1999 Aalbersberg
5,947,746 A 9/1999 Tsai
5,947,867 A 9/1999 Gierer et al.
5,949,411 A 9/1999 Doerr et al.
5,949,954 A 9/1999 Young et al.
5,951,642 A 9/1999 Onoe et al.
5,953,005 A 9/1999 Liu
5,953,541 A 9/1999 King et al.
5,955,988 A 9/1999 Blonstein et al.
5,956,482 A 9/1999 Agraharam et al.
5,956,716 A 9/1999 Kenner et al.
5,959,592 A 9/1999 Petruzzelli
5,959,659 A 9/1999 Dokic
5,959,688 A 9/1999 Schein et al.
5,960,411 A 9/1999 Hartman et al.
5,961,603 A 10/1999 Kunkel et al.
5,963,202 A 10/1999 Polish
5,963,264 A 10/1999 Jackson
5,963,645 A 10/1999 Kigawa et al.
5,964,455 A 10/1999 Catanzarite et al.
5,969,714 A 10/1999 Butcher
5,969,748 A 10/1999 Casement et al.
5,970,486 A 10/1999 Yoshida et al.
5,973,680 A 10/1999 Ueda
5,973,683 A 10/1999 Cragun et al.
5,973,722 A 10/1999 Wakai et al.
5,974,217 A 10/1999 Haraguchi
5,974,222 A 10/1999 Yuen et al.
5,977,963 A 11/1999 Gaughan et al.
5,977,964 A 11/1999 Williams et al.
5,978,044 A 11/1999 Choi
5,978,567 A 11/1999 Rebane et al.
5,978,843 A 11/1999 Wu et al.
5,983,236 A 11/1999 Yager et al.
5,986,650 A 11/1999 Ellis et al.
5,987,213 A 11/1999 Mankovitz et al.
5,987,509 A 11/1999 Portuesi
5,987,621 A 11/1999 Duso et al.
5,988,078 A 11/1999 Levine

(56) References Cited

U.S. PATENT DOCUMENTS 5,990,881 A 11/1999 Inoue et al.
5,990,890 A 11/1999 Etheredge
5,990,927 A 11/1999 Hendricks et al.
5,991,498 A 11/1999 Young
5,991,799 A 11/1999 Yen et al.
5,995,092 A 11/1999 Yuen et al.
5,995,155 A 11/1999 Schindler et al.
5,997,964 A 12/1999 Klima, Jr.
5,999,912 A 12/1999 Wodarz et al.
5,999,970 A 12/1999 Krisbergh et al.
6,002,393 A 12/1999 Hite et al.
6,002,394 A 12/1999 Schein et al.
6,002,443 A 12/1999 Iggulden
6,002,444 A 12/1999 Marshall et al.
6,002,720 A 12/1999 Yurt et al.
6,003,030 A 12/1999 Kenner et al.
6,005,561 A 12/1999 Hawkins et al.
6,005,562 A 12/1999 Shiga et al.
6,005,563 A 12/1999 White et al.
6,005,564 A 12/1999 Ahmad et al.
6,005,565 A 12/1999 Legall et al.
6,005,566 A 12/1999 Jones et al.
6,005,597 A 12/1999 Barrett et al.
6,005,600 A 12/1999 Hill
6,005,631 A 12/1999 Anderson et al.
6,006,218 A 12/1999 Breese et al.
6,006,225 A 12/1999 Bowman et al.
6,006,257 A 12/1999 Slezak
6,008,802 A 12/1999 Iki et al.
6,008,803 A 12/1999 Rowe et al.
6,009,459 A 12/1999 Belfiore et al.
6,009,465 A 12/1999 Decker et al.
6,011,546 A 1/2000 Bertram
6,011,554 A 1/2000 King et al.
6,012,086 A 1/2000 Lowell
6,012,089 A 1/2000 Hasegawa
6,012,091 A 1/2000 Boyce
6,014,137 A 1/2000 Burns
6,014,184 A 1/2000 Knee et al.
6,014,381 A 1/2000 Troxel et al.
6,014,502 A 1/2000 Moraes
6,014,693 A 1/2000 Ito et al.
6,014,694 A 1/2000 Aharoni et al.
6,014,706 A 1/2000 Cannon et al.
6,016,141 A 1/2000 Knudson et al.
6,018,359 A 1/2000 Kermode et al.
6,018,372 A 1/2000 Etheredge
6,018,765 A 1/2000 Durana et al.
6,018,768 A 1/2000 Ullman et al.
6,020,880 A 2/2000 Naimpally
6,020,883 A 2/2000 Herz et al.
6,020,912 A 2/2000 De Lang
6,020,929 A 2/2000 Marshall et al.
6,022,223 A 2/2000 Taniguchi et al.
6,023,267 A 2/2000 Chapuis et al.
6,023,725 A 2/2000 Ozawa et al.
6,025,837 A 2/2000 Matthews, III et al.
6,025,868 A 2/2000 Russo
6,025,886 A 2/2000 Koda
6,028,599 A 2/2000 Yuen et al.
6,028,600 A 2/2000 Rosin et al.
6,029,045 A 2/2000 Picco et al.
6,029,064 A 2/2000 Farris et al.
6,029,176 A 2/2000 Cannon
6,031,806 A 2/2000 Tomita
6,035,091 A 3/2000 Kazo
6,035,304 A 3/2000 Machida et al.
6,037,933 A 3/2000 Blonstein et al.
6,038,367 A 3/2000 Abecassis
6,038,591 A 3/2000 Wolfe et al.
6,041,311 A 3/2000 Chislenko et al.
6,047,300 A 4/2000 Walfish et al.
6,047,317 A 4/2000 Bisdikian et al.
6,049,539 A 4/2000 Lee et al.
6,049,824 A 4/2000 Simonin
6,049,831 A 4/2000 Gardell et al.
6,052,145 A 4/2000 Macrae et al.
6,057,872 A 5/2000 Candelore
6,057,890 A 5/2000 Virden et al.
6,058,238 A 5/2000 Ng
6,061,060 A 5/2000 Berry et al.
6,061,082 A 5/2000 Park
6,061,097 A 5/2000 Satterfield
6,061,719 A 5/2000 Bendinelli et al.
6,064,376 A 5/2000 Berezowski et al.
6,064,980 A 5/2000 Jacobi et al.
6,065,047 A 5/2000 Carpenter et al.
6,067,303 A 5/2000 Aaker et al.
6,067,561 A 5/2000 Dillon
6,072,460 A 6/2000 Marshall et al.
6,072,982 A 6/2000 Haddad
6,075,526 A 6/2000 Rothmuller
6,075,551 A 6/2000 Berezowski et al.
6,075,575 A 6/2000 Schein et al.
6,078,348 A 6/2000 Klosterman et al.
6,081,291 A 6/2000 Ludwig, Jr.
6,081,750 A 6/2000 Hoffberg et al.
6,081,830 A 6/2000 Schindler
6,088,722 A 7/2000 Herz et al.
6,088,945 A 7/2000 Sanderfoot
6,091,883 A 7/2000 Artigalas et al.
6,091,884 A 7/2000 Yuen et al.
RE36,801 E 8/2000 Logan et al.
6,097,383 A 8/2000 Gaughan et al.
6,097,441 A 8/2000 Allport
6,098,065 A 8/2000 Skillen et al.
6,104,334 A 8/2000 Allport
6,104,705 A 8/2000 Ismail et al.
6,108,042 A 8/2000 Adams et al.
6,111,614 A 8/2000 Mugura et al.
6,112,186 A 8/2000 Bergh et al.
6,115,057 A 9/2000 Kwoh et al.
6,118,492 A 9/2000 Milnes et al.
6,119,098 A 9/2000 Guyot et al.
6,119,101 A 9/2000 Peckover
6,122,011 A 9/2000 Dias et al.
6,124,854 A 9/2000 Sartain et al.
6,125,230 A 9/2000 Yaginuma
6,130,726 A 10/2000 Darbee et al.
6,133,909 A 10/2000 Schein et al.
6,133,910 A 10/2000 Stinebruner
6,139,177 A 10/2000 Venkatraman et al.
6,141,003 A 10/2000 Chor et al.
6,141,488 A 10/2000 Knudson et al.
6,147,714 A 11/2000 Terasawa et al.
6,147,715 A 11/2000 Yuen et al.
6,151,059 A 11/2000 Schein et al.
6,151,643 A 11/2000 Cheng et al.
6,154,203 A 11/2000 Yuen et al.
6,154,752 A 11/2000 Ryan
6,154,771 A 11/2000 Rangan et al.
6,155,001 A 12/2000 Marin
6,157,411 A 12/2000 Williams et al.
6,157,413 A 12/2000 Hanafee et al.
6,157,809 A 12/2000 Kambayashi
6,160,545 A 12/2000 Eyer et al.
6,160,546 A 12/2000 Thompson et al.
6,160,570 A 12/2000 Sitnik
6,160,989 A 12/2000 Hendricks et al.
6,163,316 A 12/2000 Killian
6,163,345 A 12/2000 Noguchi et al.
6,166,778 A 12/2000 Yamamoto et al.
6,167,188 A 12/2000 Young et al.
6,169,542 B1 1/2001 Hooks et al.
6,169,984 B1 1/2001 Bogdan
6,172,674 B1 1/2001 Etheredge
6,172,677 B1 1/2001 Stautner et al.
6,173,271 B1 1/2001 Goodman et al.
6,175,362 B1 1/2001 Harms et al.
6,177,931 B1 * 1/2001 Alexander et al. .............. 725/52
6,178,446 B1 1/2001 Gerszberg et al.
6,181,335 B1 1/2001 Hendricks et al.
6,184,877 B1 2/2001 Dodson et al.
6,185,360 B1 2/2001 Inoue et al.

(56) References Cited

U.S. PATENT DOCUMENTS

| | | | |
|---|---|---|---|
| 6,186,287 | B1 | 2/2001 | Heidenreich et al. |
| 6,186,443 | B1 | 2/2001 | Shaffer |
| 6,189,002 | B1 | 2/2001 | Roitblat |
| 6,191,780 | B1 | 2/2001 | Martin et al. |
| 6,195,501 | B1 | 2/2001 | Perry et al. |
| 6,201,536 | B1 | 3/2001 | Hendricks et al. |
| 6,202,058 | B1 | 3/2001 | Rose et al. |
| 6,202,212 | B1 | 3/2001 | Sturgeon et al. |
| 6,204,848 | B1 | 3/2001 | Nowlan et al. |
| 6,208,335 | B1 | 3/2001 | Gordon et al. |
| 6,208,384 | B1 | 3/2001 | Schultheiss |
| 6,208,799 | B1 | 3/2001 | Marsh et al. |
| 6,209,129 | B1 | 3/2001 | Carr et al. |
| 6,209,130 | B1 | 3/2001 | Rector, Jr. et al. |
| 6,212,553 | B1 | 4/2001 | Lee et al. |
| 6,216,112 | B1 | 4/2001 | Fuller et al. |
| 6,216,264 | B1 | 4/2001 | Maze et al. |
| 6,219,839 | B1 | 4/2001 | Sampsell |
| 6,223,059 | B1 | 4/2001 | Haestrup |
| 6,226,447 | B1 | 5/2001 | Sasaki et al. |
| 6,233,389 | B1 | 5/2001 | Barton et al. |
| 6,233,734 | B1 | 5/2001 | Macrae et al. |
| 6,237,049 | B1 | 5/2001 | Ludtke |
| 6,237,145 | B1 | 5/2001 | Narasimhan et al. |
| 6,237,146 | B1 | 5/2001 | Richards et al. |
| 6,239,794 | B1 | 5/2001 | Yuen et al. |
| 6,240,555 | B1 | 5/2001 | Shoff et al. |
| 6,243,129 | B1 | 6/2001 | Deierling |
| 6,253,203 | B1 | 6/2001 | O'Flaherty et al. |
| 6,256,071 | B1 | 7/2001 | Hiroi |
| 6,256,785 | B1 | 7/2001 | Klappert et al. |
| 6,257,268 | B1 | 7/2001 | Hope et al. |
| 6,260,050 | B1 | 7/2001 | Yost et al. |
| 6,262,721 | B1 | 7/2001 | Tsukidate et al. |
| 6,262,772 | B1 | 7/2001 | Shen et al. |
| 6,263,501 | B1 | 7/2001 | Schein et al. |
| 6,263,505 | B1 | 7/2001 | Walker et al. |
| 6,263,507 | B1 | 7/2001 | Ahmad et al. |
| 6,266,048 | B1 | 7/2001 | Carau, Sr. |
| 6,266,814 | B1 | 7/2001 | Lemmons et al. |
| 6,268,849 | B1 | 7/2001 | Boyer et al. |
| 6,269,361 | B1 | 7/2001 | Davis et al. |
| 6,275,268 | B1 | 8/2001 | Ellis et al. |
| 6,275,648 | B1 | 8/2001 | Knudson et al. |
| 6,275,989 | B1 | 8/2001 | Broadwin et al. |
| 6,279,157 | B1 | 8/2001 | Takasu |
| 6,282,713 | B1 | 8/2001 | Kitsukawa et al. |
| 6,285,713 | B1 | 9/2001 | Nakaya et al. |
| 6,286,064 | B1 | 9/2001 | King et al. |
| 6,286,140 | B1 | 9/2001 | Ivanyi |
| 6,289,346 | B1 | 9/2001 | Milewski et al. |
| 6,292,804 | B1 | 9/2001 | Ardoin et al. |
| 6,298,482 | B1 | 10/2001 | Seidman et al. |
| 6,307,548 | B1 | 10/2001 | Flinchem et al. |
| 6,307,549 | B1 | 10/2001 | King et al. |
| 6,310,886 | B1 | 10/2001 | Barton |
| 6,311,877 | B1 | 11/2001 | Yang |
| 6,312,336 | B1 | 11/2001 | Handelman et al. |
| 6,314,575 | B1 | 11/2001 | Billock et al. |
| 6,317,784 | B1 | 11/2001 | Mackintosh et al. |
| 6,317,885 | B1 | 11/2001 | Fries |
| 6,320,588 | B1 | 11/2001 | Palmer et al. |
| 6,323,911 | B1 | 11/2001 | Schein et al. |
| 6,323,931 | B1 | 11/2001 | Fujita et al. |
| 6,324,338 | B1 | 11/2001 | Wood et al. |
| 6,326,982 | B1 | 12/2001 | Wu et al. |
| 6,327,049 | B1 | 12/2001 | Ohtsuka |
| 6,327,418 | B1 | 12/2001 | Barton |
| 6,331,877 | B1 | 12/2001 | Bennington et al. |
| 6,334,022 | B1 | 12/2001 | Ohba et al. |
| 6,335,722 | B1 | 1/2002 | Tani et al. |
| 6,335,963 | B1 | 1/2002 | Bosco |
| 6,341,195 | B1 | 1/2002 | Mankovitz et al. |
| 6,341,374 | B2 | 1/2002 | Schein et al. |
| 6,342,926 | B1 | 1/2002 | Hanafee et al. |
| 6,349,410 | B1 | 2/2002 | Lortz |
| 6,357,042 | B2 | 3/2002 | Srinivasan et al. |
| 6,357,043 | B1 | 3/2002 | Ellis et al. |
| 6,359,636 | B1 | 3/2002 | Schindler et al. |
| 6,363,525 | B1 | 3/2002 | Dougherty et al. |
| 6,366,890 | B1 | 4/2002 | Usrey |
| 6,367,080 | B1 | 4/2002 | Enomoto et al. |
| 6,373,528 | B1 | 4/2002 | Bennington et al. |
| 6,377,945 | B1 | 4/2002 | Risvik |
| 6,381,582 | B1 | 4/2002 | Walker et al. |
| 6,388,714 | B1 | 5/2002 | Schein et al. |
| 6,389,593 | B1 | 5/2002 | Yamagishi |
| 6,392,710 | B1 | 5/2002 | Gonsalves et al. |
| 6,396,546 | B1 | 5/2002 | Alten et al. |
| 6,400,407 | B1 | 6/2002 | Zigmond et al. |
| 6,405,371 | B1 | 6/2002 | Oosterhout et al. |
| 6,408,437 | B1 | 6/2002 | Hendricks et al. |
| 6,411,308 | B1 | 6/2002 | Blonstein et al. |
| 6,411,696 | B1 | 6/2002 | Iverson et al. |
| 6,412,110 | B1 | 6/2002 | Schein et al. |
| 6,415,438 | B1 | 7/2002 | Blackketter et al. |
| 6,418,556 | B1 | 7/2002 | Bennington et al. |
| 6,421,067 | B1 | 7/2002 | Kamen et al. |
| 6,426,779 | B1 | 7/2002 | Noguchi et al. |
| 6,430,743 | B1 | 8/2002 | Matsuura |
| 6,437,836 | B1 | 8/2002 | Huang et al. |
| 6,438,579 | B1 | 8/2002 | Hosken |
| 6,438,751 | B1 | 8/2002 | Voyticky et al. |
| 6,441,832 | B1 | 8/2002 | Tao et al. |
| 6,442,332 | B1 | 8/2002 | Knudson et al. |
| 6,446,261 | B1 | 9/2002 | Rosser |
| 6,453,471 | B1 | 9/2002 | Klosterman |
| RE37,881 | E | 10/2002 | Haines |
| 6,460,180 | B1 | 10/2002 | Park et al. |
| 6,463,585 | B1 | 10/2002 | Hendricks et al. |
| 6,466,933 | B1 | 10/2002 | Huang et al. |
| 6,469,753 | B1 | 10/2002 | Klosterman et al. |
| 6,470,497 | B1 | 10/2002 | Ellis et al. |
| 6,473,559 | B1 | 10/2002 | Knudson et al. |
| 6,477,579 | B1 | 11/2002 | Kunkel et al. |
| 6,477,705 | B1 | 11/2002 | Yuen et al. |
| 6,480,667 | B1 | 11/2002 | O'Connor |
| 6,483,986 | B1 | 11/2002 | Krapf |
| 6,486,892 | B1 | 11/2002 | Stern |
| 6,486,920 | B2 | 11/2002 | Arai et al. |
| 6,487,362 | B1 | 11/2002 | Yuen et al. |
| 6,493,876 | B1 | 12/2002 | DeFreese et al. |
| 6,498,895 | B2 | 12/2002 | Young et al. |
| 6,499,138 | B1 | 12/2002 | Swix et al. |
| 6,505,348 | B1 | 1/2003 | Knowles et al. |
| 6,507,953 | B1 | 1/2003 | Horlander et al. |
| 6,509,908 | B1 | 1/2003 | Croy et al. |
| 6,515,680 | B1 | 2/2003 | Hendricks et al. |
| 6,516,323 | B1 | 2/2003 | Kamba |
| 6,516,467 | B1 | 2/2003 | Schindler et al. |
| 6,526,577 | B1 | 2/2003 | Knudson et al. |
| 6,529,903 | B2 | 3/2003 | Smith |
| 6,530,082 | B1 | 3/2003 | Del Sesto et al. |
| 6,536,515 | B2 | 3/2003 | Freitag et al. |
| 6,539,548 | B1 | 3/2003 | Hendricks et al. |
| 6,542,169 | B1 | 4/2003 | Marshall et al. |
| 6,545,722 | B1 | 4/2003 | Schultheiss et al. |
| 6,546,399 | B1 | 4/2003 | Reed et al. |
| 6,546,556 | B1 | 4/2003 | Kataoka et al. |
| 6,564,005 | B1 | 5/2003 | Berstis |
| 6,564,213 | B1 | 5/2003 | Ortega et al. |
| 6,564,313 | B1 | 5/2003 | Kashyap |
| 6,564,378 | B1 | 5/2003 | Satterfield et al. |
| 6,564,379 | B1 | 5/2003 | Knudson et al. |
| 6,567,892 | B1 | 5/2003 | Horst et al. |
| 6,567,982 | B1 | 5/2003 | Howe et al. |
| 6,571,390 | B1 | 5/2003 | Dunn et al. |
| 6,574,424 | B1 | 6/2003 | Dimitri et al. |
| 6,580,870 | B1 | 6/2003 | Kanazawa et al. |
| 6,588,013 | B1 | 7/2003 | Lumley et al. |
| 6,591,058 | B1 | 7/2003 | O'Connor et al. |
| 6,594,657 | B1 | 7/2003 | Livowsky et al. |
| 6,600,364 | B1 | 7/2003 | Liang et al. |
| 6,600,496 | B1 | 7/2003 | Wagner et al. |

(56) References Cited

U.S. PATENT DOCUMENTS 6,600,503 B2 7/2003 Stautner et al.
6,601,074 B1 7/2003 Liebenow
6,606,128 B2 8/2003 Hanafee et al.
6,611,654 B1 8/2003 Shteyn
6,611,842 B1 8/2003 Brown
6,611,958 B1 8/2003 Shintani et al.
6,614,455 B1 9/2003 Cuijpers et al.
6,614,987 B1 9/2003 Ismail et al.
6,615,248 B1 9/2003 Smith
6,622,306 B1 9/2003 Kamada
6,631,496 B1 10/2003 Li et al.
6,631,523 B1 10/2003 Matthews, III et al.
6,637,029 B1 10/2003 Maissel et al.
6,640,337 B1 10/2003 Lu
6,646,685 B1 11/2003 Kim
6,651,251 B1 11/2003 Shoff et al.
6,660,503 B2 12/2003 Kierulff
6,661,468 B2 12/2003 Alten et al.
6,662,177 B1 12/2003 Martino et al.
6,664,980 B2 12/2003 Bryan et al.
6,665,869 B1 12/2003 Ellis et al.
6,668,377 B1 12/2003 Dunn
6,670,971 B1 12/2003 Oral et al.
6,675,385 B1 1/2004 Wang
6,675,386 B1 1/2004 Hendricks et al.
6,678,706 B1 1/2004 Fishel
6,681,396 B1 1/2004 Bates et al.
6,687,906 B1 2/2004 Yuen et al.
6,696,373 B2 2/2004 Kinn et al.
6,698,020 B1 2/2004 Zigmond et al.
6,704,931 B1 3/2004 Schaffer et al.
6,715,126 B1 3/2004 Chang et al.
6,718,324 B2 4/2004 Edlund et al.
6,718,551 B1 4/2004 Swix et al.
6,721,954 B1 4/2004 Nickum
6,727,914 B1 4/2004 Gutta
6,728,967 B2 4/2004 Bennington et al.
6,732,369 B1 5/2004 Schein et al.
6,734,881 B1 5/2004 Will
6,735,695 B1 5/2004 Gopalakrishnan et al.
6,738,978 B1 5/2004 Hendricks et al.
6,742,183 B1 5/2004 Reynolds et al.
6,744,967 B2 6/2004 Kaminski et al.
6,745,391 B1 6/2004 Macrae et al.
6,751,800 B1 6/2004 Fukuda et al.
6,754,904 B1 6/2004 Cooper et al.
6,756,987 B2 6/2004 Goyins et al.
6,756,997 B1 6/2004 Ward, III et al.
6,757,906 B1 6/2004 Look et al.
6,760,537 B2 7/2004 Mankovitz
6,760,538 B1 7/2004 Bumgardner et al.
6,766,100 B1 7/2004 Komar et al.
6,766,526 B1 7/2004 Ellis
6,771,317 B2 8/2004 Ellis et al.
6,771,886 B1 8/2004 Mendelsohn
6,772,147 B2 8/2004 Wang
6,785,671 B1 8/2004 Bailey et al.
6,788,882 B1 9/2004 Geer et al.
6,792,618 B1 9/2004 Bendinelli et al.
6,799,326 B2 9/2004 Boylan, III et al.
6,799,327 B1 9/2004 Reynolds et al.
6,801,909 B2 10/2004 Delgado et al.
6,802,074 B1 10/2004 Mitsui et al.
6,820,278 B1 11/2004 Ellis
6,828,993 B1 12/2004 Hendricks et al.
6,837,791 B1 1/2005 Ramsey et al.
6,839,702 B1 1/2005 Patel et al.
6,839,705 B1 1/2005 Grooters
6,847,387 B2 1/2005 Roth
6,850,693 B2 2/2005 Young et al.
6,857,131 B1 2/2005 Yagawa et al.
6,865,575 B1 3/2005 Smith
6,865,746 B1 3/2005 Herrington et al.
6,868,551 B1 3/2005 Lawler et al.
6,898,762 B2 5/2005 Ellis et al.
6,907,273 B1 6/2005 Smethers
6,920,278 B1 7/2005 Yano et al.
6,920,281 B1 7/2005 Agnibotri et al.
6,925,035 B2 8/2005 Ueki
6,925,567 B1 8/2005 Hirata et al.
6,934,964 B1 8/2005 Schaffer et al.
6,938,208 B2 8/2005 Reichardt
6,965,374 B2 11/2005 Villet et al.
6,973,669 B2 12/2005 Daniels
6,983,478 B1 1/2006 Grauch et al.
6,983,483 B2 1/2006 Maze et al.
6,985,188 B1 1/2006 Hurst, Jr.
7,003,792 B1 2/2006 Yuen
7,007,294 B1 2/2006 Kurapati
7,013,304 B1 3/2006 Schuetze et al.
7,013,478 B1 3/2006 Hendricks et al.
7,017,118 B1 3/2006 Carroll
7,017,179 B1 3/2006 Asamoto et al.
7,027,716 B1 4/2006 Boyle et al.
7,028,326 B1 4/2006 Westlake et al.
7,029,935 B2 4/2006 Negley et al.
7,039,935 B2 5/2006 Knudson et al.
7,047,241 B1 5/2006 Erickson
7,047,550 B1 5/2006 Yasukawa et al.
7,050,988 B2 5/2006 Atcheson et al.
7,053,964 B2 5/2006 Moon
7,058,635 B1 6/2006 Shah-Nazaroff et al.
7,065,709 B2 6/2006 Ellis et al.
7,069,576 B1 6/2006 Knudson et al.
7,073,187 B1 7/2006 Hendricks et al.
7,088,910 B2 8/2006 Potrebic et al.
7,096,486 B1 8/2006 Ukai et al.
7,100,185 B2 8/2006 Bennington et al.
7,117,207 B1 10/2006 Kerschberg et al.
7,117,518 B1 10/2006 Takahashi et al.
7,130,866 B2 10/2006 Schaffer
7,134,131 B1 11/2006 Hendricks et al.
7,136,845 B2 11/2006 Chandrasekar et al.
7,136,854 B2 11/2006 Smith
7,143,430 B1 11/2006 Fingerman et al.
7,146,627 B1 12/2006 Ismail et al.
7,159,232 B1 1/2007 Blackketter et al.
7,165,098 B1 1/2007 Boyer et al.
7,181,128 B1 2/2007 Wada et al.
7,185,355 B1 2/2007 Ellis et al.
7,187,847 B2 3/2007 Young et al.
7,191,238 B2 3/2007 Uchida
7,200,859 B1 4/2007 Perlman et al.
7,209,640 B2 4/2007 Young et al.
7,209,915 B1 4/2007 Taboada et al.
7,213,256 B1 5/2007 Kikinis
7,218,839 B2 5/2007 Plourde, Jr. et al.
7,225,180 B2 5/2007 Donaldson et al.
7,225,184 B2 5/2007 Carrasco et al.
7,225,455 B2 5/2007 Bennington et al.
7,229,012 B1 6/2007 Enright et al.
7,229,354 B2 6/2007 McNutt et al.
7,243,139 B2 7/2007 Ullman et al.
7,266,833 B2 9/2007 Ward, III et al.
7,287,267 B2 10/2007 Knudson et al.
7,293,231 B1 11/2007 Gunn et al.
7,293,276 B2 11/2007 Phillips et al.
7,328,450 B2 2/2008 Macrae et al.
7,349,976 B1 3/2008 Glaser et al.
7,356,246 B1 4/2008 Kobb
7,363,645 B1 4/2008 Hendricks
7,369,749 B2 5/2008 Ichioka et al.
7,369,750 B2 5/2008 Cheng et al.
7,370,342 B2 5/2008 Ismail et al.
7,392,532 B2 6/2008 White et al.
7,398,541 B2 7/2008 Bennington et al.
7,403,935 B2 7/2008 Horvitz et al.
7,412,441 B2 8/2008 Scott, III et al.
7,437,751 B2 10/2008 Daniels
7,440,677 B2 10/2008 Strasser
7,440,993 B1 10/2008 Philyaw et al.
7,454,515 B2 11/2008 Lamkin et al.
7,454,772 B2 11/2008 Fellenstein et al.
7,461,061 B2 12/2008 Aravamudan et al.

(56) References Cited

U.S. PATENT DOCUMENTS

| | | | |
|---|---|---|---|
| 7,477,832 | B2 | 1/2009 | Young et al. |
| 7,480,929 | B2 | 1/2009 | Klosterman et al. |
| 7,487,151 | B2 | 2/2009 | Yamamoto et al. |
| 7,487,528 | B2 | 2/2009 | Satterfield et al. |
| 7,487,529 | B1 | 2/2009 | Orlick |
| 7,493,641 | B2 | 2/2009 | Klosterman et al. |
| 7,503,055 | B2 | 3/2009 | Reynolds et al. |
| 7,506,350 | B2 | 3/2009 | Johnson |
| 7,519,268 | B2 | 4/2009 | Juen et al. |
| 7,529,741 | B2 | 5/2009 | Aravamudan et al. |
| 7,539,676 | B2 | 5/2009 | Aravamudan et al. |
| 7,540,010 | B2 | 5/2009 | Hanaya et al. |
| 7,577,336 | B2 | 8/2009 | Srinivasan et al. |
| 7,590,993 | B1 | 9/2009 | Hendricks et al. |
| 7,594,244 | B2 | 9/2009 | Scholl et al. |
| 7,599,753 | B2 | 10/2009 | Taylor et al. |
| 7,603,685 | B2 | 10/2009 | Knudson et al. |
| 7,634,786 | B2 | 12/2009 | Knee et al. |
| 7,665,109 | B2 | 2/2010 | Matthews, III et al. |
| 7,679,534 | B2 | 3/2010 | Kay et al. |
| 7,683,886 | B2 | 3/2010 | Willey |
| 7,685,197 | B2 | 3/2010 | Fain et al. |
| 7,685,620 | B2 | 3/2010 | Fellenstein et al. |
| 7,689,995 | B1 | 3/2010 | Francis et al. |
| 7,707,617 | B2 | 4/2010 | Birleson |
| 7,712,053 | B2 | 5/2010 | Bradford et al. |
| 7,721,307 | B2 | 5/2010 | Hendricks et al. |
| 7,725,467 | B2 | 5/2010 | Yamamoto et al. |
| 7,725,485 | B1 | 5/2010 | Sahami et al. |
| 7,725,486 | B2 | 5/2010 | Tsuzuki et al. |
| 7,739,280 | B2 | 6/2010 | Aravamudan et al. |
| 7,757,250 | B1 | 7/2010 | Horvitz et al. |
| 7,757,254 | B2 | 7/2010 | Shoff et al. |
| 7,770,196 | B1 | 8/2010 | Hendricks |
| 7,774,294 | B2 | 8/2010 | Aravamudan et al. |
| 7,774,341 | B2 | 8/2010 | Aravamudan et al. |
| 7,778,158 | B2 | 8/2010 | Vogel et al. |
| 7,779,437 | B2 | 8/2010 | Barton |
| 7,792,815 | B2 | 9/2010 | Aravamudan et al. |
| 7,793,326 | B2 | 9/2010 | McCoskey et al. |
| 7,801,888 | B2 | 9/2010 | Rao et al. |
| 7,823,055 | B2 | 10/2010 | Sull et al. |
| 7,835,998 | B2 | 11/2010 | Aravamudan et al. |
| 7,840,577 | B2 | 11/2010 | Ortega et al. |
| 7,859,571 | B1 | 12/2010 | Brown et al. |
| 7,882,520 | B2 | 2/2011 | Beach et al. |
| 7,885,904 | B2 | 2/2011 | Aravamudan et al. |
| 7,895,218 | B2 | 2/2011 | Venkataraman et al. |
| 7,925,141 | B2 | 4/2011 | Geer et al. |
| 7,996,864 | B2 | 8/2011 | Yuen et al. |
| 8,051,450 | B2 | 11/2011 | Robarts et al. |
| 8,065,702 | B2 | 11/2011 | Goldberg et al. |
| 8,078,751 | B2 | 12/2011 | Janik et al. |
| 8,087,050 | B2 | 12/2011 | Ellis et al. |
| 8,112,776 | B2 | 2/2012 | Schein et al. |
| 8,265,458 | B2 | 9/2012 | Helmstetter |
| 8,275,764 | B2 | 9/2012 | Jeon et al. |
| 8,363,679 | B2 | 1/2013 | Sorenson et al. |
| 8,478,750 | B2 | 7/2013 | Rao et al. |
| 8,490,134 | B2 | 7/2013 | Gerba et al. |
| 8,613,020 | B2 | 12/2013 | Knudson et al. |
| 8,635,649 | B2 | 1/2014 | Ward, III et al. |
| 8,707,366 | B2 | 4/2014 | Wong et al. |
| 2001/0001160 | A1 | 5/2001 | Shoff et al. |
| 2001/0013122 | A1 | 8/2001 | Hirata |
| 2001/0013124 | A1 | 8/2001 | Klosterman et al. |
| 2001/0019338 | A1 | 9/2001 | Roth |
| 2001/0025375 | A1 | 9/2001 | Ahmad et al. |
| 2001/0027555 | A1 | 10/2001 | Franken et al. |
| 2001/0027562 | A1 | 10/2001 | Schein et al. |
| 2001/0028782 | A1 | 10/2001 | Ohno et al. |
| 2001/0029610 | A1 | 10/2001 | Corvin et al. |
| 2001/0034237 | A1 | 10/2001 | Garahi |
| 2001/0042246 | A1 | 11/2001 | Yuen et al. |
| 2001/0043795 | A1 | 11/2001 | Wood et al. |
| 2001/0044759 | A1 | 11/2001 | Kutsumi et al. |
| 2001/0047298 | A1 | 11/2001 | Moore et al. |
| 2001/0049820 | A1 | 12/2001 | Barton |
| 2001/0054181 | A1 | 12/2001 | Corvin |
| 2002/0002550 | A1 | 1/2002 | Berman |
| 2002/0009283 | A1 | 1/2002 | Ichioka et al. |
| 2002/0026496 | A1 | 2/2002 | Boyer et al. |
| 2002/0032907 | A1 | 3/2002 | Daniels |
| 2002/0042791 | A1 | 4/2002 | Smith et al. |
| 2002/0042913 | A1 | 4/2002 | Ellis et al. |
| 2002/0042914 | A1 | 4/2002 | Walker et al. |
| 2002/0042918 | A1 | 4/2002 | Townsend et al. |
| 2002/0048448 | A1 | 4/2002 | Daniels |
| 2002/0049973 | A1 | 4/2002 | Alten et al. |
| 2002/0052873 | A1 | 5/2002 | Delgado et al. |
| 2002/0056098 | A1 | 5/2002 | White |
| 2002/0057893 | A1 | 5/2002 | Wood et al. |
| 2002/0059599 | A1 | 5/2002 | Schein et al. |
| 2002/0059602 | A1 | 5/2002 | Macrae et al. |
| 2002/0059621 | A1 | 5/2002 | Thomas et al. |
| 2002/0073424 | A1 | 6/2002 | Ward et al. |
| 2002/0078450 | A1 | 6/2002 | Bennington et al. |
| 2002/0083439 | A1 | 6/2002 | Eldering |
| 2002/0083448 | A1 | 6/2002 | Johnson |
| 2002/0087981 | A1 | 7/2002 | Daniels |
| 2002/0090203 | A1 | 7/2002 | Mankovitz |
| 2002/0092017 | A1 | 7/2002 | Klosterman et al. |
| 2002/0095676 | A1 | 7/2002 | Knee et al. |
| 2002/0104096 | A1 | 8/2002 | Cramer et al. |
| 2002/0112249 | A1 | 8/2002 | Hendricks et al. |
| 2002/0116291 | A1 | 8/2002 | Grasso et al. |
| 2002/0120933 | A1 | 8/2002 | Knudson et al. |
| 2002/0124249 | A1 | 9/2002 | Shintani et al. |
| 2002/0129368 | A1* | 9/2002 | Schlack et al. .................. 725/46 |
| 2002/0133481 | A1 | 9/2002 | Smith et al. |
| 2002/0138840 | A1 | 9/2002 | Schein et al. |
| 2002/0144267 | A1 | 10/2002 | Gutta et al. |
| 2002/0144279 | A1 | 10/2002 | Zhou |
| 2002/0147976 | A1 | 10/2002 | Yuen et al. |
| 2002/0147977 | A1 | 10/2002 | Hammett et al. |
| 2002/0152190 | A1 | 10/2002 | Biebesheimer et al. |
| 2002/0154157 | A1 | 10/2002 | Sherr et al. |
| 2002/0154888 | A1 | 10/2002 | Allen et al. |
| 2002/0174424 | A1 | 11/2002 | Chang et al. |
| 2002/0174430 | A1 | 11/2002 | Ellis et al. |
| 2002/0174433 | A1 | 11/2002 | Baumgartner et al. |
| 2002/0184626 | A1 | 12/2002 | Darbee et al. |
| 2002/0188488 | A1 | 12/2002 | Hinkle |
| 2002/0191954 | A1 | 12/2002 | Beach et al. |
| 2002/0194595 | A1 | 12/2002 | Miller et al. |
| 2002/0194596 | A1 | 12/2002 | Srivastava |
| 2002/0199185 | A1 | 12/2002 | Kaminski et al. |
| 2003/0005432 | A1 | 1/2003 | Ellis et al. |
| 2003/0005445 | A1 | 1/2003 | Schein et al. |
| 2003/0005452 | A1 | 1/2003 | Rodriguez |
| 2003/0005462 | A1 | 1/2003 | Broadus et al. |
| 2003/0009766 | A1 | 1/2003 | Marolda |
| 2003/0011573 | A1 | 1/2003 | Villet et al. |
| 2003/0014753 | A1 | 1/2003 | Beach et al. |
| 2003/0023976 | A1 | 1/2003 | Kamen et al. |
| 2003/0031465 | A1 | 2/2003 | Blake |
| 2003/0037333 | A1 | 2/2003 | Ghashghai et al. |
| 2003/0046698 | A1 | 3/2003 | Kamen et al. |
| 2003/0051240 | A1 | 3/2003 | Schaffer et al. |
| 2003/0066068 | A1 | 4/2003 | Gutta et al. |
| 2003/0066079 | A1 | 4/2003 | Suga |
| 2003/0066089 | A1 | 4/2003 | Andersen |
| 2003/0067554 | A1* | 4/2003 | Klarfeld et al. ............... 348/461 |
| 2003/0070182 | A1 | 4/2003 | Pierre et al. |
| 2003/0084270 | A1 | 5/2003 | Coon et al. |
| 2003/0088872 | A1* | 5/2003 | Maissel et al. .................. 725/46 |
| 2003/0088873 | A1 | 5/2003 | McCoy et al. |
| 2003/0098891 | A1 | 5/2003 | Molander |
| 2003/0103088 | A1 | 6/2003 | Dresti et al. |
| 2003/0110494 | A1 | 6/2003 | Bennington et al. |
| 2003/0110495 | A1 | 6/2003 | Bennington et al. |
| 2003/0110499 | A1 | 6/2003 | Knudson et al. |
| 2003/0115599 | A1 | 6/2003 | Bennington et al. |
| 2003/0115602 | A1 | 6/2003 | Knee et al. |

(56) References Cited

U.S. PATENT DOCUMENTS

2003/0118323 A1 6/2003 Ismail et al.
2003/0126607 A1 7/2003 Phillips et al.
2003/0135490 A1 7/2003 Barrett et al.
2003/0145323 A1 7/2003 Hendricks et al.
2003/0149988 A1 8/2003 Ellis et al.
2003/0154138 A1 8/2003 Phillips et al.
2003/0163813 A1 8/2003 Klosterman et al.
2003/0164858 A1 9/2003 Klosterman et al.
2003/0177494 A1 9/2003 Satterfield et al.
2003/0182659 A1 9/2003 Ellis et al.
2003/0182661 A1 9/2003 Ellis et al.
2003/0188310 A1 10/2003 Klosterman et al.
2003/0188311 A1 10/2003 Yuen et al.
2003/0188314 A1 10/2003 Ellis et al.
2003/0192050 A1 10/2003 Fellenstein et al.
2003/0196201 A1 10/2003 Schein et al.
2003/0196203 A1 10/2003 Ellis et al.
2003/0198462 A1 10/2003 Bumgardner et al.
2003/0204847 A1 10/2003 Ellis et al.
2003/0206719 A1 11/2003 Bumgardner et al.
2003/0208756 A1 11/2003 Macrae et al.
2003/0208758 A1 11/2003 Schein et al.
2003/0208759 A1 11/2003 Gordon et al.
2003/0210898 A1 11/2003 Juen et al.
2003/0212996 A1 11/2003 Wolzien
2003/0217121 A1 11/2003 Willis
2003/0226144 A1 12/2003 Thurston et al.
2003/0226146 A1 12/2003 Thurston et al.
2003/0229900 A1 12/2003 Reisman
2003/0237096 A1 12/2003 Barrett et al.
2004/0003407 A1 1/2004 Hanafee et al.
2004/0015397 A1 1/2004 Barry et al.
2004/0021691 A1 2/2004 Dostie et al.
2004/0024777 A1 2/2004 Schaffer
2004/0046744 A1 3/2004 Rafii et al.
2004/0049783 A1 3/2004 Lemmons et al.
2004/0049787 A1 3/2004 Maissel et al.
2004/0049794 A1 3/2004 Shao et al.
2004/0054520 A1 3/2004 Dehlinger et al.
2004/0060063 A1 3/2004 Russ et al.
2004/0070594 A1 4/2004 Burke
2004/0073923 A1 4/2004 Wasserman
2004/0073926 A1 4/2004 Nakamura et al.
2004/0078809 A1 4/2004 Drazin
2004/0078815 A1 4/2004 Lemmons et al.
2004/0078816 A1 4/2004 Johnson
2004/0078820 A1 4/2004 Nickum
2004/0088729 A1 5/2004 Petrovic et al.
2004/0093616 A1 5/2004 Johnson
2004/0098744 A1 5/2004 Gutta
2004/0103434 A1 5/2004 Ellis
2004/0103439 A1 5/2004 Macrae et al.
2004/0111742 A1 6/2004 Hendricks et al.
2004/0111745 A1 6/2004 Schein et al.
2004/0128686 A1 7/2004 Boyer et al.
2004/0133655 A1 7/2004 Yen et al.
2004/0133910 A1 7/2004 Gordon et al.
2004/0139091 A1 7/2004 Shin
2004/0139465 A1 7/2004 Matthews et al.
2004/0143569 A1 7/2004 Gross et al.
2004/0156614 A1 8/2004 Bumgardner et al.
2004/0160862 A1 8/2004 Ueki
2004/0163032 A1 8/2004 Guo et al.
2004/0168189 A1 8/2004 Reynolds et al.
2004/0172661 A1 9/2004 Yagawa et al.
2004/0181814 A1 9/2004 Ellis et al.
2004/0187164 A1 9/2004 Kandasamy et al.
2004/0194131 A1 9/2004 Ellis et al.
2004/0194138 A1 9/2004 Boylan et al.
2004/0194141 A1 9/2004 Sanders
2004/0205065 A1 10/2004 Petras et al.
2004/0210932 A1 10/2004 Mori et al.
2004/0210935 A1 10/2004 Schein et al.
2004/0216160 A1 10/2004 Lemmons et al.
2004/0221308 A1 11/2004 Cuttner et al.
2004/0221310 A1 11/2004 Herrington et al.
2004/0254911 A1 12/2004 Grasso et al.
2004/0261021 A1 12/2004 Mittal et al.
2004/0264920 A1 12/2004 Helmstetter
2005/0010949 A1 1/2005 Ward et al.
2005/0015366 A1 1/2005 Carrasco et al.
2005/0015804 A1 1/2005 LaJoie et al.
2005/0015815 A1 1/2005 Shoff et al.
2005/0028218 A1 2/2005 Blake
2005/0071874 A1 3/2005 Elcock et al.
2005/0086234 A1 4/2005 Tosey
2005/0086691 A1 4/2005 Dudkiewicz et al.
2005/0086692 A1 4/2005 Dudkiewicz et al.
2005/0097622 A1 5/2005 Zigmond et al.
2005/0125240 A9 6/2005 Speiser et al.
2005/0125307 A1 6/2005 Hunt et al.
2005/0129049 A1 6/2005 Srinivasan et al.
2005/0132264 A1 6/2005 Joshi et al.
2005/0138660 A1 6/2005 Boyer et al.
2005/0155056 A1 7/2005 Knee et al.
2005/0157217 A1 7/2005 Hendricks
2005/0174333 A1 8/2005 Robinson et al.
2005/0183123 A1 8/2005 Lee et al.
2005/0187945 A1 8/2005 Ehrich et al.
2005/0192944 A1 9/2005 Flinchem
2005/0198668 A1 9/2005 Yuen et al.
2005/0204382 A1 9/2005 Ellis
2005/0204388 A1 9/2005 Knudson et al.
2005/0210020 A1 9/2005 Gunn et al.
2005/0210383 A1 9/2005 Cucerzan et al.
2005/0210402 A1 9/2005 Gunn et al.
2005/0216936 A1 9/2005 Knudson et al.
2005/0223308 A1 10/2005 Gunn et al.
2005/0229214 A1 10/2005 Young et al.
2005/0229215 A1 10/2005 Schein et al.
2005/0235320 A1 10/2005 Maze et al.
2005/0235323 A1 10/2005 Ellis et al.
2005/0240580 A1 10/2005 Zamir et al.
2005/0240962 A1 10/2005 Cooper et al.
2005/0240968 A1 10/2005 Knudson et al.
2005/0244138 A1 11/2005 O'Connor et al.
2005/0246311 A1 11/2005 Whelan et al.
2005/0246324 A1 11/2005 Paalasmaa et al.
2005/0251827 A1 11/2005 Ellis et al.
2005/0267819 A1 12/2005 Kaplan
2005/0267994 A1 12/2005 Wong et al.
2005/0273819 A1 12/2005 Knudson et al.
2005/0278175 A1 12/2005 Hyvonen
2005/0278741 A1 12/2005 Robarts et al.
2005/0283468 A1 12/2005 Kamvar et al.
2005/0283796 A1 12/2005 Flickinger
2005/0283800 A1 12/2005 Ellis et al.
2006/0010477 A1 1/2006 Yu
2006/0036640 A1 2/2006 Tateno et al.
2006/0037044 A1 2/2006 Daniels
2006/0041843 A1 2/2006 Billsus et al.
2006/0059044 A1 3/2006 Chan et al.
2006/0075429 A1 4/2006 Istvan et al.
2006/0083484 A1 4/2006 Wada et al.
2006/0090182 A1 4/2006 Horowitz et al.
2006/0090185 A1 4/2006 Zito et al.
2006/0101499 A1 5/2006 Aravamudan et al.
2006/0101503 A1 5/2006 Venkataraman
2006/0101504 A1 5/2006 Aravamudan et al.
2006/0112162 A1 5/2006 Marot et al.
2006/0140584 A1 6/2006 Ellis et al.
2006/0161952 A1 7/2006 Herz et al.
2006/0163337 A1 7/2006 Unruh
2006/0167676 A1 7/2006 Plumb
2006/0167859 A1 7/2006 Verbeck Sibley et al.
2006/0176283 A1 8/2006 Suraqui
2006/0184989 A1 8/2006 Slothouber
2006/0195435 A1 8/2006 Laird-McConnell et al.
2006/0206815 A1 9/2006 Pathiyal et al.
2006/0212900 A1 9/2006 Ismail et al.
2006/0242178 A1 10/2006 Butterfield et al.
2006/0248555 A1 11/2006 Eldering
2006/0256070 A1 11/2006 Moosavi et al.
2006/0256078 A1 11/2006 Flinchem et al.

(56) References Cited

U.S. PATENT DOCUMENTS

2006/0259344 A1 11/2006 Patel et al.
2006/0261021 A1 11/2006 Stagnaro
2006/0274051 A1 12/2006 Longe et al.
2006/0282856 A1 12/2006 Errico et al.
2007/0005526 A1 1/2007 Whitney et al.
2007/0005563 A1 1/2007 Aravamudan
2007/0005576 A1 1/2007 Cutrell et al.
2007/0005653 A1 1/2007 Marsh
2007/0016862 A1 1/2007 Kuzmin
2007/0016926 A1 1/2007 Ward et al.
2007/0027852 A1 2/2007 Howard et al.
2007/0027861 A1 2/2007 Huentelman et al.
2007/0027871 A1 2/2007 Arbajian
2007/0033613 A1 2/2007 Ward et al.
2007/0043750 A1 2/2007 Dingle
2007/0044122 A1 2/2007 Scholl et al.
2007/0050337 A1 3/2007 Venkataraman et al.
2007/0050348 A1 3/2007 Aharoni et al.
2007/0061317 A1 3/2007 Ramer et al.
2007/0061321 A1 3/2007 Venkataraman
2007/0061753 A1 3/2007 Ng et al.
2007/0061754 A1 3/2007 Ardhanari et al.
2007/0074131 A1 3/2007 Assadollahi
2007/0088681 A1 4/2007 Aravamudan et al.
2007/0094024 A1 4/2007 Kristensson et al.
2007/0130128 A1 6/2007 Garg et al.
2007/0143567 A1 6/2007 Gorobets
2007/0150606 A1 6/2007 Flinchem et al.
2007/0157242 A1 7/2007 Cordray et al.
2007/0162934 A1 7/2007 Roop et al.
2007/0186240 A1 8/2007 Ward et al.
2007/0204308 A1 8/2007 Nicholas et al.
2007/0208718 A1 9/2007 Javid et al.
2007/0214480 A1 9/2007 Kamen
2007/0219984 A1 9/2007 Aravamudan et al.
2007/0226649 A1 9/2007 Agmon
2007/0234393 A1 10/2007 Walker et al.
2007/0240045 A1 10/2007 Fux et al.
2007/0242178 A1 10/2007 Kawasaki et al.
2007/0244902 A1 10/2007 Seide et al.
2007/0255693 A1 11/2007 Ramaswamy et al.
2007/0256070 A1 11/2007 Bykov et al.
2007/0260703 A1 11/2007 Ardhanari et al.
2007/0266406 A1 11/2007 Aravamudan et al.
2007/0271582 A1 11/2007 Ellis et al.
2007/0276821 A1 11/2007 Aravamudan et al.
2008/0066111 A1 3/2008 Ellis et al.
2008/0071771 A1 3/2008 Venkataraman et al.
2008/0086704 A1 4/2008 Aravamudan
2008/0109401 A1 5/2008 Sareen et al.
2008/0114743 A1 5/2008 Venkataraman et al.
2008/0115169 A1 5/2008 Ellis et al.
2008/0126303 A1 5/2008 Park et al.
2008/0127265 A1 5/2008 Ward et al.
2008/0127266 A1 5/2008 Ward et al.
2008/0178216 A1 7/2008 Bennington et al.
2008/0178221 A1 7/2008 Schein et al.
2008/0178222 A1 7/2008 Bennington et al.
2008/0178223 A1 7/2008 Kwoh et al.
2008/0184286 A1 7/2008 Kwoh et al.
2008/0184305 A1 7/2008 Schein et al.
2008/0184308 A1 7/2008 Herrington et al.
2008/0184312 A1 7/2008 Schein et al.
2008/0184315 A1 7/2008 Ellis et al.
2008/0184319 A1 7/2008 Mankovitz
2008/0189744 A1 8/2008 Schein et al.
2008/0209229 A1 8/2008 Ramakrishnan et al.
2008/0222106 A1 9/2008 Rao et al.
2008/0235725 A1 9/2008 Hendricks
2008/0281689 A1 11/2008 Blinnikka et al.
2008/0288980 A1 11/2008 Schein et al.
2009/0025033 A1 1/2009 Stautner et al.
2009/0031335 A1 1/2009 Hendricks et al.
2009/0049481 A1 2/2009 Fellenstein et al.
2009/0070817 A1 3/2009 Ellis et al.
2009/0077496 A1 3/2009 Aravamudan et al.
2009/0077589 A1 3/2009 Boyer et al.
2009/0119723 A1 5/2009 Tinsman
2009/0193458 A1 7/2009 Finseth et al.
2009/0217203 A1 8/2009 Aravamudan et al.
2010/0050211 A1* 2/2010 Seldin et al. .................... 725/46
2010/0115413 A1 5/2010 Schein et al.
2010/0115541 A1 5/2010 Schein et al.
2010/0121845 A1 5/2010 Aravamudan et al.
2010/0122275 A1* 5/2010 Swix et al. ......................... 725/5
2010/0146543 A1 6/2010 Knee et al.
2010/0175078 A1 7/2010 Knudson et al.
2010/0199295 A1* 8/2010 Katpelly et al. ................ 725/14
2010/0211969 A1 8/2010 Schein et al.
2010/0211975 A1 8/2010 Boyer et al.
2010/0241625 A1 9/2010 Aravamudan et al.
2010/0247065 A1 9/2010 Cooper et al.
2010/0275230 A1 10/2010 Yuen et al.
2010/0293160 A1 11/2010 Aravamudan et al.
2010/0299692 A1 11/2010 Rao et al.
2010/0319013 A1 12/2010 Knudson et al.
2010/0325111 A1 12/2010 Aravamudan et al.
2011/0013885 A1 1/2011 Wong et al.
2011/0022587 A1 1/2011 Aravamudan et al.
2011/0035771 A1 2/2011 Ward, III et al.
2011/0131601 A1 6/2011 Alten et al.
2011/0167451 A1 7/2011 Yuen et al.
2011/0173660 A1 7/2011 Schein et al.
2011/0185387 A1 7/2011 Schein et al.
2011/0209170 A1 8/2011 Schein et al.
2011/0258663 A1 10/2011 Lemmons et al.
2011/0276995 A1 11/2011 Alten et al.
2012/0079539 A1 3/2012 Schein et al.
2012/0102523 A1 4/2012 Herz et al.
2012/0185901 A1 7/2012 Macrae et al.
2012/0272270 A1 10/2012 Boyer et al.
2013/0031582 A1 1/2013 Tinsman et al.
2013/0304586 A1 11/2013 Angles et al.

FOREIGN PATENT DOCUMENTS

AU 733993 B2 5/2001
AU 749209 B2 6/2002
AU 760568 B2 5/2003
AU 765648 B2 9/2003
AU 2008201306 A1 4/2008
CA 1030505 A1 5/1978
CA 1187197 A1 5/1985
CA 1188811 A1 6/1985
CA 1196082 A1 10/1985
CA 2345161 A1 6/1994
CA 2312326 A1 6/1999
CA 2322217 A1 9/1999
CA 2324278 A1 11/1999
CA 2513282 A1 11/1999
CN 1155810 A 7/1997
CN 1187280 A 7/1998
CN 1200221 A 11/1998
CN 1226030 A 8/1999
CN 1555191 12/2004
CN 1567986 1/2005
DE 29 18 846 11/1980
DE 31 51 492 7/1983
DE 3246225 A1 6/1984
DE 3337204 4/1985
DE 3505006 A1 8/1986
DE 36 21 263 A1 1/1988
DE 3640436 A1 6/1988
DE 3702220 A1 8/1988
DE 3909334 A1 9/1990
DE 41 43 074 A1 7/1992
DE 4201031 A1 7/1993
DE 4217246 A1 12/1993
DE 4240187 A1 6/1994
DE 4407701 A1 9/1995
DE 4440419 A1 5/1996
DE 19 531 121 A1 2/1997
DE 19 740 079 A1 3/1999
DE 19 931 046 A1 1/2001

(56) References Cited

FOREIGN PATENT DOCUMENTS

| | | | |
|---|---|---|---|
| DE | 42 90 947 | B4 | 11/2006 |
| EP | 0057209 | A1 | 8/1982 |
| EP | 0 072 153 | A2 | 2/1983 |
| EP | 0 148 733 | A1 | 7/1985 |
| EP | 0 222 025 | A1 | 5/1987 |
| EP | 0 229 526 | A2 | 7/1987 |
| EP | 0 239 884 | A1 | 10/1987 |
| EP | 0 276425 | A2 | 8/1988 |
| EP | 0337336 | A2 | 10/1989 |
| EP | 0339675 | | 11/1989 |
| EP | 0 363 847 | A1 | 4/1990 |
| EP | 0 393 555 | | 10/1990 |
| EP | 0396062 | A2 | 11/1990 |
| EP | 0 401 015 | A2 | 12/1990 |
| EP | 0401930 | | 12/1990 |
| EP | 0408892 | A1 | 1/1991 |
| EP | 0420123 | A2 | 4/1991 |
| EP | 0424469 | | 5/1991 |
| EP | 0424648 | A2 | 5/1991 |
| EP | 0444496 | | 9/1991 |
| EP | 0447968 | A2 | 9/1991 |
| EP | 0 463 451 | A2 | 1/1992 |
| EP | 0 477 754 | A2 | 4/1992 |
| EP | 0477756 | A2 | 4/1992 |
| EP | 0 489 387 | A2 | 6/1992 |
| EP | 0488379 | | 6/1992 |
| EP | 0 492 853 | A2 | 7/1992 |
| EP | 497 235 | | 8/1992 |
| EP | 0532322 | A2 | 3/1993 |
| EP | 0535749 | A2 | 4/1993 |
| EP | 0536901 | A2 | 4/1993 |
| EP | 0550911 | A1 | 7/1993 |
| EP | 0 560 593 | | 9/1993 |
| EP | 0 572 090 | | 12/1993 |
| EP | 0 575 956 | A2 | 12/1993 |
| EP | 0617563 | A1 | 9/1994 |
| EP | 0 620 689 | A1 | 10/1994 |
| EP | 0 624 040 | A2 | 11/1994 |
| EP | 0624039 | A2 | 11/1994 |
| EP | 0 644 689 | A2 | 3/1995 |
| EP | 0 650 114 | A2 | 4/1995 |
| EP | 0648054 | A2 | 4/1995 |
| EP | 0 658 048 | A1 | 6/1995 |
| EP | 0662771 | A1 | 7/1995 |
| EP | 0 669 760 | | 8/1995 |
| EP | 0 669 761 | A2 | 8/1995 |
| EP | 0 673 164 | A1 | 9/1995 |
| EP | 0 682 452 | A2 | 11/1995 |
| EP | 0 705 036 | | 4/1996 |
| EP | 0711076 | A2 | 5/1996 |
| EP | 0 723369 | A1 | 7/1996 |
| EP | 0721253 | A2 | 7/1996 |
| EP | 0725539 | A2 | 8/1996 |
| EP | 0 742669 | | 11/1996 |
| EP | 0752767 | A2 | 1/1997 |
| EP | 0753964 | | 1/1997 |
| EP | 0758833 | A2 | 2/1997 |
| EP | 0762751 | A2 | 3/1997 |
| EP | 0762756 | A2 | 3/1997 |
| EP | 0763938 | | 3/1997 |
| EP | 0 774 853 | | 5/1997 |
| EP | 0 774 868 | A1 | 5/1997 |
| EP | 0772360 | | 5/1997 |
| EP | 0774866 | A2 | 5/1997 |
| EP | 0775417 | A1 | 5/1997 |
| EP | 0784405 | | 7/1997 |
| EP | 0 789 488 | | 8/1997 |
| EP | 0 793 225 | | 9/1997 |
| EP | 0797355 | | 9/1997 |
| EP | 0 804 028 | A1 | 10/1997 |
| EP | 0 805 590 | A2 | 11/1997 |
| EP | 0 806 111 | A1 | 11/1997 |
| EP | 0805594 | A2 | 11/1997 |
| EP | 0822718 | | 2/1998 |
| EP | 0827340 | A2 | 3/1998 |
| EP | 0 836 320 | | 4/1998 |
| EP | 0 836 321 | | 4/1998 |
| EP | 0 837599 | A2 | 4/1998 |
| EP | 0834798 | | 4/1998 |
| EP | 0843468 | | 5/1998 |
| EP | 0848554 | A2 | 6/1998 |
| EP | 0849948 | | 6/1998 |
| EP | 0 852361 | A2 | 7/1998 |
| EP | 0 854645 | | 7/1998 |
| EP | 0851681 | | 7/1998 |
| EP | 0852442 | A1 | 7/1998 |
| EP | 0854654 | | 7/1998 |
| EP | 0874524 | | 10/1998 |
| EP | 0880856 | A1 | 12/1998 |
| EP | 0 892 554 | A2 | 1/1999 |
| EP | 0905985 | A2 | 3/1999 |
| EP | 0 921 682 | A2 | 6/1999 |
| EP | 0924927 | | 6/1999 |
| EP | 0935393 | A2 | 8/1999 |
| EP | 0 940 983 | | 9/1999 |
| EP | 0 945003 | B1 | 9/1999 |
| EP | 0940985 | | 9/1999 |
| EP | 0944253 | A1 | 9/1999 |
| EP | 0963119 | A1 | 12/1999 |
| EP | 0988876 | A1 | 3/2000 |
| EP | 1014715 | A2 | 6/2000 |
| EP | 1050794 | A | 11/2000 |
| EP | 1 058 999 | A1 | 12/2000 |
| EP | 1 059 749 | | 12/2000 |
| EP | 1067792 | A2 | 1/2001 |
| EP | 1 093 305 | A2 | 4/2001 |
| EP | 1095504 | A2 | 5/2001 |
| EP | 1107588 | A2 | 6/2001 |
| EP | 1135929 | A1 | 9/2001 |
| EP | 1143691 | | 10/2001 |
| EP | 0 856 847 | | 11/2001 |
| EP | 1170944 | | 1/2002 |
| EP | 1213919 | A2 | 6/2002 |
| EP | 1036466 | | 3/2003 |
| EP | 0936811 | B1 | 5/2003 |
| EP | 1338967 | | 8/2003 |
| EP | 1463307 | A2 | 9/2004 |
| EP | 1763234 | A2 | 3/2007 |
| FR | 2662895 | A1 | 12/1991 |
| GB | 1 554 411 | | 10/1979 |
| GB | 2034995 | A | 6/1980 |
| GB | 2126002 | A | 3/1984 |
| GB | 2164194 | A | 3/1986 |
| GB | 2185670 | A | 7/1987 |
| GB | 2217144 | A | 10/1989 |
| GB | 2 227 622 | | 8/1990 |
| GB | 2 229 595 | | 9/1990 |
| GB | 2 256 115 | | 11/1992 |
| GB | 2256546 | A | 12/1992 |
| GB | 2264409 | A | 8/1993 |
| GB | 2265792 | | 10/1993 |
| GB | 2 275 585 | A | 8/1994 |
| GB | 2305049 | A | 3/1997 |
| GB | 2307381 | | 5/1997 |
| GB | 2309134 | A | 7/1997 |
| GB | 2325537 | A | 11/1998 |
| GB | 2 346 251 | | 8/2000 |
| HK | 1035285 | | 3/2005 |
| JP | 58137334 | A | 8/1983 |
| JP | 58137344 | A | 8/1983 |
| JP | 58196738 | A | 11/1983 |
| JP | 58210776 | A | 12/1983 |
| JP | 59141878 | A | 8/1984 |
| JP | 61050470 | A | 3/1986 |
| JP | 61074476 | A | 4/1986 |
| JP | 62-060370 | | 3/1987 |
| JP | 62060372 | | 3/1987 |
| JP | 62060384 | A | 3/1987 |
| JP | 06392177 | | 4/1988 |
| JP | 63234679 | A | 9/1988 |
| JP | 01307944 | A | 12/1989 |
| JP | 02048879 | A | 2/1990 |
| JP | 02-119307 | A | 5/1990 |
| JP | 06-141250 | | 5/1990 |

(56) References Cited

FOREIGN PATENT DOCUMENTS

JP 2189753 A 7/1990
JP 10-234007 9/1990
JP 03-022770 1/1991
JP 03063990 A 3/1991
JP 03-167975 A 7/1991
JP 3178278 A 8/1991
JP 03-214919 A 9/1991
JP 03-243076 A 10/1991
JP 02-054646 11/1991
JP 09-009244 1/1992
JP 04-44475 2/1992
JP 04079053 3/1992
JP 04-162889 A 6/1992
JP 04-180480 A 6/1992
JP 04227380 8/1992
JP 04250760 A 9/1992
JP 04-335395 A 11/1992
JP 4340258 A 11/1992
JP 05-103281 A 4/1993
JP 05-122692 A 5/1993
JP 05-183826 7/1993
JP 05260400 A 10/1993
JP 05284437 A 10/1993
JP 05-314186 B2 11/1993
JP 05-339100 A 12/1993
JP 06021907 1/1994
JP 06038165 2/1994
JP 06-090408 A 3/1994
JP 60-61935 A 3/1994
JP 06111413 4/1994
JP 06-124309 5/1994
JP 06-133235 A 5/1994
JP 06504165 5/1994
JP 06-164973 6/1994
JP 06-217271 8/1994
JP 06243539 9/1994
JP 06-295312 A 10/1994
JP 06303541 10/1994
JP 06-350546 12/1994
JP 07-021619 1/1995
JP 0723356 1/1995
JP 07020254 A 1/1995
JP 07-050259 2/1995
JP 07-076592 3/1995
JP 07-135621 A 5/1995
JP 07123326 5/1995
JP 07-162776 6/1995
JP 07147657 A 6/1995
JP 07154349 A 6/1995
JP 07160732 6/1995
JP 7-193788 7/1995
JP 07184131 A 7/1995
JP 07193762 A 7/1995
JP 07193763 A 7/1995
JP 07212732 A 8/1995
JP 07236099 9/1995
JP 7-262200 A 10/1995
JP 07-284033 A 10/1995
JP 07-288759 10/1995
JP 07-321748 12/1995
JP 08-32528 2/1996
JP 08-056352 2/1996
JP 0832538 2/1996
JP 08-137334 A 5/1996
JP 08125497 5/1996
JP 08130517 A 5/1996
JP 8-168046 6/1996
JP 8-506469 7/1996
JP 08506941 7/1996
JP 08506942 7/1996
JP 08-196738 A 8/1996
JP 08-234709 9/1996
JP 08251122 9/1996
JP 08275077 10/1996
JP 08289281 A 11/1996
JP 08-331546 A 12/1996
JP 09-009245 1/1997
JP 09-037223 2/1997
JP 09037151 A 2/1997
JP 9037168 2/1997
JP 09037171 2/1997
JP 09037172 A 2/1997
JP 09-065321 3/1997
JP 09-070020 3/1997
JP 09083888 A 3/1997
JP 09-098362 4/1997
JP 09-102827 A 4/1997
JP 9-102944 4/1997
JP 09-114781 5/1997
JP 09 162818 6/1997
JP 09-162821 6/1997
JP 09-247565 A 9/1997
JP 092-44475 A 9/1997
JP 09-261609 A 10/1997
JP 09-270965 A 10/1997
JP 09289630 11/1997
JP 09322213 12/1997
JP 10-042235 2/1998
JP 10-501936 2/1998
JP 10042215 2/1998
JP 10042218 2/1998
JP 10-093933 4/1998
JP 10-143340 5/1998
JP 10-143349 5/1998
JP 10-228500 8/1998
JP 10228687 8/1998
JP 10257400 A 9/1998
JP 2838892 10/1998
JP 1998289205 10/1998
JP 10-512420 11/1998
JP 11008810 1/1999
JP 11-136615 A 5/1999
JP 11-136658 5/1999
JP 11177962 A 7/1999
JP 11261917 A 9/1999
JP 11-313280 A 11/1999
JP 11308561 A 11/1999
JP 2000-013708 1/2000
JP 2000-138886 5/2000
JP 2000-224533 8/2000
JP 2000-235546 8/2000
JP 2000216845 A 8/2000
JP 2000-261750 A 9/2000
JP 2000-287179 A 10/2000
JP 2000-306314 11/2000
JP 2000-312333 A 11/2000
JP 2000-339931 A 12/2000
JP 2001-022282 A 1/2001
JP 2001-086423 A 3/2001
JP 2001-088372 4/2001
JP 2001-165669 6/2001
JP 2001-167522 6/2001
JP 2001-213595 8/2001
JP 2001-257950 9/2001
JP 2001-513595 9/2001
JP 2002-279969 9/2002
JP 2003-189200 A 7/2003
JP 2003-199004 A 7/2003
JP 2004-007592 A 1/2004
JP 2004-023326 A 1/2004
JP 2006-238475 A 9/2006
JP 2006-340396 12/2006
JP 4062577 3/2008
JP 2009-067054 A 4/2009
JP 04301285 B2 7/2009
JP 2010-119149 A 5/2010
JP 4510282 7/2010
JP 5053378 B2 10/2012
JP 05-149692 2/2013
TW 247388 B 5/1995
WO WO-86/01359 A1 2/1986
WO WO-86/01962 3/1986
WO WO-87/03766 6/1987
WO WO-88/04057 A1 6/1988

(56) References Cited

FOREIGN PATENT DOCUMENTS

| | | | |
|---|---|---|---|
| WO | WO-88/04507 | | 6/1988 |
| WO | WO-8902682 | A1 | 3/1989 |
| WO | WO-89/03085 | | 4/1989 |
| WO | WO-89/12370 | | 12/1989 |
| WO | WO-90/00847 | A1 | 1/1990 |
| WO | WO-90/01243 | A1 | 2/1990 |
| WO | WO-90/15507 | | 12/1990 |
| WO | WO-9100670 | | 1/1991 |
| WO | WO-91/05436 | A1 | 4/1991 |
| WO | WO-91/06367 | A2 | 5/1991 |
| WO | WO-91/06912 | A1 | 5/1991 |
| WO | WO-91/07050 | A1 | 5/1991 |
| WO | WO-91/18476 | A1 | 11/1991 |
| WO | WO-92/04801 | | 3/1992 |
| WO | WO-9222983 | A2 | 12/1992 |
| WO | WO-9304473 | | 3/1993 |
| WO | WO-9305452 | A1 | 3/1993 |
| WO | WO-9308542 | | 4/1993 |
| WO | WO-93/11638 | | 6/1993 |
| WO | WO-93/11639 | | 6/1993 |
| WO | WO-93/11640 | | 6/1993 |
| WO | WO-93/23957 | A1 | 11/1993 |
| WO | WO-9322877 | | 11/1993 |
| WO | WO-94/13107 | | 6/1994 |
| WO | WO-94/14281 | A1 | 6/1994 |
| WO | WO-94/14282 | A1 | 6/1994 |
| WO | WO-94/14283 | A1 | 6/1994 |
| WO | WO-94/14284 | A1 | 6/1994 |
| WO | WO-94/16441 | A1 | 7/1994 |
| WO | WO-9421085 | A1 | 9/1994 |
| WO | WO-94/23383 | A1 | 10/1994 |
| WO | WO-94/29811 | A1 | 12/1994 |
| WO | WO-95/01056 | | 1/1995 |
| WO | WO-95/01057 | A1 | 1/1995 |
| WO | WO-95/01058 | A1 | 1/1995 |
| WO | WO-95/01059 | A1 | 1/1995 |
| WO | WO-95/02945 | A1 | 1/1995 |
| WO | WO-95/04431 | A2 | 2/1995 |
| WO | WO-95/06389 | A1 | 3/1995 |
| WO | WO-95/07003 | | 3/1995 |
| WO | WO-95/10910 | | 4/1995 |
| WO | WO-95/15658 | A1 | 6/1995 |
| WO | WO-95/16568 | A1 | 6/1995 |
| WO | WO-9515649 | A1 | 6/1995 |
| WO | WO-9515657 | A1 | 6/1995 |
| WO | WO-95/19092 | A1 | 7/1995 |
| WO | WO-95/26095 | A2 | 9/1995 |
| WO | WO-95/26608 | A1 | 10/1995 |
| WO | WO-95/28055 | A1 | 10/1995 |
| WO | WO-95/28799 | A1 | 10/1995 |
| WO | WO-95/30961 | A1 | 11/1995 |
| WO | WO-95/32585 | | 11/1995 |
| WO | WO-95/32587 | | 11/1995 |
| WO | WO-9530302 | A1 | 11/1995 |
| WO | WO-9531069 | | 11/1995 |
| WO | WO-9532583 | A1 | 11/1995 |
| WO | WO-9532584 | | 11/1995 |
| WO | WO-95/33338 | A1 | 12/1995 |
| WO | WO-96/07270 | A1 | 3/1996 |
| WO | WO-96/08109 | A1 | 3/1996 |
| WO | WO-96/08923 | A1 | 3/1996 |
| WO | WO-96/09721 | A1 | 3/1996 |
| WO | WO-9608113 | A1 | 3/1996 |
| WO | WO-96/13932 | A1 | 5/1996 |
| WO | WO-9613013 | A1 | 5/1996 |
| WO | WO-9613935 | A1 | 5/1996 |
| WO | WO-96/17467 | A2 | 6/1996 |
| WO | WO-9617473 | | 6/1996 |
| WO | WO-96/20555 | | 7/1996 |
| WO | WO-9621990 | A2 | 7/1996 |
| WO | WO-96/25821 | A1 | 8/1996 |
| WO | WO-96/26605 | | 8/1996 |
| WO | WO-9627270 | A1 | 9/1996 |
| WO | WO-9627982 | | 9/1996 |
| WO | WO-9627989 | | 9/1996 |
| WO | WO-96/31980 | A1 | 10/1996 |
| WO | WO-96/33572 | | 10/1996 |
| WO | WO-96/34467 | A1 | 10/1996 |
| WO | WO-96/34486 | A1 | 10/1996 |
| WO | WO-96/34491 | A1 | 10/1996 |
| WO | WO-96/36172 | | 11/1996 |
| WO | WO-96/37075 | | 11/1996 |
| WO | WO-96/37983 | A1 | 11/1996 |
| WO | WO-9637996 | A1 | 11/1996 |
| WO | WO-96/38799 | A1 | 12/1996 |
| WO | WO-96/41477 | A1 | 12/1996 |
| WO | WO-96/41478 | | 12/1996 |
| WO | WO-9638962 | | 12/1996 |
| WO | WO-9641470 | A1 | 12/1996 |
| WO | WO-9641471 | A1 | 12/1996 |
| WO | WO-9641472 | | 12/1996 |
| WO | WO-97/02702 | A2 | 1/1997 |
| WO | WO-97/04595 | A1 | 2/1997 |
| WO | WO-9707656 | | 3/1997 |
| WO | WO-97/12486 | | 4/1997 |
| WO | WO-97/13368 | | 4/1997 |
| WO | WO-97/17774 | A1 | 5/1997 |
| WO | WO-97/18675 | | 5/1997 |
| WO | WO-97/19555 | A1 | 5/1997 |
| WO | WO-9721291 | A2 | 6/1997 |
| WO | WO-97/23997 | A1 | 7/1997 |
| WO | WO-97/26612 | A1 | 7/1997 |
| WO | WO-97/29458 | A1 | 8/1997 |
| WO | WO-97/31480 | | 8/1997 |
| WO | WO-97/34413 | | 9/1997 |
| WO | WO-9732434 | A1 | 9/1997 |
| WO | WO-9734414 | | 9/1997 |
| WO | WO-97/36422 | | 10/1997 |
| WO | WO-9737500 | A1 | 10/1997 |
| WO | WO-9740623 | | 10/1997 |
| WO | WO-97/41673 | A2 | 11/1997 |
| WO | WO-97/42763 | | 11/1997 |
| WO | WO-97/46943 | A1 | 12/1997 |
| WO | WO-97/47106 | | 12/1997 |
| WO | WO-97/47124 | | 12/1997 |
| WO | WO-97/47143 | | 12/1997 |
| WO | WO-97/48230 | | 12/1997 |
| WO | WO-97/49237 | | 12/1997 |
| WO | WO-97/49241 | | 12/1997 |
| WO | WO-97/49242 | | 12/1997 |
| WO | WO-97/50251 | | 12/1997 |
| WO | WO-9745786 | | 12/1997 |
| WO | WO-9746016 | | 12/1997 |
| WO | WO-9748228 | A1 | 12/1997 |
| WO | WO-98/00975 | A1 | 1/1998 |
| WO | WO-98/00976 | | 1/1998 |
| WO | WO-9801995 | | 1/1998 |
| WO | WO-98/06219 | | 2/1998 |
| WO | WO-98/07277 | A1 | 2/1998 |
| WO | WO-98/10589 | A1 | 3/1998 |
| WO | WO-9812872 | | 3/1998 |
| WO | WO-98/14009 | A1 | 4/1998 |
| WO | WO-98/16062 | | 4/1998 |
| WO | WO-98/17063 | A1 | 4/1998 |
| WO | WO-98/17064 | A1 | 4/1998 |
| WO | WO-9817033 | A1 | 4/1998 |
| WO | WO-9818260 | A1 | 4/1998 |
| WO | WO-98/20675 | A1 | 5/1998 |
| WO | WO-9819459 | A1 | 5/1998 |
| WO | WO-9821664 | A1 | 5/1998 |
| WO | WO-9821877 | | 5/1998 |
| WO | WO-98/26584 | | 6/1998 |
| WO | WO-98/27723 | | 6/1998 |
| WO | WO-9826569 | A2 | 6/1998 |
| WO | WO-9826596 | | 6/1998 |
| WO | WO-98/28906 | A2 | 7/1998 |
| WO | WO-98/31148 | A1 | 7/1998 |
| WO | WO-9831115 | A2 | 7/1998 |
| WO | WO-9831116 | A2 | 7/1998 |
| WO | WO-98/37695 | | 8/1998 |
| WO | WO-9834405 | A1 | 8/1998 |
| WO | WO-98/39893 | A2 | 9/1998 |
| WO | WO-98/41020 | A1 | 9/1998 |
| WO | WO-9838831 | A1 | 9/1998 |

(56) References Cited

FOREIGN PATENT DOCUMENTS

| | | | |
|---|---|---|---|
| WO | WO-98/43183 A1 | | 10/1998 |
| WO | WO-98/43406 A1 | | 10/1998 |
| WO | WO-98/47279 | | 10/1998 |
| WO | WO-98/47290 A1 | | 10/1998 |
| WO | WO-98/48566 A2 | | 10/1998 |
| WO | WO-9847283 | | 10/1998 |
| WO | WO-98/53611 A1 | | 11/1998 |
| WO | WO-98/56172 A1 | | 12/1998 |
| WO | WO-98/56173 A1 | | 12/1998 |
| WO | WO-98/56176 A1 | | 12/1998 |
| WO | WO-98/56712 A1 | | 12/1998 |
| WO | WO-99/01984 A1 | | 1/1999 |
| WO | WO-99/03267 A1 | | 1/1999 |
| WO | WO-99/04561 | | 1/1999 |
| WO | WO-99/04570 | | 1/1999 |
| WO | WO-99/07142 A1 | | 2/1999 |
| WO | WO-99/14947 A1 | | 3/1999 |
| WO | WO-9911060 A1 | | 3/1999 |
| WO | WO-9912320 A1 | | 3/1999 |
| WO | WO-9918721 A1 | | 4/1999 |
| WO | WO-9918722 | | 4/1999 |
| WO | WO-99/22502 A1 | | 5/1999 |
| WO | WO-99/29109 A1 | | 6/1999 |
| WO | WO-99/30491 A1 | | 6/1999 |
| WO | WO-99/31480 A1 | | 6/1999 |
| WO | WO-9927681 A2 | | 6/1999 |
| WO | WO-9928897 A1 | | 6/1999 |
| WO | WO-99/33265 A1 | | 7/1999 |
| WO | WO-99/38092 A1 | | 7/1999 |
| WO | WO-9935827 A1 | | 7/1999 |
| WO | WO-9937045 A1 | | 7/1999 |
| WO | WO-9939280 | | 8/1999 |
| WO | WO-9939466 A1 | | 8/1999 |
| WO | WO-99/45700 | | 9/1999 |
| WO | WO-99/45701 A1 | | 9/1999 |
| WO | WO-99/45702 | | 9/1999 |
| WO | WO-99/52279 | | 10/1999 |
| WO | WO-99/52285 A1 | | 10/1999 |
| WO | WO-99/56466 | | 11/1999 |
| WO | WO-99/56473 A1 | | 11/1999 |
| WO | WO-99/57837 A2 | | 11/1999 |
| WO | WO-99/57839 | | 11/1999 |
| WO | WO-99/60493 A1 | | 11/1999 |
| WO | WO-99/60783 | | 11/1999 |
| WO | WO-99/60789 | | 11/1999 |
| WO | WO-9957707 A1 | | 11/1999 |
| WO | WO-9960790 | | 11/1999 |
| WO | WO-99/66725 | | 12/1999 |
| WO | WO-9965237 A1 | | 12/1999 |
| WO | WO-9965244 A1 | | 12/1999 |
| WO | WO-00/04706 A2 | | 1/2000 |
| WO | WO-00/04708 A1 | | 1/2000 |
| WO | WO-00/04709 A1 | | 1/2000 |
| WO | WO-0002380 A2 | | 1/2000 |
| WO | WO-00/07368 | | 2/2000 |
| WO | WO-00/08850 | | 2/2000 |
| WO | WO-00/08851 | | 2/2000 |
| WO | WO-00/08852 | | 2/2000 |
| WO | WO-0005889 A1 | | 2/2000 |
| WO | WO-00/11865 A1 | | 3/2000 |
| WO | WO-00/13415 A2 | | 3/2000 |
| WO | WO-00/14951 A1 | | 3/2000 |
| WO | WO-00/16548 | | 3/2000 |
| WO | WO-0011869 A1 | | 3/2000 |
| WO | WO-0013416 A1 | | 3/2000 |
| WO | WO-0016336 A1 | | 3/2000 |
| WO | WO-00/28379 A1 | | 5/2000 |
| WO | WO-00/28734 | | 5/2000 |
| WO | WO-00/28739 | | 5/2000 |
| WO | WO-0027122 A1 | | 5/2000 |
| WO | WO-00/33560 A2 | | 6/2000 |
| WO | WO-00/33573 A1 | | 6/2000 |
| WO | WO-00/33578 A1 | | 6/2000 |
| WO | WO-0033160 A2 | | 6/2000 |
| WO | WO-0033224 A1 | | 6/2000 |
| WO | WO-00/040014 A1 | | 7/2000 |
| WO | WO-00/40025 A1 | | 7/2000 |
| WO | WO-00/44146 A1 | | 7/2000 |
| WO | WO-00/49801 A1 | | 8/2000 |
| WO | WO-00/51310 A1 | | 8/2000 |
| WO | WO-00/57645 A1 | | 9/2000 |
| WO | WO-00/58833 | | 10/2000 |
| WO | WO-00/58967 | | 10/2000 |
| WO | WO-00/59214 A1 | | 10/2000 |
| WO | WO-00/59220 A1 | | 10/2000 |
| WO | WO-00/59223 | | 10/2000 |
| WO | WO-00/62298 | | 10/2000 |
| WO | WO-00/62299 | | 10/2000 |
| WO | WO-00/62533 | | 10/2000 |
| WO | WO-00/67475 | | 11/2000 |
| WO | WO-00/70505 | | 11/2000 |
| WO | WO-00/79798 | | 12/2000 |
| WO | WO-01/01677 A1 | | 1/2001 |
| WO | WO-01/06784 A2 | | 1/2001 |
| WO | WO-0110126 A1 | | 2/2001 |
| WO | WO-0110128 A1 | | 2/2001 |
| WO | WO-0111865 A1 | | 2/2001 |
| WO | WO-01/15438 A1 | | 3/2001 |
| WO | WO-01/22729 | | 3/2001 |
| WO | WO-0119086 | | 3/2001 |
| WO | WO-01/35662 A1 | | 5/2001 |
| WO | WO-01-46843 A2 | | 6/2001 |
| WO | WO-01/47238 | | 6/2001 |
| WO | WO-01/47249 | | 6/2001 |
| WO | WO-01/47257 | | 6/2001 |
| WO | WO-01/47273 | | 6/2001 |
| WO | WO-01/47279 | | 6/2001 |
| WO | WO-0146869 | | 6/2001 |
| WO | WO-0150743 | | 7/2001 |
| WO | WO-0158158 | | 8/2001 |
| WO | WO-01/75649 A2 | | 10/2001 |
| WO | WO-01/76239 | | 10/2001 |
| WO | WO-01/76248 A2 | | 10/2001 |
| WO | WO-01/76704 A2 | | 10/2001 |
| WO | WO-01/89213 A1 | | 11/2001 |
| WO | WO-0182600 A2 | | 11/2001 |
| WO | WO-02/31731 | | 4/2002 |
| WO | WO-02/078317 A2 | | 10/2002 |
| WO | WO-02/084992 A2 | | 10/2002 |
| WO | WO-03/005712 A1 | | 1/2003 |
| WO | WO-2004/010326 | | 1/2004 |
| WO | WO-2004/031931 A1 | | 4/2004 |
| WO | WO-2004/066180 A1 | | 8/2004 |
| WO | WO-2005/027512 A1 | | 3/2005 |
| WO | WO-2005/033967 A3 | | 4/2005 |
| WO | WO-2005/054982 A2 | | 6/2005 |
| WO | WO-2005/084235 A2 | | 9/2005 |
| WO | WO-2006/079977 A2 | | 8/2006 |
| WO | WO-2007/124429 | | 11/2007 |
| WO | WO-2007/124436 A2 | | 11/2007 |
| WO | WO-2008/063987 | | 8/2008 |

OTHER PUBLICATIONS

Dalianis, "Improving search engine retrieval using a compound splitter for Swedish," Abstract of presentation at Nodalida 2005—15th Nordic Conference on Computational Linguistics, Joensuu Finland, May 21-22, 2005. Retrieved Jan. 5, 2006 from http://phon.joensuu.fi/nodalida/abstracts/03.shtml, 3 pages.

Digital Video Broadcasting, http://www.dvb.org, cited by other, Oct. 12, 2007, 2 pages.

Gadd, Phonix: The Algorith, Program, vol. 24(4), Oct. 1990, pp. 363-369.

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

International Search Report and Written Opinion of the International Searching Authority, the United States Patent and Trademark Office for PCT/US2007/084500, dated May 20, 2008, 6 pages.

International Search Report and Written Opinion of the International Searching Authority, the United States Patent and Trademark Office, for PCT/US2007/067114, dated Jul. 2, 2008, 4 pages.

(56) References Cited

OTHER PUBLICATIONS

International Search Report, International Application No. PCT/US06/25249, mailed Jan. 29, 2008, 2 pages.
International Search Report, International Application No. PCT/US06/33204, mailed Sep. 21, 2007, 2 pages.
International Search Report, International Application No. PCT/US06/40005, mailed Jul. 3, 2007, 4 Pages.
International Search Report, International Application No. PCT/US07/65703, mailed Jan. 25, 2008, 2 pages.
International Search Report, International Application No. PCT/US07/67100, mailed Mar. 7, 2008, 2 pages.
Kurapati, et al., "A Multi-Agent TV Recommender," In Proceedings of the UM 2001 Workshop "Personalization in Future TV," 2001, 8 pages.
Mackenzie et al., LetterWise: Prefix-based disambiguation for mobile text input, Proceedings of the ACM Symposium on User Interface Software and Technology—UIST2001, pp. 111-120.
Matthom, "Text Highlighting in Search Results", Jul. 22, 2005. Available at www.matthom.com/archive/2005/07/22/text-highlighting-in-search-results; retrieved Jun. 23, 2006, 4 pages.
Mokotoff, Soundexing and Genealogy, Available at http://www.avotaynu.com/soundex.html, retrieved Mar. 19, 2008, last updated Sep. 8, 2007, 6 pages.
Murray, et al., "Inferring Demographic Attributes of Anonymous Internet Users," WEBKDD"99, LNAI, 1836, pp. 7-20, 2000.
Nardi, et al., "Integrating Communication and Information Through Contact Map," Communications of the ACM, vol. 45, No. 4, Apr. 2002, 7 pages retrieved from URL:http://portal.acm.org/citation.cfm?id+505251>.
Press Release from Tegic Communications, Tegic Communications is awarded patent for Japanese T9(R) text input software from the Japan Patent Office, Oct. 12, 2004. Retrieved Nov. 18, 2005 from http://www.tegic.com/press_view.html?release_num=55254242, 4 pages.
Review of Personalization Technologies: Collaborative Filtering vs. ChoiceStream's Attributized Bayesian Choice Modeling, Technology Brief, ChoiceStream Technologies, Cambridge, MA, Feb. 2004, 13 pages.
Silfverberg et al., Predicting text entry speed on mobile phones, Proceedings of the ACM Conference on Human Factors in Computing System—CHI, 2000. pp. 1-16.
Supplemental European Search Report for EP 05826114.0 dated Aug. 20, 2009, 13 pages.
Supplemental European Search Report for EP-07761026.9 dated Jan. 28, 2010, 8 pages.
Supplemental European Search Report for EP05826129.8 dated Aug. 11, 2009, 15 pages.
Supplemental European Search Report for EP06838179.7 dated Dec. 9, 2009, 7 pages.
Talbot, David. "Soul of a New Mobile Machine." *Technology Review: The Design Issue* May/Jun. 2007, pp. 46-53.
Turski, et al., "Inner Circle—People Centered Email Client," CHI 2005 Conference on Human Factors in Computing Systems, Apr. 2005, pp. 1845-1848, 4 pages, retrieved from URL:http://portal.acm.org/citation.cfm?id+1056808.1057037.
Villani, et al., Keystroke Biometric Recognition Studies on Long-Text Input under Ideal and Application-Oriented Conditions, Proceedings of Student/Faculty Research Day, CSIS, Pace University, May 2006, pp. C3.1-C3.8, retrieved from URL: <http://www.csis.pace.edu/-ctappert/srd2006/c3.pdf>, p. 6, para 6.
Wikipedia's entry for Levenshtein distance (n.d.). Retrieved Nov. 15, 2006 from http://en.wikipedia.org/wiki/Levenshtein_distance, 9 pages.
Written Opinion of the International Searching Authority, International Application No. PCT/US06/25249, mailed Jan. 29, 2008, 3 pages.
Written Opinion of the International Searching Authority, International Application No. PCT/US06/33204, mailed Sep. 21, 2007, 3 pages.
Written Opinion of the International Searching Authority, International Application No. PCT/US06/40005, mailed Jul. 3, 2007, 4 Pages.
Written Opinion of the International Searching Authority, International Application No. PCT/US07/65703, mailed Jan. 25, 2008, 3 pages.
Written Opinion of the International Searching Authority, International Application No. PCT/US07/67100, mailed Mar. 7, 2008, 3 pages.
Zimmerman, et al., "TV Personalization Systme Design of a TV Show Recommender Engine and Interface," In Liliana Ardissono, Alfred Kobsa, Mark Maybury (eds) Personalized Digital Television: Targeting Programs to Individual Viewers, Kluwer: 27-52, 29 pages, 2004.
U.S. Appl. No. 60/061,119, Oct. 6, 1997, Ward et al.
U.S. Appl. No. 09/330,792, Jun. 11, 1999, Knudson et al.
U.S. Appl. No. 09/332,244, Jun. 11, 1999, Ellis.
U.S. Appl. No. 09/356,268, Jul. 16, 1999, Rudnick et al.
U.S Appl. No. 10/389,856, Mar. 14, 2003, Satterfield et al.
"A New Approach to Addressability," CableData Brochure, 9 pages, undated.
"A Wonderworld of Services," The Sunday Times, Innovation section, p. 4, Jan. 7, 1996.
"Articles from PR Newswire", PR Newswire, Jun. 5, 1997, 19 pages.
"Columbia House CD-ROM Direct: Detail Page," accessed from the internet at http://web.archive.org/web/19961221160255/http://www.columbiahouse.com/cd/cgis . . . , copyright 1996, printed on Sep. 19, 2013, 1 page.
"Columbia House CD-ROM Direct: Download Demos!," accessed from the internet at http://web.archive.org/web/19961221095819/http://www.columbiahouse.com/cd/cgis . . . , copyright 1996, printed on Sep. 19, 2013, 3 pages.
"Columbia House CD-ROM Direct: Member Center," accessed from the internet at http://web.archive.org/web/19961221085905/http://www.columbiahouse.com/repl/cd/ . . . , copyright 1996, printed on Sep. 19, 2013, 2 pages.
"Columbia House CD-ROM Direct: Member Center," copyright 1996, 1 page.
"Columbia House CD-ROM Direct: The Connection," accessed from the internet at http://web.archive.org/web/19961221100721/http://www.columbiahouse.com/repl/cd/ . . . , copyright 1996, printed on Sep. 20, 2013, 1 page.
"Columbia House CD-ROM Direct: The Connection," accessed from the internet at http://web.archive.org/web/19961223152924/http://www.columbiahouse.com/repl/cd/ . . . , copyright 1996, printed on Sep. 20, 2013, 1 page.
"Columbia House Laser Disc Club: FAQ Answers," accessed from the internet at http://web.archive.org/web/19961223165516/http://www.columbiahouse.com/repl/lc/t . . . , copyright 1996, printed on Sep. 20, 2013, 5 pages.
"Columbia House Laser Disc Club: Join The Club," accessed from the internet at http://web.archive.org/web/19961221094037/http://www.columbiahouse.com/repl/lc/t . . . , copyright 1996, printed on Sep. 20, 2013, 2 pages.
"Columbia House Music Club: Join The Club," accessed from the internet at http://web.archive.org/web/19961221091101/http://www.columbiahouse.com/repl/mc . . . , copyright 1996, printed on Sep. 20, 2013, 2 pages.
"Columbia House Music Club: Search," accessed from the internet at http://web.archive.org/web/19961221114653/http://www.columbiahouse.com/repl/mc . . . , copyright 1996, printed on Sep. 19, 2013, 1 page.
"Columbia House Music Club: Shopping Cart," accessed from the internet at http://web.archive.org/web/19961221120941/http://www.columbiahouse.com/mc/cgis . . . , copyright 1996, printed on Sep. 19, 2013, 1 page.
"Columbia House Video Club: Essential Collection," accessed from the internet at http://web.archive.org/web/199612211131908/http://www.columbiahouse.com/vc/cgis/j . . ., copyright 1996, printed on Sep. 20, 2013, 2 pages.
"Comdex—Mitsubishi Previews 40-Inch DiamondWeb TV," Newsbytes, Nov. 19, 1996, Abstract 2 pages.

(56) References Cited

OTHER PUBLICATIONS

"Cool Websites: [2 Star Edition]," Houston Chronicle, Houston, Texas, Jul. 11, 1996, p. 3, Abstract.
"Description of Digital Audio-Visual Functionalities (Technical Report)," Digital Audio-Visual Council (DAVIC), 1.3.1 Par 1:1998, 86 pages.
"Development Study and Research Report on New Media Interface Technology: Status & Issues Related to Combining Databases & new Media," Japan Society of Data Communication, Mar. 1986.
"Hobbes' Internet Timeline," RFC 2235, Mar. 22, 2007, 17 pages.
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998, 1 page.
"Neue, Digitale Strategien—Bericht Von Den 5. Dermastaedter Fernsehtagen," FKT Fernseh Und Kinotechnik, vol. 49, No. 3, Mar. 1, 1995, pp. 135-139, XP000507348, Fachverlag Schiele & Schon GmbH., Berlin, DE, ISSN: 1430-9947. (Concise explanation included in IDS letter.).
"OpenTV(R) and Interactive Channel Form Strategic Alliance to Deliver Interactive Programming to Satellite Television Subscribers", from the Internet at http://www.opentv.com/news/interactivechannelfinal.htm, printed on Jun. 8, 1999, 3 pages.
"Personal Entertainment Guide—User's Guide," Version 1.0, Copyright 1991 by Lookahead Communications Inc., 82 pages.
"Prevue Channel Sep. 1, 1995 (part 1)," Prevue Guide, from the internet at http://www.youtube.com/watch?v=OVu178nH6RY, retrieved on Nov. 26, 2013, 1 page.
"Prevue Online Debuts Local Listings for 250 Systems; System-Specific Listings Include Multimedia Features—Free Build Acceleration," PR Newswire, Jun. 5, 1997, 2 pages.
"Prevue Online," Dec. 28, 1996, extract from web.archive.org, printed on Nov. 18, 2014, http://www.prevue.com, 1 page.
"Reaching your subscribers is a complex and costly process-until now," from the Internet at http://www.evolveproducts.com/info.html, printed on Dec. 28, 1998, 1 page.
"StarSight Interactive Television Program Guide III" Jim Leftwich and Steve Schein, Functional/Interactional Architecture Specification Document, Orbit Interaction, Palo Alto, California, Published before Apr. 19, 1995, 36 pages.
"StarSight Interactive Television Program Guide IV" Jim Leftwich and Steve Schein, Functional/Interactional Architecture Specification Document, Orbit Interaction, Palo Alto, California, Published before Apr. 19, 1995, pp. 88.
"Step Up to the Superhighway," The Sunday Times, Innovation section, p. 6, Jan. 7, 1996.
"Sun's Next Steps in Digital Set-Tops," article in Cablevision, p. 56, Nov. 16, 1998.
"The Evolve EZ Guide. The Remote Control," from the Internet at http://www.evolveproducts.com/display2.html, printed on Dec. 28, 1998, 1 page.
"Viewdata Service Terminal Specification," British Post Office, Issue 5, Aug. 1978, 57 pages.
"What is Jini?", from the Internet at http://java.sun.com/products/jini/whitepapers/whatsjini.pdf, printed on Jan. 25, 1999, 4 pages.
"What's New @ Prevue Online—Real™Video," May 2, 1997, extract from web.archive.org, printed on Nov. 18, 2014, http://www.prevue.com/scripts/whatsnew.asp, 5 pages.
"What's On Tonite!," Jan. 28, 1995, retrieved from the internet at http://www.library.georgetown.edu/newjour/publication/whats-tonite-tm, retrieved on Dec. 11, 2013, 9 pages.
"Why Jini Now?", from the internet at http://java.sun.com/products/jini/whitepapers/whyjininow.pdf, printed on Jan. 25, 1999. The document bears a copyright date of 1998, 16 pages.
"Yearling's Free Personalised TV Guide," from the internet at http://www.yearling.com/, Dec. 30, 1996, 15 pages.
272OR Satellite Receiver User's Guide, General Instrument, 1991, pp. 58-61, 7 total pages.
A Financial Times Survey: Viewdata (Advertisement), Financial Times, May 20, 1979, 3 pages.
ACM Multimedia 93 Proceedings, A Digital On-Demand Video Service Supporting Content-Based Queries, Little et al. pp. 427-436, Jun. 1993, 17 pages.
Addressable Converters: A New Development at CableData, Via Cable, vol. 1, No. 12, Dec. 1981, 11 pages.
Advanced Analog Systems—Addressable Terminals, General Instrument Corp. of Horsham, Pennsylvania (URL:http--www.gi.com-BUSAREA-ANALOG-TERMINALWATCH-watch.html) Printed from the Internet on Mar. 4, 1999, 1 page.
Advertisement for "TV Decisions," Cable Vision, Aug. 4, 1986, 3 pages.
Aho, Debra, "New Delphi Ads Push Envelope: Starting Visuals From Upstart Agency Go Too Far for One Paper's Tastes," Advertising Age 0.0, May 30, 1994, 2 pages, Abstract.
Alexander "Visualizing cleared-off desktops," Computerworld, May 6, 1991, 1 page.
Anderson et al., UNIX Communications and the Internet (3d ed. 1995), 846 pages.
Antonoff, "Interactive Television," Popular Science, Nov. 1992, 7 pages.
Antonoff, "Stay Tuned for Smart TV," Popular Science, Nov. 1990, 7 pages.
Armstrong, "Channel-Surfing's next wave: Henry Yuen's interactive TV guide takes on TCI and Viacom," BusinessWeek, Jul. 31, 1995, 3 pages.
Arnold, "Britain to get wired city—via telephone," Electronics, Mar. 4, 1976, at 76, 3 pages.
Bach, et al., "Multimedia TV Set, Part 1" Radio-Fernsehen Elektronik (RFE), Sep. 1996, pp. 28, 30, 31, 12 pages (English language translation attached).
Bach, et al., "Multimedia TV Set, Part 2 and Conclusion," Radio-Fernsehen Elektronik (RFE), Oct. 1996, 11 pages. (English language translation attached.).
Baer, "Innovative Add-On TV Products," IEEE Transactions on Consumer Electronics, vol. CE-25, Nov. 1979, 7 pages.
Beddow, "The Virtual Channels Subscriber Interface," Communications Technology, Apr. 30, 1992, 2 pages.
Bell Atlantic Buys Cable TV Company for $22bn, Financial Times (London), 10/14/932 pages.
Bensch, "VPV Videotext Programs Videorecorder," IEEE Paper, Jun. 1988, pp. 788-792.
Berniker, "TV Guide going online", Broadcasting & Cable, pp. 49-52, Jun. 13, 1994, 6 pages.
Bertuch, "New Realities for PCs: Multimedia between aspiration and commerce," (translation), Exhibit NK 12 of TechniSat's nullity action against EP'111, (1991), 12 pages.
Bestler, "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Blahut et al., "Interactive Television," Proceedings of the IEEE, pp. 1071-1085, Jul. 1995, 17 pages.
Boyd-Merritt, "Television wires two-way video," Electronic Engineering Times, Apr. 25, 1994, 3 pages.
Brochure, "Weststar and Videotoken Network Present the CableComputer," Revised Aug. 18, 1985, 41 pages.
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., 9 pages, undated (V 79167-79175).
Brochure, VTN "Videotoken Network, New Dimension Television," Dec. 1985, 10 pages.
Brugliera, "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.

(56) References Cited

OTHER PUBLICATIONS

Buchholz et al., "Revolution auf dem Bildschirm—Die neuen Medien Videotext and Bildschirmtext," Wilhelm Goldmann Verlag, Munich, Germany, copyright 1979, pp. 24-33 and 36-39. (English language translation attached.).
Cable Computer User's Guide, Rev. 1, Dec. 1985, 4 pages.
Cable Television Equipment, Jerrold Communications Publication, dated 1992 and 1993, pp. 82.1 to 8-6 and 8-14.1 to 8-14.3.
CableData, Roseville Consumer Presentation, Mar. 1985 12 pages.
Cameron et al., Learning GNU Emacs (2d ed. 1996).
Came, "The Wired Household," IEEE Spectrum, vol. 16 No. 10, Oct. 1979, 8 pages.
Cascading Style Sheets, level 1, W3C Recommendation (Dec. 17, 1996), available at http://www.w3.org/TR/REC-CSS1-961217#anchor-pseudo-classes.
Case 4:11-cv-06591-PJH, Complaint for Declaratory Relief (plaintiff), dated Dec. 21, 2011, 16 pages.
Chan, "Learning Considerations in User Interface Design: The Room Model," Publication of the Software Portability Laboratory, University of Waterloo, Ontario, Canada, Jul. 1984, 52 pages.
Chang et al., "An Open-Systems Approach to Video on Demand," IEEE Communications Magazine, May 1994, pp. 68-80.
Chen et al., "Real Time video and Audio in the World Wide Web," Proc. 4th World Wide Web Conference, 1995, 15 pages.
Cherrick et al., "An Individually Addressable TV Receiver With Interactive Channel Guide Display, VCR, and Cable Box Control", IEEE Transactions on Consumer Electronics, vol. 4:3 (Aug. 1994), pp. 317-328.
Christodoulakis, Steven and Graham, Stephen "Browsing Within Time-Driven Multimedia Documents," publication of the Institute for Computer Research, University of Waterloo, Waterloo, Ontario, Canada Jul. 1988, 10 pages.
Cleland, Kim, "Look Out MSN, Here Comes MCI," Advertising Age, vol. 66, No. 32, Aug. 14, 1995, 2 pages.
CNN Tech: Sonicblue revives ReplayTV, articles cnn.com, Sep. 10, 2001, retrieved from the internet: http://articles.cnn.com/2001-09-10/tech/replay.tv.idg__1__replayty-sonicblue-digitalvideo?__s=PM:TECH, 2 pages.
Compton et al., "Internet CNN Newsroom: A digital video news magazine and library," Proceedings of the Intl. Conf. on Multimedia Computing and Systems, Washington, May 15-18, 1995; Los Alamitos, IEEE Comp. Soc. Press, U.S., May 15, 1995, pp. 296-301, XP010154611.
Computer Network: Current Status and Outlook on Leading Science and Technology, Bureau of Science & Technology (Japan), vol. 1, Dec. 1986, 326 pages.
Contents of the website of StarSight Telecast, Inc. (http://www.StarSight.com) as of Apr. 21, 2004, 1 page.
U.S. Appl. No. 60/179,548, filed Feb. 1, 2000, 11 pages.
Cox,et al, "Extended Services in A Digital Compression System," Proceedings from Eleven Technical Sessions: 42nd Annual Convention and Exposition of the National Cable Television Association, Jun. 1993, 12 pages.
Creation/Modification of the Audio Signal Processor Setup for a PC Audio Editor, IBM Technical Disclosure Bulletin, vol. 30, No. 10, Mar. 1988, pp. 367-376.
D2B-Home Bus Fur Audio and Video, Selektor, Apr. 1990, pp. 10, 12, 8 total pages.
Daily, Mack, "Addressable Decoder with Downloadable Operation," Proceedings from the Eleven Technical Sessions, 42nd Annual Convention and Exposition of the NCTA, Jun. 6-9, 1993, 14 pages.
Damouny, "Teletext Decoders-Keeping Up With the Latest Advances," IEEE Transactions on Consumer Electronics, vol. CE-30, No. 3, Aug. 1984, pp. 429-435.
Das, D. and ter Horst, H., Recommender Systems for TV, Technical Report WS-98-08—Papers from the AAAI Workshop, Madison, WI (1998), 2 pages.
DAVIC 1.0 Specifications, Part 1, "Description of DAVIC Functionalities," Revision 3.2, Digital Audio-Visual Council, Jul. 10, 1995, 61 pages.
DAVIC Digital Audio-Visual Council, DAVIC 1.5 Specification, Baseline Document 1, Revised 4.0, Applications for Home Storage and Internet Based Systems, Published by Digital Audio-Visual Council 1995-1999, 27 pages.
Davis, TV Guide on Screen, "Violence on Television", House of Representatives, Committee on Energy and Commerce, Subcommittee on Telecommunications and Finance, pp. 93-163, Jun. 25, 1993.
Day, "The Great PC/TV Debate," OEM Magazine, Jul. 1, 1996, 6 pages.
December, "Presenting Java," Sams.net Publishing, published Sep. 20, 1995, 219 pages.
Declaration Under 37 C.F.R. § 1.132 of Richard E. Glassberg, signed Oct. 20, 2006, filed Oct. 24, 2006, from U.S. Appl. No. 10/346,266, 5 pages.
Dial M for Movie, Funkschau 11/94 Perspektiven, Video on Demand, vol. 11/1994, 5 pages. (English language translation attached).
Dialing the printed page, ITT in Europe Profile, 11/Spring 1977, 2 pages.
Digital TV—at a price, New Scientist, Sep. 15, 1983, vol. 99. No. 1375, 3 pages.
Digital Video Broadcasting (DVB); DVB specification for data broadcasting, European Telecommunication Standards Institute, Draft EN 301 192 V1.2.1 (Jan. 1999), 33 pages.
Dinwiddle et al., "Combined-User Interface for Computers, Televison, Video Recorders, and Telephone, etc." IBM Technical Disclosure Bulletin, vol. 33(3B), pp. 116-118 (1990), 3 pages.
DIRECTV Digital Satellite Receiver—Operating Instructions, Sony Electronics Inc. (2001), 60 pages.
DIRECTV Plus2 System, Thomson Consumer Electronics, Inc. (1999), 2 pages.
DIRECTV Receiver—Owner's Manual, Samsung, DIRECTV, Inc. (2002), 118 pages.
DIRECTV Receiver with TiVo Digital Satellite Receiver/Recorder SAT-T60—Installation Guide, Sony Electronics Inc. (2000), 43 pages.
DIRECTV Receiver with TiVo Installation Guide, Philips, TiVo Inc. (2000), 68 pages.
DIRECTV Receiver with TiVo Viewer's Guide, TiVo Inc., Sony Corp. (1999, 2000), 153 pages.
DiRosa, "BIGSURF Netguide", Jul. 1995, vol. 3.1 (Sections 18,21, and 28 (renumbered as pp. 1-27).
DishPro Satellite System—User's Guide, Dish Network (Sep. 1, 2001), 144 pages.
Does NBC Get It, Aug. 14, 1995, retrieved from the internet at http://www.open4success.org/db/bin19/019687.html, retrieved on Dec. 11, 2013, 1 page.
Dr. Dobb's, "Implementing a Web Shopping Cart," from the internet at https://www.drdobbs.com/article/print?articleId=184409959&siteSect . . . , Sep. 1, 1996, printed from the internet on Sep. 13, 2012, 15 pages.
Draft Grounds of Invalidity for EP (UK) 0 880 856 (Trial B), No. HC11 C 04556, between Starsight Telecast and United Video Properties (Claimants) and Virgin Media, Virgin Media Payments, and TiVo (Defendants), Oct. 2013, 7 pages.
Duck Tales, (1987)[TV Series 1987-1990], Internet Movie Database (IMDB) [Retrieved on Apr. 7, 2007], 5 pages.
Eckhoff, "Tv Listing Star on the Computer," Central Penn Business Journal, High Beam Research, Mar. 15, 1996, 4 pages.
Edwardson, "CEEFAX: A Proposed New Broadcasting Service," Journal of the SMPTE, Jan. 1974, vol. 83 No. 1, 8 pages.
Ehrmantraut et al., The Personal Electronic Program Guide—Towards the Pre-selection of Individual TV Programs, CIKM 96, Rockville, MD., Dec. 31, 1996, 1996 ACM 0-89791-873-8/96/11, pp. 243-250 (1996).
Eitz et al., "Videotext Programmiert Videoheimgerate," Rundfunktech Mitteilungen, Jahrg. 30, H.5, 1986, S. 223 bis 229, 21 pages. (English translation attached).
Eitz, "Zukunftige Informations-und Datenangebote beim dig italen Femsehen-EPG Und 'Lesezeichen'," RTM Rundfunktechnische Mitteilungen, Jun. 1997, vol. 41, 30 pages.
Electronic Program Guide via Internet, Research Disclosure, Kenneth Mason Publications, Hampshire, GB vol. 385(2) (May 1996) p. 276, ISSN:0374-4353.

(56) References Cited

OTHER PUBLICATIONS

Electronic Programme Guide (EPG); Protocol for a TV Guide using electronic data transmission, by European Telecommunication Standards Institute, May 1997, Valbonne, France, publication No. ETS 300 707, 89 pages.
Email from Iain Lea to Kent Landfield, comp.sources.misc, vol. 29, Issue 19 (Mar. 27, 1992, 03:28:12 GMT), available at https://groups.google.com/group/comp.sources.misc/msg/2e79d4c058a8a4fe?dmode=source&output=gplain&noredirect&pli=1.
Enhanced Content Specification, ATVEF, from the internet at http://www.atvetcomilibraryispec.html, printed Aug. 22, 2001, the document bears a Copyright date of 1998, 1999, 2000, 41 pages.
Ernst & Young "On track: A primer on media asset identification" May 2011 ,retrieved from the internet May 29, 2014, URL http://www.ey.com/Publication/vwLUAssets/Media_asset_identification_primed$FILE/Media_Entertainment.pdf, 52 pages.
European Telecommunications Standards: Digital Broadcasting Systems for Television Sound and Data Services; Specification for Service Information (SI) in Digital Video Broadcasting (DVB) Systems, European Telecommunications Standards Institute, Dec. 1994, 64 pages.
Facsimile Transmission, NHK Research Monthly Report, Dec. 1987, 78 pages (unknown author).
Fall 2001 TiVo Service Update with Dual Tuner!, TiVo Inc. (2001), 9 pages.
Fry et al., "Delivering QoS Controlled Continuous Media on the World Wide Web," Proceedings of the 4th International IFIP Workshop on QoS, Paris, Mar. 6-8, 1996, 12 pages.
Fuller, C., Streaming gijutsu no genzai Web video system no gaiyou [Current Streaming Technology, Outline of Web Video System], UNIX Magazine, Japan, ASCII K.K., Mar. 1, 2000, vol. 15, No. 3, 11 pages.
GameSpot's Downloads for Allied General, accessed from the internet at http://web.archive.org/web/19970205060703/http://www.gamespot.com/strategy/allie . . . , copyright 1997, printed on Sep. 19, 2013, 1 page.
Garneau, "Information Highway in Quebec," Editor & Publisher, vol. 127, No. 5, Jan. 29, 1994, 4 pages.
Gateway Destination: The PC for the Office and the Family Room, PC Magazine, First Looks section, pp. 39-41, Jun. 11, 1996, 3 pages.
Gavron, Jacquelyn, Moran, Joseph, How to Use Microsoft Windows NT 4 Workstation, 1996, entire document, 5 pages.
Getting Started Installation Guide, Using StarSight 1 Manual, and Remote Control Quick Reference Guide, copyright 1994, 93 pages.
Goff, Leslie, "Subs Find Lots of Program Guides Online," Multichannel News, vol. 17, No. 19, May 6, 1996, p. 38, Abstract, 3 pages.
Google News Archives—printout, received at the EPO on Mar. 22, 2007, 2 pages.
Growing US interest in the impact of viewdata, Computing Weekly, Jul. 20, 1978, 1 page.
Gutta, et al., "Tv Content Recommender System", *Proceedings of the Seventeenth National Conference on Artificial Intelligence and Twelfth Conference on Innovative Applications of Artificial Intelligence*, (Jul. 30, 2000), 2 pages.
Hallenbeck, P., Developing an interactive television system that works, R&D Magazine, vol. 39:7, Jun. 1997, 4 pages.
Harada, Mamoru et al., "Internet de telebi housou ga hajimaru," ("Television Broadcasting Starts with the Internet"), Nikkei Electronics, Japan, Nikkei BP, No. 653, Jan. 15, 1996, 14 pages. (Concise explanation included in IDS letter.).
Hartwig et al. "Broadcasting and Processing of Program Guides for Digital TV," SMPTE Journal, pp. 727-732, Oct. 1997.
Hauptmann et al., "News on Demand," News-on-Demand: An Application of Informedia® Technology D-Lib Magazine, Sep. 13, 1995, XP002675162, Retrieved from the Internet: URL:http://www.dlib.org/dlib/september95/nod/page3.html [retrieved on May 2, 2012], 1 page.
Hedger, "Telesoftware: Home Computing Via Broadcast Teletext," IEEE Transactions on Consumer Electronics, vol. CE-25, No. 3, Jul. 1979, 11 pages.
Hendrix, "A Natural Language Interface Facility", Artificial Intelligence Center, Stanford Research Institute, Sigart Newsletter, No. 61, Feb. 1977, 2 pages.
Hill, et al., "Recommending and Evaluating Choices in a Virtual Community of Use" CHI '95 Mosaic of Creativity, pp. 194-201 (1995).
Hitachi Consumer Electronics Co., Ltd., Certification of market introduction in 1993 of Hitachi Projection TV Model 55EX7K, Dec. 17, 2012, 1 page.
Hitachi Projection Color TV Operating Guide, for Models 55EX7K, 50EX6K, 50ES1B/K, and 46EX3B/4K, 38 pages, undated.
Hitachi Service Manual, No. 0021, Projection Color Television, Models 55EX7K, 50EX6K, 50ES1B/K, 46EX3B/4K, and 46EX3BS/4KS, Aug. 1993, 1 page.
Hoarty, "Multimedia on Cable Television Systems," Symposium Record Table TV Sessions, 18th International Television Symposium and Technical Exhibition, Montreux, Switzerland, Jun. 10, 1993, 22 pages.
Hobbes' Internet Timeline 10.2, by Robert H'obbes' Zakon, from the internet at http://www.zakon.org/robert/internet/timeline/, printed from the internet on Sep. 13, 2012, 29 pages.
Hofmann et al., "Videotext Programmiert Videorecorder," Rundfunktechnischen Mitteilungen, (Broadcast Engineering Reports), vol. 26 No. 6, pp. 254-257, Nov.-Dec. 1982. (translation attached), 23 pages.
Holland, "NAPLPS standard defines graphics and text communications," EDN, Jan. 10, 1985, 11 pages.
Iizuka et al., "The Overview of Internet TV Guide Japan—1 and 2," the 53rd National Conference Proceedings, Japan, Information Processing Society of Japan, Sep. 6, 1996, 5 pages. [english translation].
Ikejiri, Minoru et al., "Maruchimedia wo riido suru apurikeishon kaihatu," ("Application Development for Leading Multimedia"), Journal of NTT Technologies, Japan, The Telecommunications Association of Japan, vol. 7, No. 9, Sep. 1, 1995, pp. 48-55. (Concise explanation included in IDS letter.).
Imke, S., Interactive Video Management and Production, Educational Technology Publications, May 1991, http://www.amazon.com/Interactive-Video-Management-Production-Steven/dp/0877782334/ref=sr_1_1?ie=UTF8&qid=1416426739&sr=8-1&keywords=interactive+video+management+and+production&pebp=1416426742553, 2 pages.
Instruction Manual, "Using StarSight 2," StarSight Telecast, Inc., 1994, 27 pages.
Instructional Manual, "Sonic The Hedgehog," Sega of America, 1992, 11 pages.
Interactive Computer Conference Server, IBM Technical Bulletin, vol. 34, No. 7A, Dec. 1991, pp. 375-377.
Interface Device for Conventional TVs to Improve Functionality, IBM Technical Disclosure Bulletin, vol. 36, No. 7, Jul. 1993, 3 pages.
Internet User Forecast by Country, Computer Industry Almanac—Press Release, from the internet at http://www.c-i-a.com/internetusersexec.html, printed from the internet on Sep. 13, 2012, 3 pages.
IPG Attitude and Usage Study, prepared by Lieberman Research Worldwide for Gemstar—TV Guide International, Oct. 2002, 99 pages.
Irven, "Multi-Media Information Services: A Laboratory Study," IEEE Communications Magazine, vol. 26, No. 6, Jun. 1988, pp. 27-33 and 36-44.
Ishii et al, "Toward an Open Shared Workspace: Computer and Video Fusion Approach of Team Workstation," Communications of the ACM, Dec. 1991, vol. 34 No. 12, pp. 37-50.
Ishii, Hiroshi et al, "Clearface: Translucent Multiuser Interface for TeamWorkStation," ECSCW, Sep. 1991, 6 pages.
James, "Oracle—Broadcasting the Written Word," Wireless World, Jul. 1973, vol. 79 No. 1453, pp. 314-316.
Judice, "Move Over Cable, Here Comes Video Via Voice Lines," Network World, Sep. 1986, 3 pages.
JVC Service Manual, 27" Color Monitor/Receiver, Model AV-2771S (U.S.), Jul. 1991, 89 pages.

(56) References Cited

OTHER PUBLICATIONS

Kai et al., Development of a Simulation System for Integrated Services Television, Report from Information Processing Society of Japan, Japan, Sep. 13, 1996, vol. 96, No. 90 p. 13-20.
Karstad., "Microprocessor Control for Color-TV Receivers," IEEE Transactions on Consumer Electronics, vol. CE-26, May 1980, 9 pages.
Karunanithi, et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Khoo et al., "An Expert System Approach to Online Catalog Subject Searching," Information Processing & Management: An International Journal, vol. 30, No. 2, 1994, pp. 223-238.
Kojima, Akira et al., "Implementation Measures to Expand Metadata Application Services", http://www/ntt.co.jp/tr/0306/files/ntr200306051.pdf, (Jun. 2003), 6 pages.
Komarinski, Anonymous FTP p. 1, May 1, 1995 Linux Journal, 5 pages.
Kornhaas, "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.
Large, "Throw away the books—Viewdata's coming," Guardian, Jan. 10, 1978, 1 page.
Large, "Viewdata, the invention that brings boundless advice and information to the home, also sets a test for the Post Office," Financial Guardian, Jun. 20, 1978, 3 pages.
Lee, Hee-Kyung et al., "Personalized Contents Guide and Browsing based on User Preference", http://vega.icu.ac.kr/~mccb-lab/publications/Papers/PersionalizedTV(2002).pdf, (2002), 10 pages.
Letter from StarSight Telecast, Inc. to a StarSight IPG subscriber (with subscriber name, address and account number redacted) notifying the subscriber of termination of the StarSight IPG, 2003, 1 page.
Listing of computer code for operating system within the Cable Computer in 1985, 97 pages.
Loen et al., "Subscriber Terminal Units for Video Dial Tone Systems," IEEE Network, Sep./Oct. 1995, 10 pages.
Lowenstein, R.L. and Aller, H.E., "The Inevitable March of Videotex," Technology Review, vol. 88, Oct. 1985, 8 pages.
Lynch, Keith, timeline of net related terms and concepts, Mar. 22, 2007, 8 pages.
M/A-COM, Inc., "Videocipher II Satellite Descrambler Owners Manual," dated Feb. 1986, 20 pages.
Make Room for POP, Popular Science, Jun. 1993, 5 pages.
Mannes, "List-Mania, On-Screen, interactive TV guides that can program your VCR are just around the corner," Video Review, May 1992, 4 pages.
Mannes, "Smart Screens: Development of Personal Navigation Systems for TV Viewers," Video Magazine, Dec. 1993, 6 pages.
Mar. 19, 1985 letter from G. Knapp of CableData to R. Hansen of Weststar Communications, Inc. 6 pages.
Markowitz, "Companies Jump on Interactive Bandwagon," Discount Store News, Dec. 6, 1993, 3 pages.
McKenzie, "Oracle—An Information Broadcasting Service Using Data Transmission in the Vertical Interval," Journal of the SMPTE, Jan. 1974, vol. 83 No. 1, 7 pages.
Melton, "The Uniden Super 4800," OnSat magazine, Jun. 10-16, 1990, 4 pages.
Merrell, "Tac Timer," 1986 NCTA Technical Papers, 13 pages.
Miller, "A Scenario for the Deployment of Interactive Multimedia Cable Television Systems in the United States in the 1990s," IEEE, vol. 82:(4), 1994, 5 pages.
Money, "Teletext and Viewdata," Butterworth & Co. Ltd., London, 1979, 159 pages.
Mosley, J.D., "NAPLPS chip sets, though scarce, satisfy limited US videotex demand," EDN, Mar. 21, 1985, at p. 57, 4 pages.
MSI Datacasting Systems, TV Communications Journal, Jan. 1973, 2 pages.
Neumann, Andreas, "WDR Online Aufbau and Perspektiven Automatisierter Online Dienste im WDR," RTM Rundfunktechnische Mitteilungen, vol. 41, Jun. 1997, 45 pages.
Nikkei Click, You can do it now with your existing computer, Nikkei Business Publications, Inc., Aug. 8, 2000, vol. 7, No. 11, pp. 185-188 (No US Translation), 4 pages.
Oberlies, et al.; "VPS-Anzeige Und Uberwachungsgerat", Rundfunktechnische Mitteilungen, vol. 30, No. 1 Jan. 1986-Feb. 1986, Norderstedt (DE).
Okimi, Katsuya et al., "Shinban ISDN," ("New ISDN Edition"), Japan, Ohmsha, Ltd., First Edition, Oct. 5, 1995, 27 pages. (Concise explanation included in IDS letter).
Open TV fur interaktives Fernsehen, Trend and Technik, 9 -95 RFE, retrieved from the internet Sep. 6, 2006, 4 pages (English language translation attached).
Open TV Launches OpenStreamer Tm Technology for Broadcasters to Deliver First Ever Real-Time Digital Interactive Television, from the internet at http://www.opentv.com/news/openstreamer_pressfinal.htm, printed on Jun. 28, 1999, the document bears a copyright date of 1999, 2 pages.
Owen, "How dial-a-fact is coming closer to home," The Times, Sep. 30, 1977, 2 pages.
Owen, "Why the Post Office is so excited by its plans for a TV screen information service," The Times, Sep. 26, 1975, 4 pages.
Panasonic TX-33A1G Operating Instructions (undated), 33 pages.
Pazzani et al., "Learning and Revising User Profiles: The Identification of Interesting Web Sites," 27 Machine Learning, pp. 313-331 (1997).
Peddicord, "New on TV: You Bet Your Horse," The Sun, Baltimore Maryland, Dec. 15, 1994, 1 page.
Pfister, "Teletext: Its Time Has Come," Prepared for the IGC Videotext / Teletext Conference, Andover, Massachusetts, Dec. 14, 1982, 12 pages.
Philips TV Set, model No. 25 PT 910A, User Manual; 40 pages (undated).
Poole, "Demand for Viewdata grows," Sunday Times, Feb. 10, 1977, 3 pages.
Postel, J., Reynolds, J., Request for Comments: 959 File Transfer Protocol, Oct. 1985, 70 pages.
Prevue Guide Brochure, Spring 1984, 2 pages.
Prevue Guide Brochure, Spring 1994, 22 pages.
Prevue Networks and OpenTV(R) Agree to Work Together on Deploying Interactive Program Guides Worldwide, from the internet at http://www.opentv.com/news/prevuefinal.htm, printed on Jun. 28, 1999, 2 pages.
Prevue Networks, Inc. Promotional Materials (undated), 22 pages.
Probe XL Brochure, Auto Tote Systems Inc., (Newark, Delaware) (undated) 59 pages.
Prodigy Launches Interactive TV Listing, Apr. 22, 1994, Public Broadcasting Report, 1 page.
Product Comparison—Group messaging software: Having the last word, InfoWorld, Nov. 6, 1995.
PTV Recorder Setup Guide, Philips Electronics, TiVo Inc. (2000), 68 pages.
Qayyum, "Using IVDS and VBI for Interactive Television," IEEE, Jun. 10, 1996, 11 pages.
Rajapakshe et al., "Video on demand," (last modified Jun. 1995) <http://www-dse.doc.ic.ac.uk/~nd/suprise_95 /Journal/vol4/shr/report.html>, 14 pages.
Ramachandran, "Space-Time Memory: a parallel programming abstraction for interactive multimedia applications, SIGPLAN Notices", vol. 34:8 (Aug. 1999), pp. 183-192.
Raskutti et al., "A Feature-based Approach to Recommending Selections based on Past Preferences" 7 User Modeling and User-Adapted Interaction, pp. 179-218 (1997).
Rath et al., "Set-Top Box Control Software: A Key Component In Digital Video," Philips Journal Of Research, vol. 50, No. 1/2 1996, 8 pages.

(56) References Cited

OTHER PUBLICATIONS

Rayers, "Telesoftware by Teletext," 1984 IEEE Conference Papers, vol. 240, 3 pages.
RCA Satellite Receiver User's Guide, Thomson Multimedia Inc. (2001), 80 pages.
Rewind, replay and unwind with new high-tech TV devices, by Lawrence J. Magid, LA Times. This document was printed from the Internet on Jun. 6, 1999 and bears a date of May 19, 1999, 4 pages.
Robertson, "Reaching Through Technology," CHI '91 Conference Proceedings, Apr. 27-May 2, 1991, 6 pages.
Rogers, "Telcos vs. Cable TV : The Global View With Markets Converging and Regulatory Barriers Falling, Service Carriers Are Ready To Rumble," Data Communications, Sep. 21, 1995, vol. 24, No. 13, pp. 75-76, 78, 80, XP000526196, 8 pages.
Roizen, "Teletext in the USA," Society of Motion Picture and Television Engineers Journal, Jul. 1981, pp. 602-610.
Rosch, "New data and information system set for commercial market trial," Telephony, Mar. 20, 1978, 4 pages.
Roseville City Council Presentation, Mar. 13, 1985, 12 pages.
Ruffler et al., "InfoRadio on Demand, WebTV and digiTaz—Telecommerce Case Studies," 3rd International Workshop on Community Networking, 1996, May 23-24, 1996, 8 pages.
Ryan, "Interactive TV Takes a Corporte Twist," Electronic Engineering Times, Jul. 10, 1995, 3 pages.
Ryan, K., "Free Interactive TV Guide," Google Newsgroup, Alleged Date Sep. 29, 1995, 1 page.
Saito, Takeshi, et al., "Homenetwork Architecture Considering Digital Home Appliance," Technical Committee meeting of The Institute of Electronics, Information and Communication Engineers (IEICE), Japan, Nov. 6, 1997, vol. 97, No. 368, 32 pages.
Sandringham, "Dress rehearsal for the PRESTEL show," New Scientist, Jun. 1, 1978, 3 pages.
Sato, T. et al., WWW jou no eizou browsing kikou no teian to Jitsugen [A Proposal for A Video Browsing Mechanism on World Wide Web and its Implementation], Japan Society for Software Science and Technology, collection of 14th convention articles, Japan, Japan Society for Software Science and Technology, Sep. 30, 1997, 6 pages.
Savage, "Internet's 'What's on Tonite!' Tells You Just That and More," The News, InfoWatch, May 29, 1995, 1 page.
Schauer, Tom, No subject, (tschauer@moscow.com) Thu, Sep. 28, 1995 16:46:48-700, XP-002378870 [Retrieved from the Internet Apr. 28, 2006], 1 page.
Schlender, B.R., "Couch Potatoes! Now It's Smart TV," Fortune, Nov. 20, 1989, 8 pages.
Schmuckler, Eric "A marriage that's made in cyberspace (television networks pursue links with online information services)," May 16, 1994 Mediaweek, vol. 4, No. 20, 5 pages.
Sealfon, Peggy, "High Tech TV," Photographic, Dec. 1984, 2 pages.
Selected Pages from the "BBC Online—Schedules" web page. This web page is located at http://www.bbc.co.uk/schedules/ (as printed from the Internet on Oct. 19, 1999 and being dated as early as May 24, 1997, 6 pages.
Sharpless et al., "An advanced home terminal for interactive data communication," Conf. Rec. Int. Conf. Commun. ICC '77, IEEE, Jun. 12-15, 1977, 6 pages.
Soin et al., "Analogue-Digital ASICs", Peter Peregrinus Limited, 1991, 9 pages.
SONICblue Incorporated: ReplayTV 4000 User Guide 12.17, Chapter Five: Networking, Sep. 10, 2001, retrieved from the internet: http://www.digitalnetworksna.com/support/replayTV/downloads/ReplayTV4000UserGuide. 12.17.pdf, 13 pages.
Sorce, David Fay, Brian Raila and Robert Virzi, "Designing a Broadband Residential Entertainment Service: A Case Study," GTE Laboratories Incorporated, undated, 9 pages (undated).
Split Personality, Popular Science, Jul. 1993, at p. 52, 5 pages.
StarSight CB 1500 Customer Letter, 1994, 1 page.
StarSight Operating Guide and Quick Reference, 19 sheets (undated).
StarSight Telecast, StarSight introduces TVGuide-like programmer for homes, 1994, 1 page.
Start Here, Sony, TiVo and DIRECTV (undated), 8 pages.
Stickland, D.C., "Its a common noun," The Economist, Jun. 5, 1978, 1 page.
Stokes, "The viewdata age: Power to the People," Computing Weekly, Jan. 1979, 2 pages.
STORit, Report on the IBC'99 Demonstration, Deliverable #8 AC312/phi/prl/ds/p/008b1 Oct. 1999, 35 pages.
Sunada, et al, "Teletext Color Television Receiver Model C-29M950, C26M940," NEC Home Electronics, NEC Giho, 1987, 16 pages.
Super-TVs, Popular Science, Jul. 1985, at p. 64, 7 pages.
SuperGuide on Screen Satellite Program Guide, User's Guide, Owner's Manual, and sales literature, 74 pages (undated).
SuperGuide/Uniden 4800, "A Quick Guide to Programming the Uniden 4800—Dealer Set-Up Manual," undated, 8 pages.
SuperGuide/Uniden 4800, "A User's Guide to SuperGuide's ™ Features," undated, 12 pages.
Supplementary European Search Report for Application No. EP 98 93 5889, completed on Sep. 28, 2001, 3 pages.
Sussman, "GTE Tunes In to Home TV Shopping," PC Week, vol. 5(26), Jun. 28, 1988, 2 pages.
Symposium Record Cable Sesssions, "Digital On-Screen Display of a New Technology for the Consumer Interface," Publication Date May 1993, 17 pages.
Tech Notes: Product Updates from M/A-COM Cable Home Group, "Videocipher Owners Manual Update," Issue No. 6, Feb. 1986, 19 pages.
Technical White Paper, "Open TV™ Operating Environment," (© 1998 OpenTV Inc.), pp. 1-12.
Technological Examination & Basic Investigative Research Report on Image Databases, Japan Mechanical Engineering Organization Int'l Society for the Advancement of Image Software, Japan, Mar. 1988, 127 pages.
Technology Overview for TVv Guide on Screen Information Sheets, 9 pages (undated).
Technology: Turn on, tune in and print out—An experimental interactive television service is set to alter our viewing habits, Financial Times (London), Oct. 14, 1993, p. 11.
Teletext presents the alternative view, Financial Times, Oct. 24, 1977, 2 pages.
The clickTV television program guide website of TVData of Queensbury, New York. This website is located at www.clicktv.com (as printed from the Internet on Aug. 13, 1997), 33 pages.
The Columbia House Video Club: Download Software, accessed from the internet at http://web.archive.org/web/19961223163101/http://www.columbiahouse.com/repl/vc . . . , copyright 1996, printed on Sep. 19, 2013, p. 1.
The InfoBeat television program guide website of InfoBeat, Inc. This website is located at www.infobeat.com (as printed from the Internet on Dec. 8, 1997), 46 pages.
The New Media and Broadcast Policy: An Investigation & Research Conference Report on Broadcasting Diversification, Radio Regulatory Bureau, Japan Ministry of Posts & Telecommunications, Mar. 1982, 114 pages.
The television program guide website of Gist Communications, Inc. of New York, New York. This website is located at www.gist.com (as printed from the Internet on Aug. 14, 1997), 133 pages.
The television program guide website of TV Guide Entertainment Network. This website is located at www.tvguide.com (as printed from the Internet on Aug. 13-18, 1997), pp. 139.
Thomas, "Electronic Program Guide Applications—The Basics of System Design," NCTA Technical Papers, 1994, pp. 15-20.
Three men on a Viewdata bike, The Economist, Mar. 25, 1978, pp. 1-2.
Today's Stop: What's On Tonite, Oct. 3, 1995, retrieved from the internet at http://internettourbus.com/arch/1995/TB100395.TXT, 3 pages.
Tol, et al., "Requirements and Scenarios for the Bi-directional Transport of Metadata", TV Anytime Meeting, Version 1.0, Document TV150 (Aug. 2, 2002), 7 pages.
Transcript of the Deposition of John Roop, Jun. 2001, p. 608.
Transcript of the Deposition of John Roop, Oct. 1996, pp. 186-187, 2 pages.

(56) References Cited

OTHER PUBLICATIONS

Transcript of the testimony of Brian Klosterman, May 1997, pp. 1700-1981, 275 pages.
Transcript of the testimony of Michael Faber and Larry Wangberg, May 1996, 189 pages.
Trial testimony of *Michael Axford, Prevue Interactive, Inc. and United Video Satellite Group, Inc*. v. *StarSight Telecast, Inc*., May 9, 1998, pp. 186-187, 295-315, and 352-357.
TV Guide movie database Internet web pages printed on Aug. 12, 1999, 9 pages.
TV Guide on Screen prior Use Transcript of Proceedings—"Violence on Television," House of Representatives, Committee on Energy and Commerce, Subcommittee on Telecommunications and Finance, Jun. 25, 1993, 36 pages.
TV Guide Online Set for Fall, Entertainment Marketing Letter, Aug. 1994, p. 1.
TV Listings Functional Spec., Time Video Information Services, Inc., 11 pages, undated.
Ueda, Hirotada et al, "Impact: An Interactive Natural-Motion-Picture Dedicated Multi-Media Authoring System," Communications of the ACM, Mar. 1991, 15 pages.
Uniden, UST-4800 Super Integrated Receiver/Descrambler, Preliminary Reference Manual, 80 pages, Nov. 12, 1991.
Uniden, UST-4800, Integrated Receiver/Descrambler, Installation Guide, 60 pages, © 1990, Uniden America Corporation.
Uniden, UST-4800, Integrated Receiver/Descrambler, Operating Guide, 24 pages, © 1990, Uniden America Corporation.
User's Guide RCA Color TV with TV Plus + Guide, Thomson Consumer Electronics (1997), 88 pages.
UVSG Offers System-Specific Web Site Development for OPS, press release of United Video Satellite Group, Apr. 12, 1996, 2 pages.
UVSG Teams With Microsoft on Internet Information Server, press release of United Video Satellite Group, Feb. 22, 1996, 2 pages.
Various publications of Insight Telecast, 1992 and 1993, 10 pages.
Veith, "Television's Teletext," Elsevier Science Publishing Co., Inc, 1983, pp. 13-20, 41-51.
Verknupfung Von TV Mit Internet, Forschung & Entwicklung, vol. 68, No. 18, Aug. 16, 1996, 5 pages.
Verlag, Wilhelm Goldmann, Revolution on the Screen, 2nd Ed. 1979, 17 pages (English Translation).
Video Plus, Billboard, vol. 98, No. 4, Jan. 25, 1986, at p. 25, 4 pages.
Videocipher Stipulation, May 1996, 5 pages.
VideoGuide User's Manual, 14 sheets (undated).
VideoGuide, "VideoGuide User's Manual," pp. 1-28 (p. 11 is the most relevant).
Viewdata and its potential impact in the USA: Final Report/vol. One, The UK Experience, Link and Butler Cox & Partners Limited, Oct. 1978, 129 pages.
Viewdata moves in US but GEC may lose out, Computing Weekly, Jan. 25, 1978, 1 page.
Vision/1 from Tecmar, IBM transforms PS/1 into a TV, Info World, vol. 14(9), Mar. 2, 1992, at p. 34, 3 pages.
Waldo, Jim, "JiniTM Architecture Overview," from the Internet at http://Java.sun.com/products/jini/whitepapers/architectureoverview.pdf/ printed on Jan. 25, 1999. The document bears a copyright date of 1998, 18 pages.
Web TV and Its Consumer Electronics Licenses debut First Internet Television Network and Set Top Box XP 002113265 Retrieved from the Internet: <URL http://www.webtv.net/company/news/archive/License.html> Jul. 10, 1996, 6 pages [retrieved on Dec. 1, 2005].
Welcome to Columbia House Online, accessed from the internet at http://web.archive.org/web/19961221085121/http://www.columbiahouse.com/, copyright 1996, printed on Sep. 19, 2013, 1 page.
Whale, "Identification of Program Similarity in Large Populations," The Computer Journal, vol. 33, No. 2, 1990, pp. 140-146.
Whitehorn, "Viewdata and you," Observer, Jul. 30, 1978, 1 page.
Wikipedia article on CompuServe, Mar. 22, 2007, 7 pages.
Wikipedia article, "Geschichte des Internets," from the internet at http://de.wikipedia.org/wiki/Geschichte_des_Internets, page last modified on Apr. 28, 2012, printed from the internet on May 18, 2012, 17 pages (Concise explanation included in IDS letter).
Wikipedia article, "Internet Explorer," from the internet at http://de.wikipedia.org/wiki/Internet_Explorer, page last modified on Sep. 9, 2012, printed from the internet on Sep. 13, 2012, 14 pages (Concise explanation included in IDS letter).
Wikipedia article, "MSN TV," from the internet at http://en.wikipedia.org/wiki/MSN_TV, page last modified on May 15, 2012, printed from the internet on Sep. 13, 2012, 10 pages.
Wikipedia article, "NCSA Mosaic," from the internet at http://de.wikipedia.org/wiki/NCSA_Mosaic, page last modified on Sep. 3, 2012, printed from the internet on Sep. 13, 2012, 2 pages (Concise explanation included in IDS letter).
Wikipedia article, "TVGN," from the internet at http://en.wikipedia.org/wiki/TVGN, page last modified on Nov. 17, 2014, printed from the internet on Nov. 18, 2014, 12 pages.
Wikipedia-Teletext Excerpt (English Translation), printed from the internet Jul. 1, 2013, 18 pages.
Williams, David M., and Perry, Burt, "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.
Windows 98 Feature Combines TV, Terminal and the Internet, New York Times, Aug. 18, 1998, 1 page.
Winkler, M., "Computer Cinema: Computer and video: from TV converter to TV studio," Computerkino, (translation) Exhibit NK 13 of TechniSat's nullity action against EP'111, 14 pages (1992).
Wittig et al, "Intelligent Media Agents in Interactive Television Systems," Proceedings of the International Conference on Multimedia Computing and Systems, Los Alamitos, CA, US, May 15-18, 1995, p. 182-189, XP 000603484.
Wolfe, Alexander, "Beyond the SIPC," Electronic Engineering Times, No. 910, Jul. 15, 1996, 2 pages, Abstract.
Wolfe, Alexander, "Microsoft Poses PC Specs.," Electronic Engineering Times, Jul. 8, 1996, Abstract, 2 pages.
Yarrow, "The Media Business; Pay-Per-View Television is Ready for Takeoff," The New York Times, Archives, Nov. 14, 1988, 3 pages.
Yee Hsiang Chang et al., "An Open-Systems Approach to Video on Demand," IEEE Communications Magazine, May 1994, 23 pages.
Yoshida, "Interactive TV a Blur," Electronic Engineering Times, Jan. 30, 1995, 2 pages.

* cited by examiner

METHOD OF AND SYSTEM FOR PRESENTING ENRICHED VIDEO VIEWING ANALYTICS

CROSS-REFERENCE TO RELATED APPLICATIONS

This application claims the benefit under 35 U.S.C. §119 (e) of U.S. Provisional Patent Application No. 61/241,444, entitled Method of and System for Presenting Enriched Video Viewing Analytics, filed Sep. 11, 2009, which is herein incorporated by reference in its entirety.

BACKGROUND OF THE DISCLOSURE

1. Field of the Invention

The invention generally relates to analytics associated with audio/video content items, and, more specifically, to providing statistical and analytical information on past, present, and predicted future viewing and user-interaction operations as well as providing a structured metacontent system for content items.

2. Description of Related Art

The information regarding the subscribers and households that, at any time, are tuned to a television station or program, interacting with a video-on-demand (VOD) asset, or watching an internet video can be economically very important to content providers, advertisers and service providers. Also important is information regarding the subscribers' ongoing operations (e.g., play, pause, rewind, and/or fast-forward operations) and the video frame(s) involved in the operations at that time.

BRIEF SUMMARY OF THE DISCLOSURE

In one aspect, a method of and system for presenting enriched video viewing analytics is presented.

In another aspect, a method of determining interaction analytics for user interactions with a catalog of audio/video content items is presented. The method includes providing a predefined collection of content identifiers for identifying content items based on characteristics of the content items and providing access to a catalog of content items. A plurality of the content items of the catalog are associated with metacontent describing a corresponding content item. The method further includes analyzing the metacontent associated with at least one of the plurality of content items of the catalog and associating at least one content identifier with said at least one content item based on the metacontent associated with said at least one content item. The method also includes monitoring user interactions with the content items of the catalog and forming historical records of said interactions. The historical records include at least one content identifier associated with the content items with which the user interacted. The method further includes determining interaction analytics for at least one of a set of content items of the catalog and/or a set of users having interacted with the content items of the catalog based on the historical records of user interactions and based on at least one specified content identifier.

In yet another aspect, the method further includes identifying a type of device the user is using to interact with the content items. The determining the interaction analytics for the set of users having interacted with the content items includes determining at least one of a number of and a set of a specified type of device the users are using to interact with content items during a specified period of time. Optionally, the specified period of time is a current period of time.

In a further aspect, the specified period of time is a past period of time, and the method further includes estimating at least one of a number of and a set of a specified type of device users will use during a future period of time to interact with content items based on the interaction analytics determined for the past period of time.

In yet a further aspect, determining the interaction analytics includes determining at least one of a number of and a set of users performing at least one specified interaction during a specified period of time. Optionally, the specified period of time is a current period of time.

In another aspect, the specified period of time is a past period of time, and the method further includes estimating at least one of a number of and a set of users who will perform the specified interaction with content items during a future period of time based on the interaction analytics determined for the past period of time.

In still a further aspect, the determining interaction analytics includes determining at what playback position in a content item a specified user was interacting with said content item during a specified period of time. The content item being specified by the at least one specified content identifier. Optionally, the specified period of time is a current period of time.

In another aspect, the method further includes presenting a portion of the content item corresponding to the determined playback position.

In a further aspect, the interaction analytics for the set of users having interacted with the content items includes determining a set of content item preferences for at least one of the users.

In yet another aspect, the method further includes determining a time during which the at least one of the users is interacting with the content items of the catalog and presenting an advertisement for at least one content item based on the set of content item preferences for the at least one user and based upon at least one of a content identifier associated with said advertized content item and the metacontent associated with said advertized content item.

In another aspect, a method of presenting enriched statistical and analytical information includes receiving a catalog of a plurality of content items. Each content item has associated metacontent characterizing the content item. The method also includes receiving and storing operations of a user for interacting with one or more of the content items. The method further includes determining use and/or viewing statistics for, for example, the content items, metacontent associated with the content items, the numbers and types of devices viewing the content items, subscriber information, household information, and/or viewer demographic information for past and present time periods.

In a further aspect, the method includes estimating the likelihood of future user interaction operations based on the received interaction operations and metacontent associated with the content items.

In yet another aspect, named entities are associated with at least one of the content items based on the metacontent associated with said content item. The information associated with the named entities complies with a predetermined information hierarchy.

In still a further aspect, the statistics determined include one or more of the number and set of viewing devices currently interacting with the network, the number and set of subscribers and/or households corresponding to any one or more device(s), the identity and enriched tag and/or metacontent information associated with any one or set of content items, the current interaction operation and video frame metacontent corresponding to each device operating on a particular content item or subset of items at a designated time, the actual image and/or video stream (or link thereto) corresponding to a video frame displayed and/or downloaded to each device operating on a particular content item or set of content items at a given time, the enriched tags associated with the past interaction operations of each device, subscriber and/or household, statistical weights associated with each device, subscriber and/or household, wherein the statistical weights are correlated with a particular device, subscriber and/or household based on learning preferences from past interaction operations, such as viewing history, demographic information and/or subscription information of each household associated with one or more particular devices.

DETAILED DESCRIPTION OF EMBODIMENTS OF THE INVENTION

An illustrative embodiment of the present invention provides methods of and systems for determining statistical and analytical information based on user interactions with a system that provides audio/video content to a user. The statistical and analytical information can include, for example, past, present, and predicted future content consumption by a user and user/system interaction operations. In at least one implementation, a structured metacontent system for content items is provided. As used herein, the "present" state of a device and/or system can include the last known state of the device and/or system. Further, as used herein, "audio/video content" means content having at least one of audio or video content. Thus, for example, audio/video content includes televisions programs and movie, which have both audio and video content, as well as music, which has audio content only.

Figure 1:
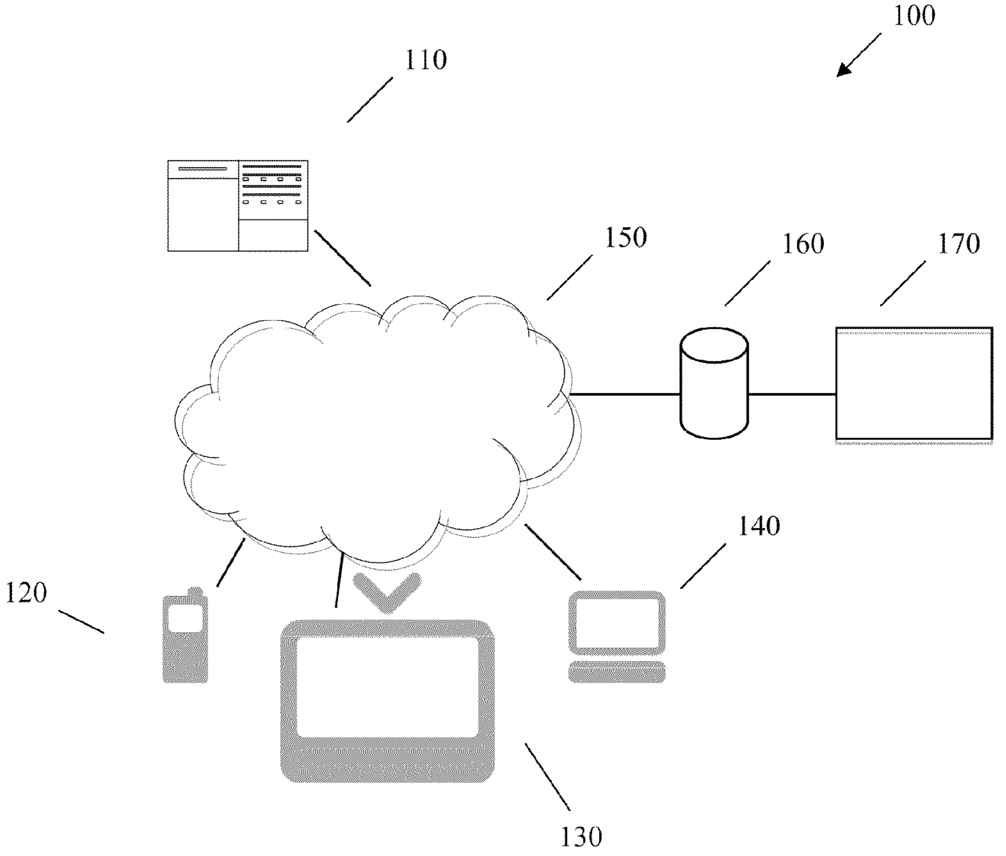
FIG. 1 shows an illustrative service provider network for receiving system interaction operations and for providing content to a user.

FIG. 1 illustrates a service provider network 100 for receiving system interaction operations and for providing content to a user. The service provider network 100 includes service provider servers 110 for providing content items (e.g., audio/video content, television programs, videos, movies, etc.) to users requesting such items and logging user interactions with various elements of the system (i.e., tracking user actions and recording the same). The users can request, interact with, and view such items on a variety of devices, including, for example, mobile devices 120 (e.g., video-enabled mobile telephones and/or mobile computing devices), television sets 130 (with or without set-top-boxes (herein "STB")), and/or computer systems 140. The service provider servers and users are connected by a subscriber network 150. The subscriber network 150 can be a private or limited access network, such as a cable system network, or the subscriber network 150 can be a public network, such as the Internet. Optionally, the service provider servers 110 can be directly connected to the users' devices.

In an illustrative implementation, service provider servers 110 include one or more home media servers 160 that are used to provide content items directly to a presentation device 170 and/or other user devices for presentation. In another implementation, one or more home media servers 160 are separate from service provider servers 110 but are able to receive content items from servers 110. The home media server 160 can be located in a user's home or other location remote from other service providers' servers. The home media server 160 can provide a search and/or storage service that allows user devices to find particular content items. The content items can include music, audio/video content (e.g., movies, television shows, web clips, etc.), still-images, and other types of content. Once found, the content items can be directly served to a presentation device for listening and/or viewing, or the content items can be transferred to another device for later consumption by the user.

Content items of any of multiple known formats can be simultaneously stored in the home media server 160. For example, music can be in the form of WAV, AIFF, MP3, WMA, and/or other types of files. Still-images can be in the form of GIF, JPEG, PNG, and/or other types of files. Live television broadcasts (e.g., over-the-air or through a network connection) can be provided through the home media server 160 as can content items stored on a Personal Video Recorder device. A Digital Video Recorder function can be performed by the home media server 160. Moreover, any number of content items can be presented in a collection-style format. For example, multiple still-images can be presented in the form of a slide show, or several songs can be grouped and presented in an album format.

Upon a user interacting with the service provider network 100, the service provider servers 110 receive and log each interaction operation and/or command. In addition, the servers 110 can, optionally, respond as appropriate to each operation, e.g., if content is requested, the servers 110 transmit the requested content. However, the servers 110 are not required to serve the content items requested by the user. Further still, the servers 110 can receive a record of interaction operations and/or commands that have been temporarily stored in a different device. For example, in a television system, an STB initially receives the user's tuning command and responds by tuning the television to the appropriate channel. The STB also logs the tuning command and transmits a record of the tuning action, along with other user interactions, to the servers 110 at a later time. In an embodiment including the home media server 160, described above, the home media server logs the interaction operations and commands for later transmittal to the servers 110. In other implementations of the service provider network 100, the servers 110 log television tuning operations (including digital video recorder (DVR) operations), video-on-demand system interactions, and/or internet video click operations (from, for example, an STB and/or computer or mobile devices). The servers 110 also log these, and other, operations in real-time and store the information in logs for near-instantaneous data. This information is transmitted to an event processing system, described in greater detail below.

Figure 2:
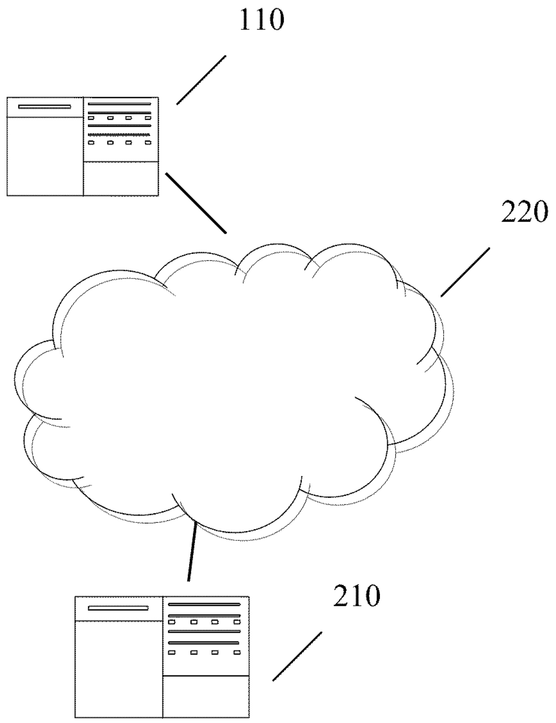
FIG. 2 shows an illustrative event processing system cooperating with the service provider's network for collecting and logging system interaction operations.

FIG. 2 illustrates an event processing system 210 cooperating with the service provider servers 110 for collecting and logging system interaction operations. If included in the system, a home media server, described in more detail above, may communicate directly with the event processing system 210 or by way of servers 110. The servers 110 and event processing system 210 communicate via a network 220. Network 220 can be a private or limited access network between the servers 110 and system 210. In addition, network 220 can include the Internet. All operations, user interaction, commands, and content item use data (herein "Event Logs") are transmitted over network 220 from the servers 110 to the event processing system 210.

Figure 3:
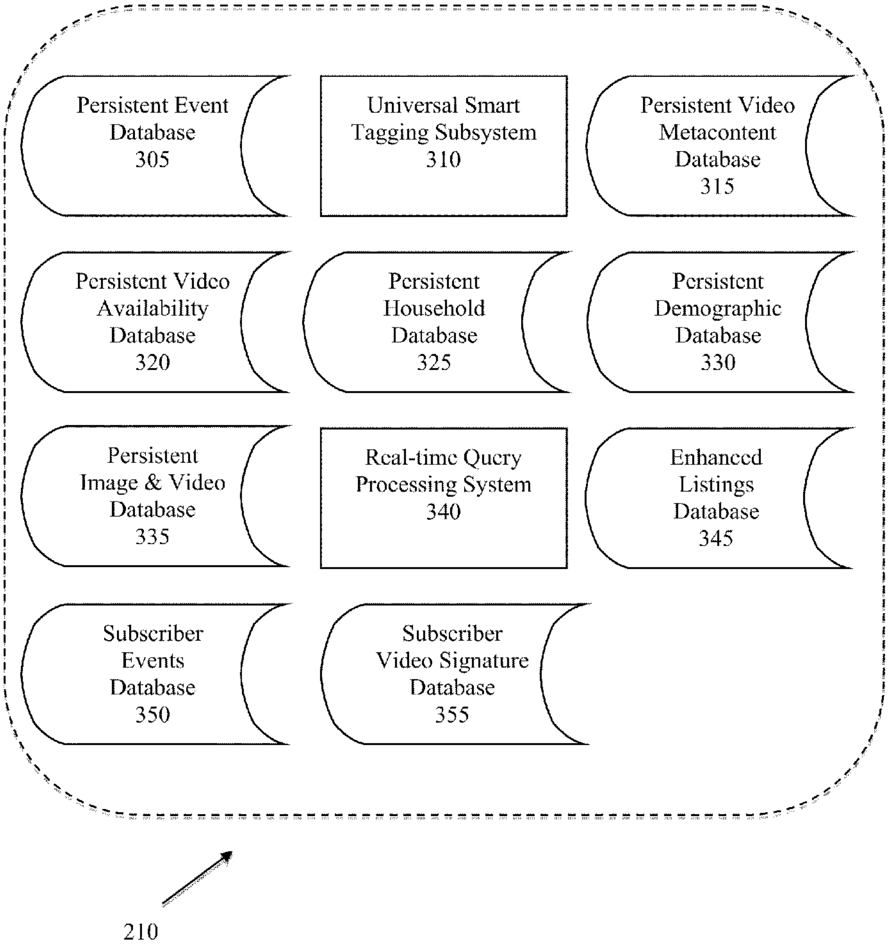
FIG. 3 shows illustrative components of the event processing system of FIG. 2 for retaining user interaction operations and generating analytics.

FIG. 3 illustrates components of the event processing system 210 of FIG. 2 for retaining user interaction operations, system use data, and generating analytics. The event processing system 210 includes a persistent event database 305 that correlates the information from the Event Logs with, e.g., television electronic program guide (EPG) listings, VOD asset listings and Internet video listings. Thus, the persistent event database 305 provides, for example, for each device using the service provider network 100, the current state of the television, STB, computer, and/or mobile device. In this context, "state" means at least the specific channel and/or program identifier currently being presented on the device, as well as how far into the content the presentation has progressed (e.g., the playback counter value). Database 305 can also provide the specific VOD asset identifier and the current playback position in the device's video stream, the program identifier corresponding to the DVR recording or internet video and current playback position in the DVR recording or internet video, as well as the current video frame, the current operation (e.g., play, pause, rewind, and/or fast-forward) being performed at any time, including in real-time as well as any past-time, and the entire interaction history of each television, STB, computer, and/or mobile device in terms of its states during previous time intervals.

The event processing system 210 also includes a universal smart tagging subsystem 310. The universal smart tagging subsystem 310 includes one or more databases for the storage and retrieval of information. The actual arrangement and structure of the databases described herein is not intended in a limiting sense, but is merely illustrative. The universal smart tagging subsystem 310 includes a database of named entities, each of which is associated with a globally unique identifier (GUID). The named entities include known entities, topics, and/or content items or collections with which metacontent is associated. For example, the named entities can include famous or popular personalities (e.g., actors, sports heroes, politicians, and/or musicians), musical groups, sports teams, sports tournaments or leagues, movies, television shows, scientific topics, and/or political topics. The foregoing list is illustrative only, as other types of entities are within the scope of the invention. As described in more detail below, one advantage of the use of the name entities is to permit an "accepted identifier" to be established for the entity.

The database of named entities is formed from sources of information that are known to be (or have been designated) reliable sources of information for a particular topic. For example, ESPN websites and databases can provide named entities, and associated information, for sports-related topics; the IMDb website and databases can provide named entities, and associated information, for movie-related topics; and the Gracenote® databases can provide named entities, and associated information, for digital entertainment (e.g., music). The sources are merely illustrative, as other information sources, both public and private (e.g., amazon.com, Wikipedia, and Last.FM), can provide sources of information to use for named entities and associated information. Moreover, the database of named entities is constantly updated and improved in the sense that metacontent and popularity estimates for existing named entities may be modified to reflect the present status of the entities. Moreover, new named entities are added to the database as they are discovered. For example, as a new movie is advertised, it can be added as a named entity to the database in the universal smart tagging subsystem 310.

Metacontent that describes or is otherwise associated with the named entities is then associated with the named entities in the universal smart tagging system 310. The metacontent that becomes associated with the named entities depends on the named entity itself. For example, if a particular named entity is a movie, then the genre of the movie, character names, actor names, cities in which the movie takes place, famous quotes, other keywords, etc. are associated with the named entity. In contrast, if the named entity is an athlete, then the sport played, the athlete's team, awards received, etc. are associated with the named entity.

Figure 4:
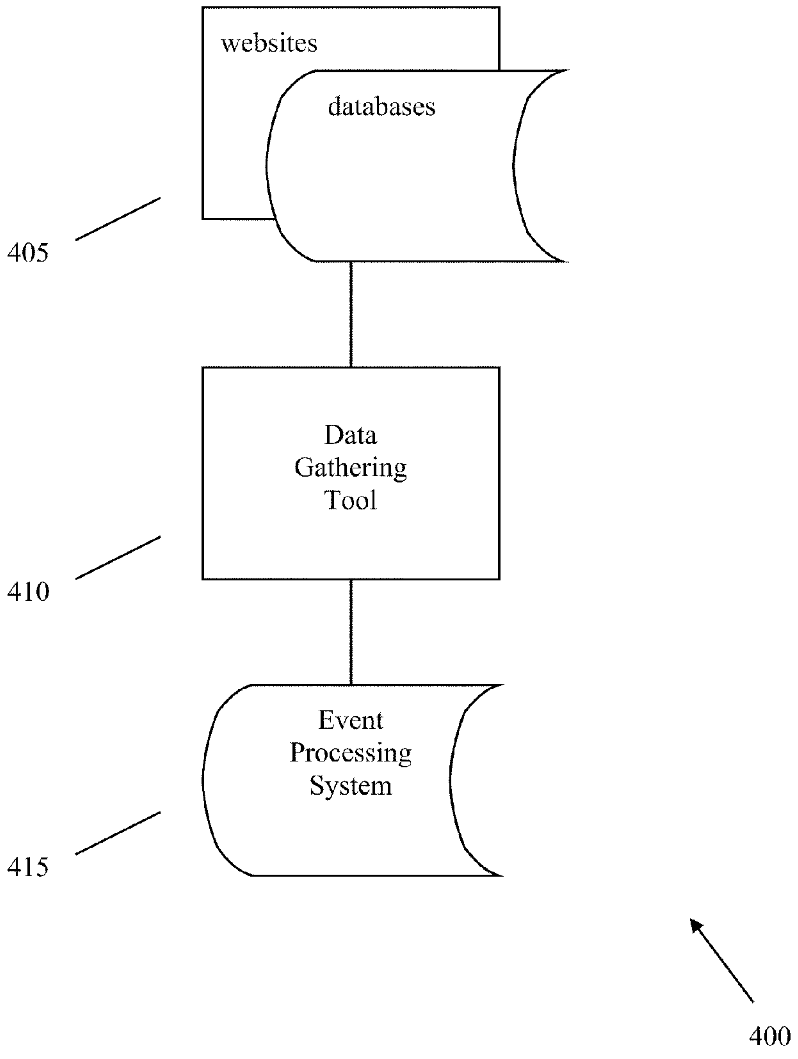
FIG. 4 shows an illustrative process for populating or updating a universal smart tagging subsystem.

FIG. 4 shows an illustrative process 400 for populating or updating the universal smart tagging subsystem 310. A data source 405 is identified that contains named entities and/or information associated with named entities, for example, a website and/or a licensed database. A data gathering tool 410, for example, an Internet website "crawler", processes the website to capture candidates for named entities and associated information. The information that is gathered is then stored in the event processing system 210 (at 415).

Figure 5:
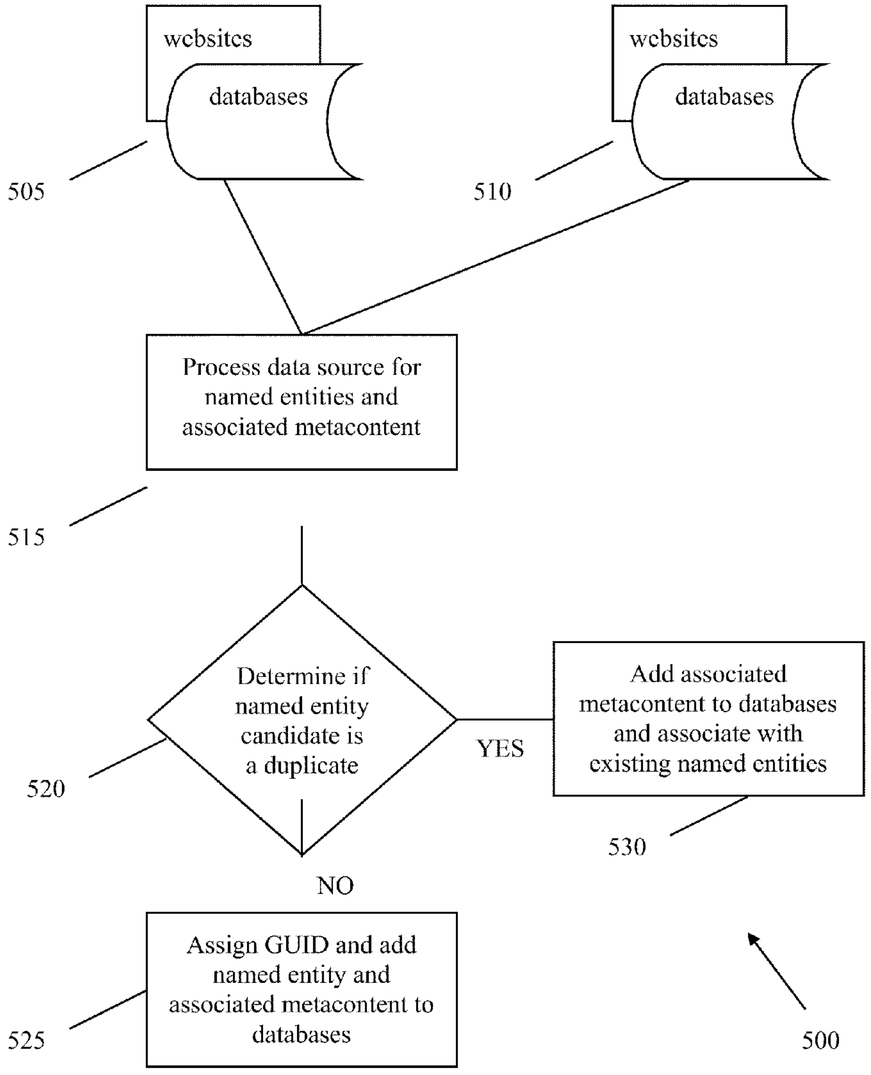
FIG. 5 shows an illustrative process for creating and/or augmenting a database of named entities.

Meanwhile, FIG. 5 shows an illustrative process for creating and/or augmenting the database of named entities. A new source of potential named entity candidates 505 is processed and/or a previously processed source of named entities 510 is reprocessed to identify named entity candidates from the source(s) (step 515). Each candidate is checked to determine if it is a duplicate of a named entity already present in the named entity database (step 520). If the new candidate is not a duplicate of an existing named entity, it is assigned a GUID, and it and its associated metacontent are added to the event processing system 210 databases (step 525). If the candidate is already present in the named entity database, then the metacontent associated with the candidate is added to the event processing system 210 databases and associated with the existing named entity (step 530).

Figure 6:
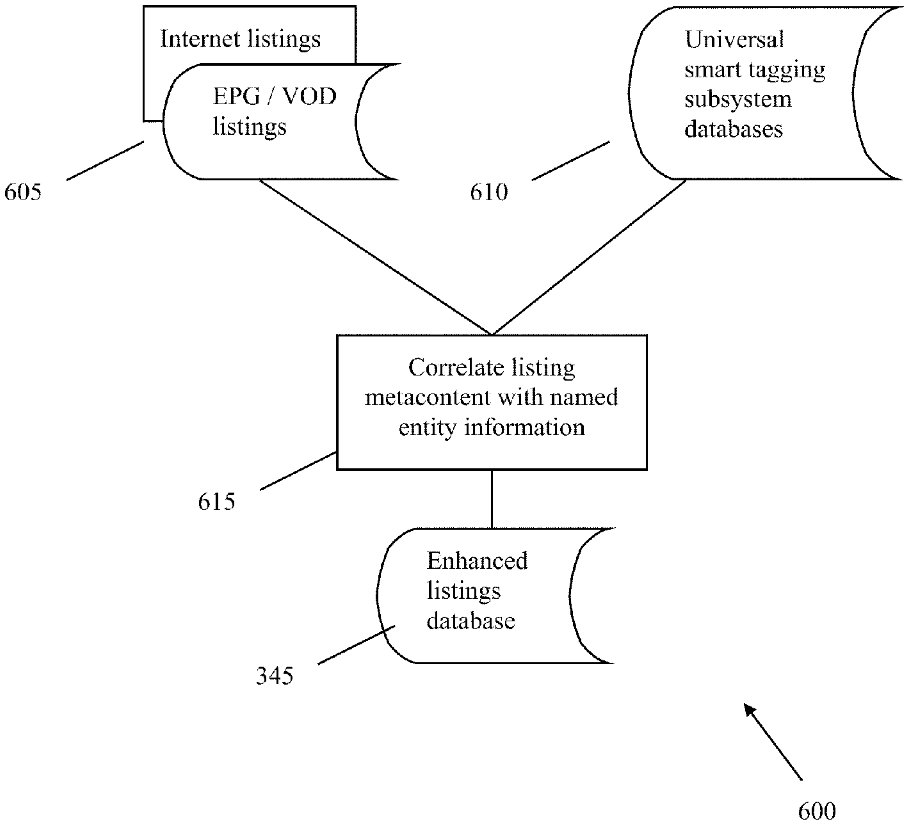
FIG. 6 shows an illustrative process for correlating metacontent of content items of a listing with named entity information.

The universal smart tagging subsystem 310 receives current, past, and future listings of content items from television EPG, VOD, and/or internet video sources, and determines for the metacontent descriptions for each program asset, video, and/or listing in those sources certain additional "rich tags". In the described implementation, the rich tags are the named entities that have an association in the event processing system 210 with metacontent that matches the metacontent found the aforementioned listings. Thus, in an illustrative implementation 600, shown in FIG. 6, the metacontent for each item in a television EPG listing, VOD listing, Internet video listing, and/or walled garden (i.e., access-controlled content) 605 is correlated with the named entity information 610 in the universal smart tagging subsystem 310 (process 615) so that relationships between items of the listing and named entities are created so as to populate an enhanced listings database 345. In other words, the rich tags to be associated with the television program are determined by using intelligent heuristics to match each metacontent, or set of metacontent, in the listing with the universal repository of metacontent descriptions for movies, television shows, and/or episodes, which are, in turn, associated with named entities. Thus, the universal smart tagging subsystem 310 and associated rich tags enable consistent and structured categorization, description, and characterization of each content item. The same is true outside the television space.

In an illustrative implementation, the intelligent heuristics used to associate content items and their metacontent with named entities includes a set of rules developed from an analysis of large collections of content items, their associated metacontent, and capturing the patterns exhibited in the collections. These rules can then be applied on multiple sets of listings information. In addition, the rules can be formed on the basis of the types of information included in professionally edited video metacontent as well as, and in contrast to, user-generated collections of metacontent. For example, one pattern discovered in such an analysis is that professionally edited video metacontent typically contains the entire title of the content item. In contrast, user-generated collections of metacontent may only include a partial title. Thus, finding a partial match between a full title (in metacontent associated with a named entity) and a partial title (in metacontent associated with the content item of a listing) would still permit an association between the named entity and the content item to be formed.

Other rules can be formed based on monitoring the behavior of users of content provider systems over time. Such a collection of rules enables the associations created by embodiments of the present invention to adapt as user content search behavior changes. For example, by monitoring the search strings submitted by users of a VOD system when searching for movies, it has been discovered that users commonly employ Roman numerals in their search string when searching for a movie that is a sequel. Thus, content items that have metacontent describing the content item as a movie and a sequel can be associated with an appropriate Roman numeral named entity.

A further example of creating a rule based on user content search and selection behavior is based on the observation that users may often forget the title of a particular movie, television show, and/or video series. However, the user more often recalls the names of the actors, actresses, and/or characters featured in the movie, show, and/or series. Thus, a rule is employed that forms an association between a named entity that is a full proper title of an item or series and the content items themselves based on the names of actors, actresses, and/or characters being present in the metacontent associated with the content item.

For example, if a particular internet video content item is listed on-line as "Bart and Homer", the universal smart tagging subsystem 310 will associate a named entity "The Simpsons" as the correct title of the video item. The system makes this association because the characters "Bart" and "Homer" are the names of two main characters in the metacontent associated with the named entity "The Simpsons" (a television show) present in the named entity database. In addition to title information, the universal smart tagging subsystem 310 can associate tags with content items for all actors associated with the content item, any topics related to the listing or subject matter of the listing, and/or any genre information characterizing the content item. Such a consistent and complete tagging system increases the accuracy of the determination of system statistics and analytics, as set forth in more detail below.

The foregoing rules are by no means exhaustive of the rules that can be employed. Rather, the rules described above are merely illustrative of the types of rules can that be developed by analyzing large collections of content items, their associated metacontent, and capturing the patterns exhibited in the collections as well as monitoring user content search and content selection behavior. Moreover, rules can be applied individually and/or in the aggregate with other rules. In other words, an association can be made between a named entity and a content item simply by satisfying one rule alone. In addition or in the alternative, each rule can contribute a weight as to whether or not a particular named entity/content item association is to be formed. The weights contributed by all the applied rules are then combined, and the association is created if the combined value exceeds a predetermined threshold.

The event processing system 210 further includes a persistent video metacontent database 315. The persistent video metacontent database 315 stores an association between content item identifiers, the metacontent of content items listed in the television EPG, VOD, and/or internet video listings, and the corresponding computed rich tags from the universal smart tagging subsystem 310. The persistent video metacontent database 315 is populated from the output of the metacontent processing and generation of the rich tags in the universal smart tagging subsystem 310. The persistent video metacontent database 315 stores this information for both past and present content items, thereby enabling complete system analytics to be determined at any later time.

The event processing system 210 also includes a persistent video availability database 320 that stores an association between content item identifiers and their corresponding television schedule/channel information, VOD availability schedules, rates, subscription information, Internet availabilities, and other such scheduling and availability data. This availability database 320 is populated by receiving and processing the television EPG listings, VOD listings, and/or Internet video listings. The persistent video availability database 320 retains past scheduling, availability, rate, and other such data for content items that may no longer be presently available to enable later analytics generation, as described below.

The event processing system 210 also, optionally, includes a persistent household database 325 for maintaining a map of each device identifier to a particular household identifier. For example, the persistent household database 325 can include records that represent an association between a particular STB device and a particular physical address. This association can be included in the persistent household database 325 upon a user registering for a content provider service or upon receiving the STB. Such information enables the event processing system 210 to provide statistics and analytics regarding viewership on a household level. Thus, one can discover a high correlation between (1) certain television channels, television programs, and/or genres of content items and (2) particular neighborhoods and/or other geographic designations. The persistent household database 325 retains the device identifier to a household identifier association for past associations as well as present associations.

The event processing system 210 may, optionally, include a persistent demographics database 330 for maintaining a map of each household identifier to a demographic record or profile of those residents in the household. For example, the persistent demographics database 330 can include an association between (1) a physical address of a household (2) and the number of, ages of, and/or genders of the members of the household. In addition, other types of demographic information can be provided, e.g., household income, number of cars owned, etc. This information can be obtained from third party sources that obtain and/or track such information. Alternatively, a content or service provider deploying implementations of the systems and method described herein can be the source of such information. Thus, the persistent demographics database 330 enables the event processing system 210 to generate statistics and analytics concerning what content items are being viewed by households of a certain income, for example. The persistent demographics database 330 retains past as well as present demographic information and household associations. In addition, a unique identifier, i.e., a household identifier, can be associated with, or used in place of, the physical address discussed above.

The event processing system 210 may, optionally, further include a persistent video and image database 335 for maintaining, for one or more content items, an image related to the content item, a portion of the content item, a frame identifier within the content item, and/or a link to an image or a video stream of the corresponding portion of the video. The persistent video and image database 335 retains such links, images, and/or video stream for past as well as present content items. Such an image can be used, for example, when presenting analytics and/or other statistical information about the content items. Also, the single frames and/or the portions of video content having the highest number of views can be provided and/or presented.

Figure 7:
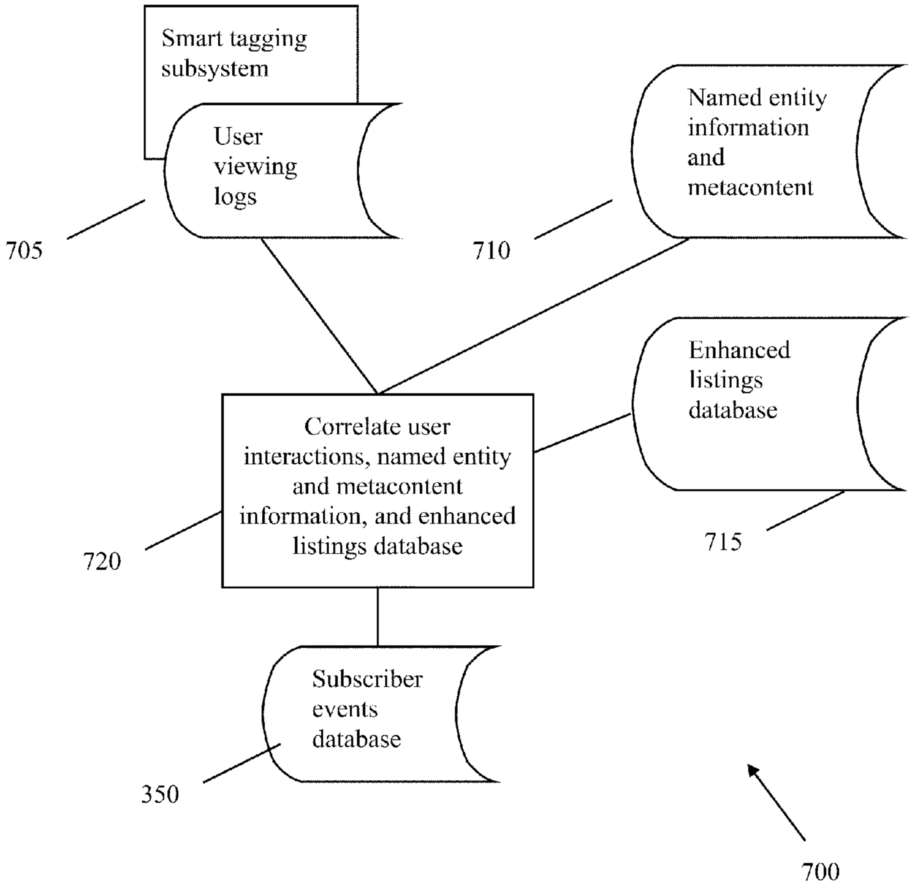
FIG. 7 shows an illustrative process for creating a subscriber events database.

FIG. 7 shows a process 700 for creating a subscriber events database 350, which captures, on a per user and/or per device basis, events related to content items. As described above, the event processing system 210 captures user interaction operations and system use data in, among other databases, the persistent event database 305. In certain implementations, this information can be correlated with information in the universal smart tagging subsystem 310 and the enhanced listing database 345 to create a subscriber events database 350. As shown in FIG. 7, user/system interaction information from, e.g., the persistent event database 305 and/or user viewing logs (collectively 705), named entity information and metadata 710, and enhanced listings information 715 are correlated (step 720) to populate a subscriber events database 350.

The correlations enable the creation of a complete viewing behavior history on a user-by-user or device-by-device basis. For example, television tune events, VOD trick mode events (e.g., fast-forward, pause, rewind type events), and/or internet video selections become associated with the named entities underlying the selected content or content being operated-on at the time (in step 720). Also, metacontent associated with the named entities 710 and/or items from the enhanced listings database 715 can be associated with the user events. Thus, the actual content experienced (watched and/or heard), when the content was experienced, actions taken during the content presentation, at what point during the presentation the actions were taken, etc. all become associated with a particular user or device (e.g., mobile device, STB, etc.) and stored in the subscriber events database 350.

Figure 8:
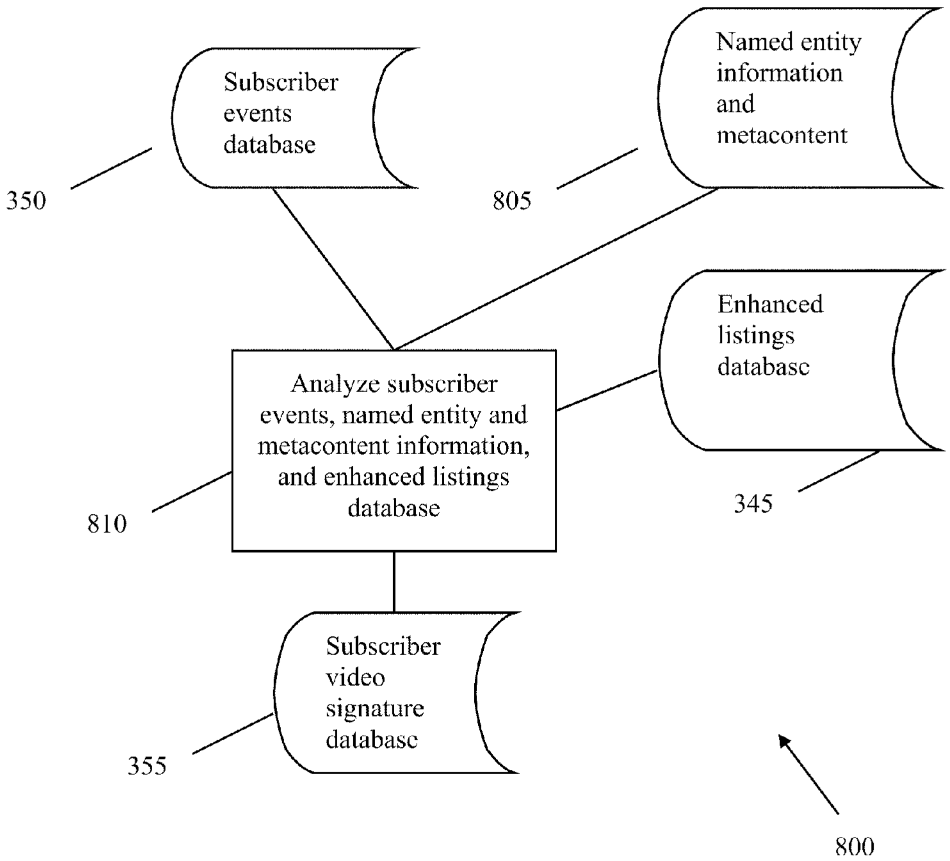
FIG. 8 shows an illustrative process for creating a subscriber video signature database.

FIG. 8 shows a process 800 for creating a subscriber video signature database 355, which characterizes a user's viewing and/or listening behavior and can be used to capture the user's overall content preferences (called a "signature" herein). The information in the subscriber events database 350, named entity and associated metacontent databases 805, and the enhanced listings database 345 can be analyzed (step 810) to populate the subscriber video signature database 355. U.S. Pat. No. 7,774,294, filed Mar. 6, 2007, entitled Methods And Systems For Selecting And Presenting Content Based On Learned Periodicity Of User Content Selections, incorporated by reference herein, describes techniques for learning user content viewing preferences and forming signatures there from. These techniques can be used in combination with embodiments of the present invention to create the users' signatures that are stored in the subscriber video signature database 355. Process 800 can be performed periodically, or in real-time upon request, to keep signatures current The event processing system 210 further includes a real-time query processing system 340. The real-time query processing system 340 cooperates with the other components of the event processing system 210 to enable the generation and reporting of past and present statistics and analytics. The real-time query processing system 340 can provide information on the current state of the service provider network 100, as a whole. For example, the system 340 can provide a report on the numbers of particular types of devices (e.g., television sets versus handheld devices versus desktop computers) currently viewing content items or a genre-based breakdown of all content currently being served by the entire network 100.

Also, the real-time query processing system 340 can provide a report on the current state of a portion of the network 100, e.g., all devices currently viewing or otherwise interacting with a particular content item or tuned to a particular channel. Further still, the real-time query processing system 340 can provide a report on the current state of a particular household or device. In this context, "state" can have the same meaning given above as well as any trick mode actions currently being performed. In the context of a particular content item, state can be an indication of the number of viewers of the content item. For example, the real-time query processing system 340 can further determine "enriched" metacontent information (metacontent information associated with content items via a named entity association) and rich tags associated with one or more designated content items. The real-time query processing system 340 can also determine the identity of devices and/or households that have interacted with or are currently interacting with a specified one or more content items and/or particular portions of the one or more content items. The content items can, optionally, be specified according to metacontent and/or rich tags; an optional past timeframe can also be provided.

The real-time query processing system 340 can also determine the number and set of device identifiers, for each type of device, currently interacting with the network 100, the number and set of subscriber identifiers and/or household identifiers corresponding to any one or more device identifiers, and/or the identity and enriched tag and/or metacontent information associated with any one or set of content items (e.g., television program, VOD asset, and/or internet video). The real-time query processing system 340 can further determine the current interaction operation (e.g., play, pause, rewind, and fast-forward) and video frame metacontent corresponding to each device operating on a particular content item or subset of items at a designated time, the actual image and/or video stream (or link thereto) corresponding to a video frame displayed and/or downloaded to each device operating on a particular content item or set of content items at a given time, and/or the enriched tags associated with the past interaction operations (e.g., tuning, clickstream history, and or other operation) of each device, subscriber and/or household.

The real-time query processing system 340 can also determine statistics associated with each device, subscriber and/or household. Because the system receives continuous state information for all devices and/or users, the system enables the determination of various weighting factors relative to particular content consumed, as well as metacontent associated with the content. For example, by using the named entities and/or rich tag associations, the system can determine how many minutes of James Bond movies a particular STB has consumed in a given interval because each particular James Bond movie will have associated metacontent that identifies it as a James Bond move. The same is true for any of the other named entities, e.g., Red Sox games, quantum physics programs, audio/video content featuring Val Kilmer, music by Elvis Presley, etc. Further still, the system can determine weighted statics for the type of content consumed based on the associated metacontent of the content items presented, e.g., 50% television, 30% movies, and 20% music.

In an illustrative implementation, the statistical weights are correlated with a particular device, subscriber and/or household based on learning preferences from past interaction operations (such as viewing history). The real-time query processing system 340 can determine demographic information and/or subscription information of each household associated with one or more particular devices, a breakdown of past viewing habits for a given set of devices, types of devices, and/or households in terms of content items and/or metacontent and/or rich tags associated with content items. One or more devices may be specified according to demographic and/or household information in any of the illustrative examples provided herein. In other words, when conducting any of the illustrative determinations described above, the results can be limited according to demographic and/or household information.

It is understood that the types of reports, information, statistics, and analytics listed above are illustrative only, and other information can be derived by the real-time query processing system 340 based on the information contained within the event processing system 210. Likewise, any number of statistical summaries of the illustrative determinations can be provided by the real-time query processing system 340.

In addition to providing the information, statistics, analytics, and query results listed above for the past and present, the real-time query processing system 340, in combination with the other elements of the event processing system 210, enable predictive analytics to provide estimates of the same information for future points in time. In one illustrative implementation, real-time query processing system 340 determines which subscribers, devices, and/or households are presently viewing a particular channel of a television system based on near-immediate term data on interaction operations present in the persistent event database 305. The query system 340 then correlates past interaction operations for the subset presently viewing the particular channel (again, from data cataloged in the persistent event database 305) with enriched smart tag data present in the persistent video metacontent database 315. The past interaction operations are then projected to be future operations and, optionally, can have an adjustment factor applied based on the relationship between past action and future actions recorded by the system. This correlation can present viewing preferences of the subset of viewers of the particular channel as a whole as well as preferences of subgroups within the subset of viewers of the particular channel. Knowing the viewing preferences of a particular subgroup of the present viewers enables the operator of the service provider network 100 to places advertisements targeted to the particular subgroup.

Figure 9:
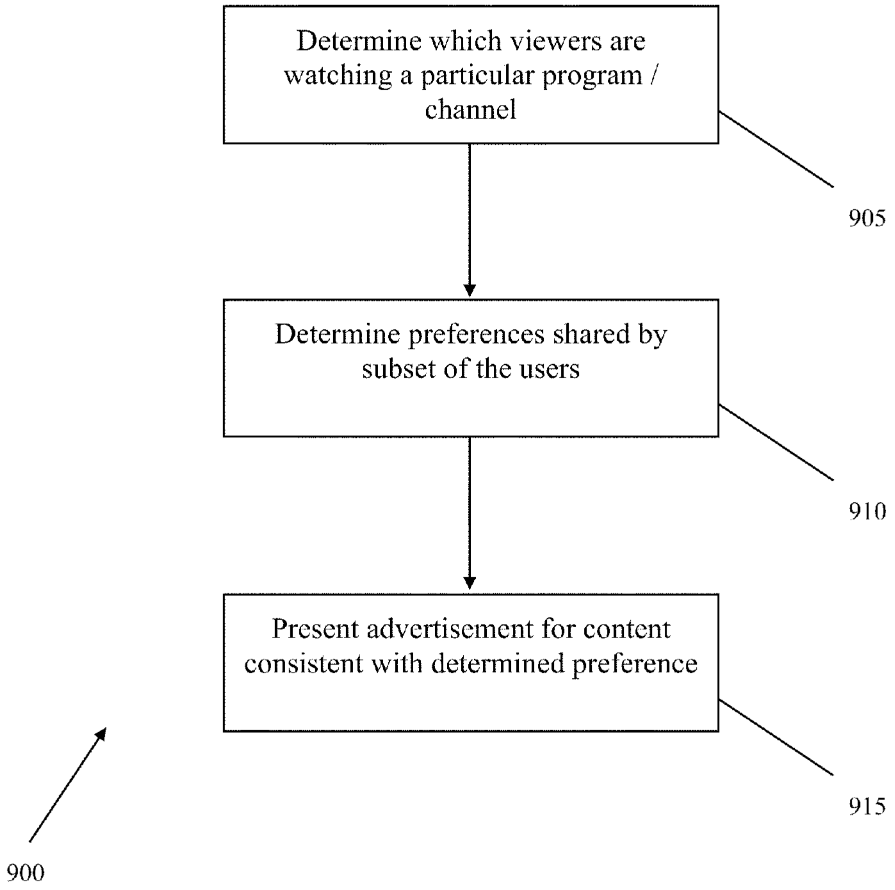
FIG. 9 shows an illustrative process for targeted presentation of advertisements.

FIG. 9 shows an illustrative process 900 for targeted presentation of advertisements. For example, the query system 340 determines from information in the persistent event database 305 that approximately two million viewers of a cable network are watching a particular channel at the present time (step 905). Based on information in the subscriber video signature database 355, the query system 340 estimates that 40% of the identified viewers have exhibited a particular set of preferences, e.g., for James Bond movies (step 910). In response, the operator of the cable network places an advertisement for content items consistent with the determined preferences (step 915), e.g., for a James Bond movie that is available through the cable network video-on-demand service (step 915). Although a cable television system was used as an example above, it is understood that the scope of the invention extends beyond cable television systems as a source of content items.

In addition to targeted advertisement placement, the systems and methods described herein enable comparison of specific content items as well as categories (e.g., genres) of content items, both in the past and present. For example, the system enables the determination of the number of users that watch content items associated the baseball versus the number of users that watch content items associated with basketball (where both baseball and basketball can be named entities or metacontent associated therewith). Further, the system also enables the determination of the relative numbers of views of James Bond movies versus Indian Jones movies. Further still, the system enables other comparative determinations, such as, the subjects of educational programs (math versus chemistry), the genres of movies (action versus drama), and which sports leagues (European versus Spanish) are being consumed. Moreover, the various comparisons can be qualified by time of day the content is consumed, duration of presentation of content, date on which the content was presented, as well as demographic information associated with the users consuming the content.

Likewise, statistics associated with certain portions of a content item can be compared against statistics associated with other portions of the same content item. For example, the query system 340 can determine which portions of a particular type of sporting event commands the highest viewership. For example, the system enables the determination of the number of viewers of a particular goal in the live broadcast of the 2010 World Cup, and, in particular, can determine the number of viewers who rewound to that portion of the content item to replay the goal. Further, the system can determine the number of viewers of the 2009 Super Bowl opening ceremony versus the halftime show. Further still, by correlating information in the persistent event database 305 and subscriber video signature database 355, the system can determine the number of people who are presently watching the Super Bowl halftime show who also exhibit a preference for James Bond movies. Using this information, embodiments of the invention enable a content provider or service operator to modify its content to suit a particular target audience or customer base. In addition, aspects of the invention enable a service operator to prove or validate the makeup of its viewership to advertisers or content creators.

The techniques and systems disclosed herein may be implemented as a computer program product for use with a computer system. Such implementations may include a series of computer instructions, or logic, fixed either on a tangible medium, such as a computer readable medium (e.g., a diskette, CD-ROM, ROM, flash memory or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., microwave, infrared or other transmission techniques). The series of computer instructions embodies all or part of the functionality described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

As described throughout the disclosure, the methods, systems, and techniques presented herein overcome the limitations and drawbacks of known techniques. It will be appreciated that the scope of the present invention is not limited to the above-described embodiments, but encompasses modifications of and improvements to what has been described. For example, embodiments have been described in terms of providing enhanced analytics for television viewership. However, embodiments of the invention can be implemented for audio/video content items viewed on fixed or portable computing device, such as video-enabled mobile telephones and PDAs. In addition, some of the automated steps described herein as executed on server systems can be executed on portable devices (e.g., mobile telephones, PDAs, hand-held computing devices, etc.) All such variations and modifications are intended to be within the scope of the present invention.

What is claimed is:

1. A method of determining interaction analytics for user interactions with audio and video content items, the method comprising:

retrieving, from a first database, a collection of content identifiers for identifying a plurality of content items based on characteristics of the plurality of content items;

retrieving, from a second database, a catalog of the plurality of content items, each content item of the plurality of the content items of the catalog being associated with metacontent describing the respective content item;

cross-referencing metacontent associated with a first content item of the plurality of content items of the catalog retrieved from the second database with the collection of the content identifiers retrieved from the first database;

associating, based on the cross-referencing, a content identifier with the first content item based on the metacontent associated with the first content item;

providing, to a third database, monitored user interactions with the plurality of content items of the catalog and historical records of the user interactions, the historical records including the content identifier associated with the first content item and the user interactions including media navigation associated with the plurality of content items of the catalog at a specified period of time;

determining, using the third database, interaction analytics for a second content item of the plurality of content items of the catalog and a set of users having interacted with the second content item based on the monitored user interactions and the historical records;

determining whether the set of users will perform a specified interaction with the second content item during a future period of time based on the interaction analytics, wherein the specified interaction is one of a pause operation, a rewind operation, and a fast-forward operation; and identifying an advertisement associated with the second content item of the plurality of content items of the catalog based on the determination whether the set of users will perform the specified interaction.

2. The method of claim 1, further comprising identifying a type of device a user of the set of users is using to interact with the plurality of content items of the catalog, and wherein determining the interaction analytics for the set of users having interacted with the second content item includes determining at least one of a first number of and a first set of a specified type of device the set of users used to interact with the plurality of content items of the catalog during the specified period of time.

3. The method of claim 2, wherein the specified period of time is a current period of time.

4. The method of claim 2, wherein the specified period of time is a past period of time and further comprising estimating at least one of a second number of and a second set of a specified type of device the set of users will use during the future period of time to interact with the second content item based on the interaction analytics determined for the past period of time.

5. The method of claim 1, wherein the set of users is a first set of users, and wherein determining the interaction analytics includes determining at least one of a first number of and a second set of users performing the specified interaction during the specified period of time.

6. The method of claim 5, wherein the specified period of time is a current period of time.

7. The method of claim 1, wherein determining the interaction analytics includes determining a playback position in a third content item of the plurality of content items of the catalog at which a user of the set of users was interacting with the third content item during the specified period of time, and wherein the third content item was specified by at least one specified content identifier.

8. The method of claim 7, wherein the specified period of time is a current period of time.

9. The method of claim 7, further comprising presenting a portion of the third content item corresponding to the determined playback position.

10. The method of claim 1, wherein determining the interaction analytics for the set of users having interacted with the plurality of content items includes determining a set of content item preferences for at least one user of the set of users.

11. The method of claim 10, further comprising determining a time during which the at least one user of the set of users is interacting with the plurality of content items of the catalog and presenting an advertisement for a third content item based on the set of content item preferences for the at least one of the set of users and based upon at least one of a content identifier associated with the third content item and metacontent associated with the third content item.

12. The method of claim 1, wherein monitoring user interactions further includes determining at least one of a video frame metacontent corresponding to each device operating on at least one content item of the plurality of content items at the specified time, an image corresponding to a first video frame displayed or downloaded, a video stream corresponding to a second video frame displayed or downloaded to each device operating on the at least one content item of the plurality of content items at the specified time, and enriched tags associated with a set of operations.

13. The method of claim 1, further comprising monitoring user interactions on a particular device.

14. The method of claim 1, further comprising monitoring user interactions for a particular subscriber.

15. The method of claim 1, further comprising monitoring user interactions for a particular household.

16. The method of claim 1, further comprising monitoring user interactions for a particular population.

17. A system for determining interaction analytics for user interactions with audio and video content items, the system comprising an event processing system configured to:

retrieve, from a first database, a collection of content identifiers for identifying a plurality of content items based on characteristics of the plurality of content items;

retrieve, from a second database, a catalog of the plurality of content items, each content item of the plurality of the content items of the catalog being associated with metacontent describing the respective content item;

cross-reference metacontent associated with a first content item of the plurality of content items of the catalog retrieved from the second database with the collection of the content identifiers retrieved from the first database;

associate, based on the cross-referencing, a content identifier with the first content item based on the metacontent associated with the first content item;

provide, to a third database, monitored user interactions with the plurality of content items of the catalog and historical records of the user interactions, the historical records including the content identifier associated with the first content item and the user interactions including media navigation associated with the plurality of content items of the catalog at a specified period of time;

determine, using the third database, interaction analytics for a second content item of the plurality of content items of the catalog and a set of users having interacted with the second content item based on the monitored user interactions and the historical records;

determine whether the set of users will perform a specified interaction with the second content item during a future period of time based on the interaction analytics, wherein the specified interaction is one of a pause operation, a rewind operation, and a fast-forward operation; and identify an advertisement associated with the second content item of the plurality of content items of the catalog based on the determination whether the set of users will perform the specified interaction.

18. The system of claim 17, wherein the event processing system is further configured to identify a type of device a user of the set of users is using to interact with the plurality of content items of the catalog, and wherein the event processing system configured to determine the interaction analytics for the set of users having interacted with the second content item is further configured to determine at least one of a first number of and a first set of a specified type of device the set of users used to interact with the plurality of content items of the catalog during the specified period of time.

19. The system of claim 18, wherein the specified period of time is a past period of time and wherein the event processing system is further configured to estimate at least one of a second number of and a second set of a specified type of device the set of users will use during the future period of time to interact with the second content item based on the interaction analytics determined for the past period of time.

20. The system of claim 17, wherein the set of users is a first set of users, and wherein the event processing system configured to determine the interaction analytics is further configured to determine at least one of a first number of and a second set of users performing the specified interaction during the specified period of time.

21. The system of claim 17, wherein the event processing system configured to determine the interaction analytics is further configured to determine a playback position in a third content item of the plurality of content items of the catalog at which a user of the set of users was interacting with the third content item during the specified period of time, and wherein the third content item was specified by at least one specified content identifier.

22. The system of claim 21, wherein the event processing system is further configured to present a portion of the third content item corresponding to the determined playback position.

23. The system of claim 17, wherein the event processing system configured to determine the interaction analytics for the set of users having interacted with the plurality of content items is further configured to determine a set of content item preferences for at least one user of the set of users.

24. The system of claim 23, wherein the event processing system is further configured to determine a time during which the at least one user of the set of users is interacting with the plurality of content items of the catalog and present an advertisement for a third content item based on the set of content item preferences for the at least one of the set of users and based upon at least one of a content identifier associated with the third content item and metacontent associated with the third content item.

25. The system of claim 17, wherein the event processing system configured to monitor user interactions is further configured to determine at least one of a video frame metacontent corresponding to each device operating on at least one content item of the plurality of content items at the specified time, an image corresponding to a first video frame displayed or downloaded, a video stream corresponding to a second video frame displayed or downloaded to each device operating on the at least one content item of the plurality of content items at the specified time, and enriched tags associated with a set of operations.

* * * * *